(12) United States Patent
Yashima et al.

(10) Patent No.: US 11,818,376 B2
(45) Date of Patent: Nov. 14, 2023

(54) MEMORY SYSTEM

(71) Applicant: Kioxia Corporation, Tokyo (JP)

(72) Inventors: Daisuke Yashima, Tachikawa (JP); Masato Sumiyoshi, Yokohama (JP); Keiri Nakanishi, Kawasaki (JP); Takashi Miura, Yokohama (JP); Kohei Oikawa, Kawasaki (JP); Sho Kodama, Kawasaki (JP); Youhei Fukazawa, Kawasaki (JP); Zheye Wang, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/868,597

(22) Filed: Jul. 19, 2022

(65) Prior Publication Data

US 2022/0353519 A1  Nov. 3, 2022

Related U.S. Application Data

(62) Division of application No. 17/019,941, filed on Sep. 14, 2020, now Pat. No. 11,431,995.

(30) Foreign Application Priority Data

Mar. 12, 2020 (JP) ................................. 2020-042839

(51) Int. Cl.
| | |
|---|---|
| *H04N 19/423* | (2014.01) |
| *H04N 19/146* | (2014.01) |
| *H04N 19/13* | (2014.01) |
| *H04N 19/184* | (2014.01) |

(52) U.S. Cl.
CPC ........... *H04N 19/423* (2014.11); *H04N 19/13* (2014.11); *H04N 19/146* (2014.11); *H04N 19/184* (2014.11)

(58) Field of Classification Search
CPC .... H04N 19/13; H04N 19/146; H04N 19/184; H04N 19/423; H04N 19/91
See application file for complete search history.

(56) References Cited

U.S. PATENT DOCUMENTS

| | | | | |
|---|---|---|---|---|
| 6,055,338 | A  * | 4/2000 | Endo .................... | H03M 7/4006 |
| | | | | 382/247 |
| 6,529,551 | B1* | 3/2003 | Yu ......................... | H04N 19/423 |
| | | | | 375/E7.211 |
| 7,370,046 | B2 | 5/2008 | Imai | |
| 9,094,691 | B2 | 7/2015 | Zhang et al. | |
| 2012/0027084 | A1* | 2/2012 | Zhang .................. | H04N 19/463 |
| | | | | 375/240.12 |

* cited by examiner

*Primary Examiner* — Mohammed S Rahaman
(74) *Attorney, Agent, or Firm* — Oblon, McClelland, Maier & Neustadt, L.L.P.

(57) ABSTRACT

According to one embodiment, a memory system includes a frequency value update unit, a first intra-group rearranging unit, a second intra-group rearranging unit, and a routing unit. The frequency value update unit adds a first value to each of one or more first frequency values that are associated with one or more first symbols, respectively, in one or more entries in a table. The first intra-group rearranging unit rearranges first entries, which belong to a first group, using frequency values in the first entries. The second intra-group rearranging unit rearranges second entries, which belong to a second group lower than the first group, using frequency values. The routing unit rearranges at least one of the first entries and at least one of the second entries.

25 Claims, 44 Drawing Sheets

| Frequency entry number | Symbol | Frequency value |
|---|---|---|
| 0 | S0 | 8 |
| 1 | S1 | 7 |
| 2 | S2 | 6 |
| 3 | S3 | 5 |
| 4 | S5 | 4 |
| 5 | S4 | 3 |
| 6 | S6 | 2 |
| 7 | S7 | 1 |

FIG. 2

| Frequency entry number | | Symbol | Frequency value | |
|---|---|---|---|---|
| Group 0 | 0 | S0 | 70 | ~310 |
| | 1 | S1 | 60 | ~311 |
| | 2 | S2 | 50 | ~312 |
| | 3 | S3 | 40 | ~313 |
| Group 1 | 4 | S4 | 40 | ~314 |
| | 5 | S5 | 40 | ~315 |
| | 6 | S6 | 20 | ~316 |
| | 7 | S7 | 10 | ~317 |
| | ⋮ | ⋮ | ⋮ | |

Frequency value reduction conversion ($\alpha=0.5$)

| Symbol | Frequency value | |
|---|---|---|
| S0 | 35 | ~310 |
| S1 | 30 | ~311 |
| S2 | 25 | ~312 |
| S3 | 20 | ~313 |
| S4 | 20 | ~314 |
| S5 | 20 | ~315 |
| S6 | 10 | ~316 |
| S7 | 5 | ~317 |
| ⋮ | ⋮ | |

| Frequency entry number | | Symbol | Frequency value | |
|---|---|---|---|---|
| Group 0 | 0 | S0 | 35 | —310 |
| | 1 | S1 | 30 | —311 |
| | 2 | S2 | 25 | —312 |
| | 3 | S3 | 20 | —313 |
| Group 1 | 4 | S4 | 20 | —314 |
| | 5 | S5 | 20 | —315 |
| | 6 | S6 | 10 | —316 |
| | 7 | S7 | 5 | —317 |
| | ⋮ | ⋮ | ⋮ | |

Update frequency value in accordance with input symbol "S5" ⇒

| Symbol | Frequency value | |
|---|---|---|
| S0 | 35 | —310 |
| S1 | 30 | —311 |
| S2 | 25 | —312 |
| S3 | 20 | —313 |
| S4 | 20 | —314 |
| //S5// | //21// | —315 |
| S6 | 10 | —316 |
| S7 | 5 | —317 |
| ⋮ | ⋮ | |

FIG. 14

| Frequency entry number | | Symbol | Frequency value | |
|---|---|---|---|---|
| Group 0 | 0 | S0 | 35 | —310 |
| | 1 | S1 | 30 | —311 |
| | 2 | S2 | 25 | —312 |
| | 3 | S3 | 20 | —313 |
| Group 1 | 4 | S4 | 20 | —314 |
| | 5 | S5 | 21 | —315 |
| | 6 | S6 | 10 | —316 |
| | 7 | S7 | 5 | —317 |
| | ⋮ | ⋮ | ⋮ | |

Rearrange in group ⇒

| Symbol | Frequency value | |
|---|---|---|
| S0 | 35 | —310 |
| S1 | 30 | —311 |
| S2 | 25 | —312 |
| S3 | 20 | —313 |
| //S5// | //21// | —315 |
| //S4// | //20// | —314 |
| S6 | 10 | —316 |
| S7 | 5 | —317 |
| ⋮ | ⋮ | |

FIG. 19

| Frequency entry number | Symbol | Frequency value |
|---|---|---|
| 0 | S0 | 4 |
| 1 | S1 | 3 |
| 2 | S2 | 4 |
| 3 | S3 | 3 |
| 4 | S4 | 2 |
| 5 | S5 | 2 |
| 6 | S6 | 3 |
| 7 | S7 | 1 |
| 8 | S8 | 1 |
| 9 | S9 | 2 |
| 10 | S10 | 1 |
| 11 | S11 | 1 |
| ... | ... | ... |

- 410 Code length boundary area
- 411
- 412
- 413
- 414
- 415 Code length boundary area
- 416
- 417
- 418
- 419
- 420
- 421 Code length boundary area Group 0 / Group 1

Perform intra-group rearranging and inter-group rearranging

| Symbol | Frequency value |
|---|---|
| S0 | 4 |
| S2 | 4 |
| S1 | 3 |
| S3 | 3 |
| S4 | 2 |
| S6 | 3 |
| S5 | 2 |
| S9 | 2 |
| S7 | 1 |
| S8 | 1 |
| S10 | 1 |
| S11 | 1 |
| ... | ... |

| Frequency entry number | Symbol | Frequency value |
|---|---|---|
| 0 | S0 | 4 |
| 1 | S2 | 4 |
| 2 | S1 | 3 |
| 3 | S3 | 3 |
| 4 | S4 | 2 |
| 5 | S6 | 3 |
| 6 | S5 | 2 |
| 7 | S9 | 2 |
| 8 | S7 | 1 |
| 9 | S8 | 1 |
| 10 | S10 | 1 |
| 11 | S11 | 1 |
| ... | ... | ... |

Group 0: entries 0–5; Group 1: entries 6–11.
Code length boundary areas at 410, 415, 421.

After routing:

| Symbol | Frequency value |
|---|---|
| S0 | 4 |
| S2 | 4 |
| S1 | 3 |
| S3 | 3 |
| S6 | 3 |
| S4 | 2 |
| S9 | 2 |
| S5 | 2 |
| S7 | 1 |
| S8 | 1 |
| S10 | 1 |
| S11 | 1 |
| ... | ... |

MEMORY SYSTEM

CROSS-REFERENCE TO RELATED APPLICATIONS

This application is a divisional of U.S. application Ser. No. 17/019,941, filed Sep. 14, 2020, which is based upon and claims the benefit of priority from Japanese Patent Application No. 2020-042839, filed Mar. 12, 2020, the entire contents of each of which are incorporated herein by reference.

FIELD

Embodiments described herein relate generally to techniques for compressing and decompressing data.

BACKGROUND

As a general-purpose data compression method, a method of combining dictionary coding with entropy coding may be used. Among these methods, the entropy coding includes static entropy coding and adaptive (dynamic) entropy coding.

In the static entropy coding, all symbols to be coded are input and accumulated (buffered), and a frequency table indicative of an appearance frequency for each symbol is acquired. Then, an encoding table is generated so that a symbol having a higher appearance frequency is assigned a code having a shorter code length. Highly efficient coding can be realized by converting the accumulated symbols into codewords using the encoding table.

However, in the static entropy coding, after the frequency table for all symbols to be coded is acquired, the encoding table for converting the symbols into the codewords is generated. Therefore, a long latency may occur before the codewords to which the symbols are converted are obtained.

On the other hand, in the adaptive entropy coding, the frequency table and the encoding table are dynamically updated while symbols to be coded are input. As a result, the adaptive entropy coding has a shorter latency than the static entropy coding.

BRIEF DESCRIPTION OF THE DRAWINGS

FIG. 2 is a diagram illustrating a configuration example of a frequency table.

FIG. 11 is a diagram illustrating an example in which frequency values are reduced by the frequency value reduction conversion unit.

FIG. 13 is a diagram illustrating an example in which the frequency values are updated by the frequency value update unit.

FIG. 14 is a diagram illustrating an example in which frequency entries are rearranged by an intra-group rearranging unit.

FIG. 19 is a diagram illustrating an example in which frequency entries are rearranged by an intra-group rearranging unit and an inter-group rearranging unit.

FIG. 20 is a diagram illustrating an example in which the frequency entries are routed by a routing unit.

DETAILED DESCRIPTION

Various embodiments will be described hereinafter with reference to the accompanying drawings.

In general, according to one embodiment, a memory system includes an encoding unit, a frequency value update unit, a first intra-group rearranging unit, a second intra-group rearranging unit, and a routing unit. The encoding unit assigns, using a table in which a plurality of entries each including a symbol and a frequency value associated with the symbol are arranged in a first order, codewords to symbols, respectively, according to the first order. The symbols are included in the plurality of entries, respectively. The encoding unit converts one or more input first symbols into one or more first codewords, respectively. The frequency value update unit adds a first value to each of one or more first frequency values that are associated with the one or more first symbols, respectively, in one or more entries in the table that include the one or more first symbols, respectively. The first intra-group rearranging unit rearranges first entries in the table, which belong to a first group, using frequency values in the first entries, after the first value is added to each of the one or more first frequency values. The second intra-group rearranging unit rearranges second entries in the table, which belong to a second group lower than the first group, using frequency values in the second entries, after the first value is added to each of the one or more first frequency values. The routing unit rearranges at least one of the rearranged first entries and at least one of the rearranged second entries in the table. The encoding unit assigns the codewords to the symbols, respectively, according to a second order in which the plurality of entries are arranged in the table that is updated by the frequency value update unit, the first intra-group rearranging unit, the second intra-group rearranging unit, and the routing unit. The encoding unit converts one or more second symbols, which are input following the one or more first symbols, into one or more second codewords, respectively.

First Embodiment

Figure 1:
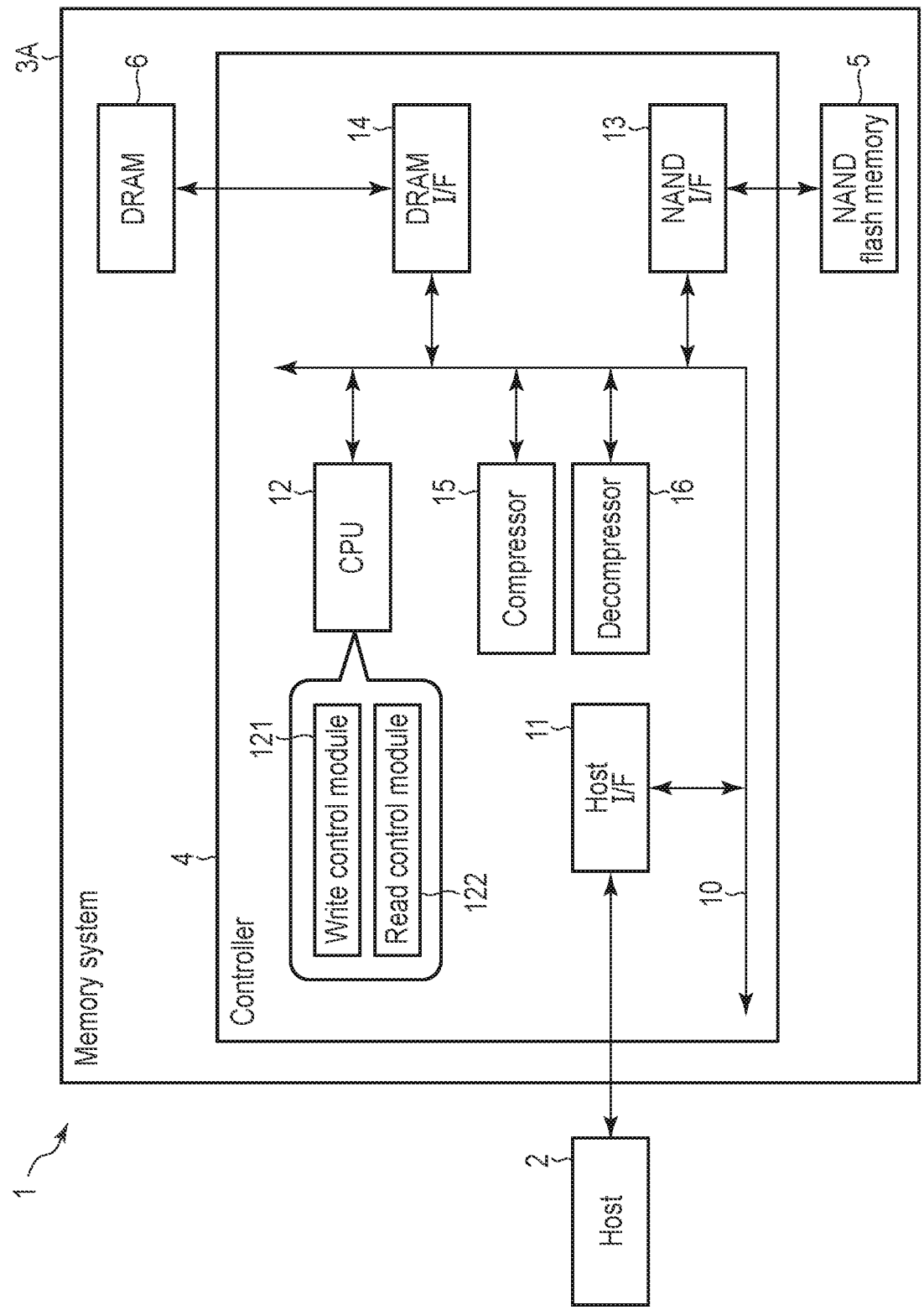
FIG. 1 is a block diagram illustrating a configuration example of an information processing system including a memory system according to a first embodiment.

First, a configuration of an information processing system 1 including a memory system 3A according to a first embodiment will be described with reference to FIG. 1. The information processing system 1 includes a host device 2 (hereinafter, referred to as a host 2) and the memory system 3A.

The memory system 3A is a semiconductor storage device configured to write data in a nonvolatile memory such as a NAND flash memory 5 and read data from the nonvolatile memory. The memory system 3A is realized as, for example, a solid state drive (SSD) including the NAND flash memory 5. Hereinafter, the case where the memory system 3A is realized as an SSD will be exemplified, but the memory system 3A may be realized as a hard disk drive (HDD).

The host 2 may be a storage server that stores a large amount of various data in the memory system 3A, or may be a personal computer.

The memory system 3A may be used as storage for the host 2. The memory system 3A may be built in the host 2 or may be connected to the host 2 via a cable or a network.

An interface for connecting the host 2 and the memory system 3A is conformable to SCSI, serial attached SCSI (SAS), AT attachment (ATA), serial ATA (SATA), PCI express (PCIe) (registered trademark), Ethernet (registered trademark), Fibre channel, NVM express (NVMe) (registered trademark), and the like.

The memory system 3A includes a controller 4 and the NAND flash memory 5. The controller 4 may be realized by a circuit such as a system-on-a-chip (SoC).

The controller 4 may include a random access memory (RAM) that is a volatile memory, such as a dynamic random access memory (DRAM) 6. Alternatively, a RAM such as a static random access memory (SRAM) may be built in the controller 4. Note that the DRAM 6 may also be built in the controller 4.

For example, a storage area for firmware (FW) loaded from the NAND flash memory 5 is provided in a RAM such as the DRAM 6.

The NAND flash memory 5 includes multiple blocks. Each of the blocks includes multiple pages. The blocks each function as a minimum erase unit. A block may be referred to as an erase block or a physical block. Each of the pages includes multiple memory cells connected to a single word line. The pages each function as a unit of a data write operation and a data read operation. Note that a word line may be used as a unit of a data write operation and a data read operation.

The tolerable maximum number of program/erase cycles (maximum number of P/E cycles) for each of the blocks is limited. One P/E cycle of a block includes an erase operation to erase data stored in all memory cells in the block and a write operation to write data in each page of the block.

The controller 4 may include a host interface (host I/F) 11, a CPU 12, a NAND I/F 13, a DRAM interface (DRAM I/F) 14, a compressor 15, and a decompressor 16. The host I/F 11, the CPU 12, the NAND I/F 13, the DRAM I/F 14, the compressor 15, and the decompressor 16 may be mutually connected through a bus 10.

The controller 4 is electrically connected to the NAND flash memory 5 through the NAND I/F 13 conformable to an interface standard such as a Toggle DDR or an open NAND flash interface (ONFI). The NAND I/F 13 functions as a NAND control circuit configured to control the NAND flash memory 5.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, (2) process to hide read/write operations in units of page and erase operations in units of block, and the like. The logical address is an address used by the host 2 for addressing the SSD 3A.

The management of mapping between each logical address and each physical address may be executed by using a logical-to-physical address conversion table. The controller 4 manages mapping between each logical address and each physical address with a certain management size unit by using the logical-to-physical address conversion table. A physical address corresponding to a logical address indicates a physical memory location in the NAND flash memory 5 to which data of the logical address is written. The logical-to-physical address conversion table may be loaded to the DRAM 6 from the NAND flash memory 5 when the SSD 3A is powered on.

Data write into one page is executable only once in a single P/E cycle. Thus, the controller 4 writes update data corresponding to a logical address not to an original physical memory location in which previous data corresponding to the logical address is stored but to a different physical memory location. Then, the controller 4 updates the logical-to-physical address conversion table to associate the logical address with the different physical memory location and to invalidate the previous data.

The block management includes defective block management, wear leveling, and garbage collection.

The host I/F 11 is a hardware interface that performs communication between the memory system 3A and the host 2 that is an external device of the memory system 3A. The host I/F 11 functions as a circuit that receives various commands such as I/O commands and various control commands from the host 2. The I/O commands may include a write command and a read command. The control commands may include an unmap command (trim command) and a format command. The host I/F 11 also functions as a transmission circuit that transmits to the host 2 a response or data in accordance with a command.

The DRAM I/F 14 functions as a DRAM control circuit configured to control accesses to the DRAM 6. The storage area of the DRAM 6 is allocated to an area for storing the FW and a buffer area used as a read/write buffer or the like.

The CPU 12 is a processor configured to control the host I/F 11, the NAND I/F 13, and the DRAM I/F 14. The CPU 12 executes various types of processing by executing the FW loaded in the DRAM 6. That is, the FW is control programs for controlling the operation of the CPU 12. The CPU 12 may perform, in addition to the above-described processes of FTL, command processes to process various commands from the host 2. Note that part of or the entire FTL processes and the command processes may be executed by a dedicated hardware in the controller 4.

The compressor 15 encodes data to be written into the NAND flash memory 5 to compress the data. The compressor 15 encodes, for example, plain text data received in response to receiving a write command from the host 2.

The decompressor 16 decodes compressed data read from the NAND flash memory 5 to decompress the compressed data. The decompressor 16 decodes, for example, compressed data read from the NAND flash memory 5 in response to receiving a read command from the host 2.

The CPU 12 may function as, for example, a write control module 121 and a read control module 122 by executing the FW. The write control module 121 compresses user data, which is received from the host 2 in response to receiving a write command, with the compressor 15 and writes the compressed user data into the NAND flash memory 5.

The read control module 122 reads data from the NAND flash memory 5 in accordance with a read command. The read data may be compressed data compressed by the compressor 15. When the read data is compressed data, the decompressor 16 decompresses the compressed data.

Further, the write control module 121 may randomize the data compressed by the compressor 15 in units of a predetermined size written in a single page of the NAND flash memory 5, cause an error check and correct (ECC) circuit, which performs an error correction process, to perform error correction coding on the randomized data with an error correction code such as a BCH code, and write the error correction coded data into the NAND flash memory 5. In this case, the read control module 122 can decode the data read from the NAND flash memory 5 by causing the ECC circuit to perform an error detection process and the error correction process, and release randomization with respect to the data decoded by the ECC circuit, thereby obtaining the compressed data compressed by the compressor 15.

Hereinafter, data in a specific unit to be encoded by the compressor 15 is also referred to as a symbol. In addition, compressed data obtained by causing the compressor 15 to encode one symbol is also referred to as a codeword. That is, the compressor 15 converts a symbol into a codeword by encoding. Further, the decompressor 16 converts a codeword into a symbol by decoding.

Adaptive entropy coding may be performed by the compressor 15 and the decompressor 16. For example, in the compressor 15 that performs the adaptive entropy coding, a frequency table indicating an occurrence frequency of each symbol and an encoding table for converting a symbol into a codeword are dynamically updated. As a result, the adaptive entropy coding has a shorter latency than the static entropy coding.

However, with the adaptive entropy coding, there is a large amount of processing from receiving an input symbol to updating the frequency table. Therefore, the adaptive entropy coding may have low throughput. In addition, when the adaptive entropy coding is implemented by hardware, the circuit size may become large.

FIG. 2 illustrates a configuration example of a frequency table 71. The frequency table 71 includes frequency entries corresponding to symbols. Here, a case is exemplified where the total number of frequency entries included in the frequency table 71 is eight.

Each symbol is, for example, a symbol that may be encoded by the compressor 15 and a symbol that may be obtained in decoding by the decompressor 16. In addition, each frequency entry includes two fields: a symbol field; and a frequency value field.

In the frequency entry corresponding to a certain symbol, the symbol (symbol value) is set in the symbol field. A frequency value associated with the symbol is set in the frequency value field. The frequency value indicates, for example, the number of times the symbol is input (or decoded) in a certain period.

The frequency entries are arranged in the frequency table 71 in an order. Therefore, each entry can be specified by using a number based on the order in which the frequency entries are arranged in the frequency table 71. This number is called a frequency entry number. In addition, a frequency entry corresponding to a smaller frequency entry number is called a higher frequency entry, and a frequency entry corresponding to a larger frequency entry number is called a lower frequency entry.

For example, in the frequency table 71 of FIG. 2, a frequency entry corresponding to the smallest frequency entry number "0" is the highest frequency entry including a symbol "S0" and a frequency value "8". A frequency entry corresponding to a next frequency entry number "1" is the second highest frequency entry from the highest position including a symbol "S1" and a frequency value "7". In addition, a frequency entry corresponding to the maximum frequency entry number "7" is the lowest frequency entry including a symbol "S7" and a frequency value "1".

Figure 3:
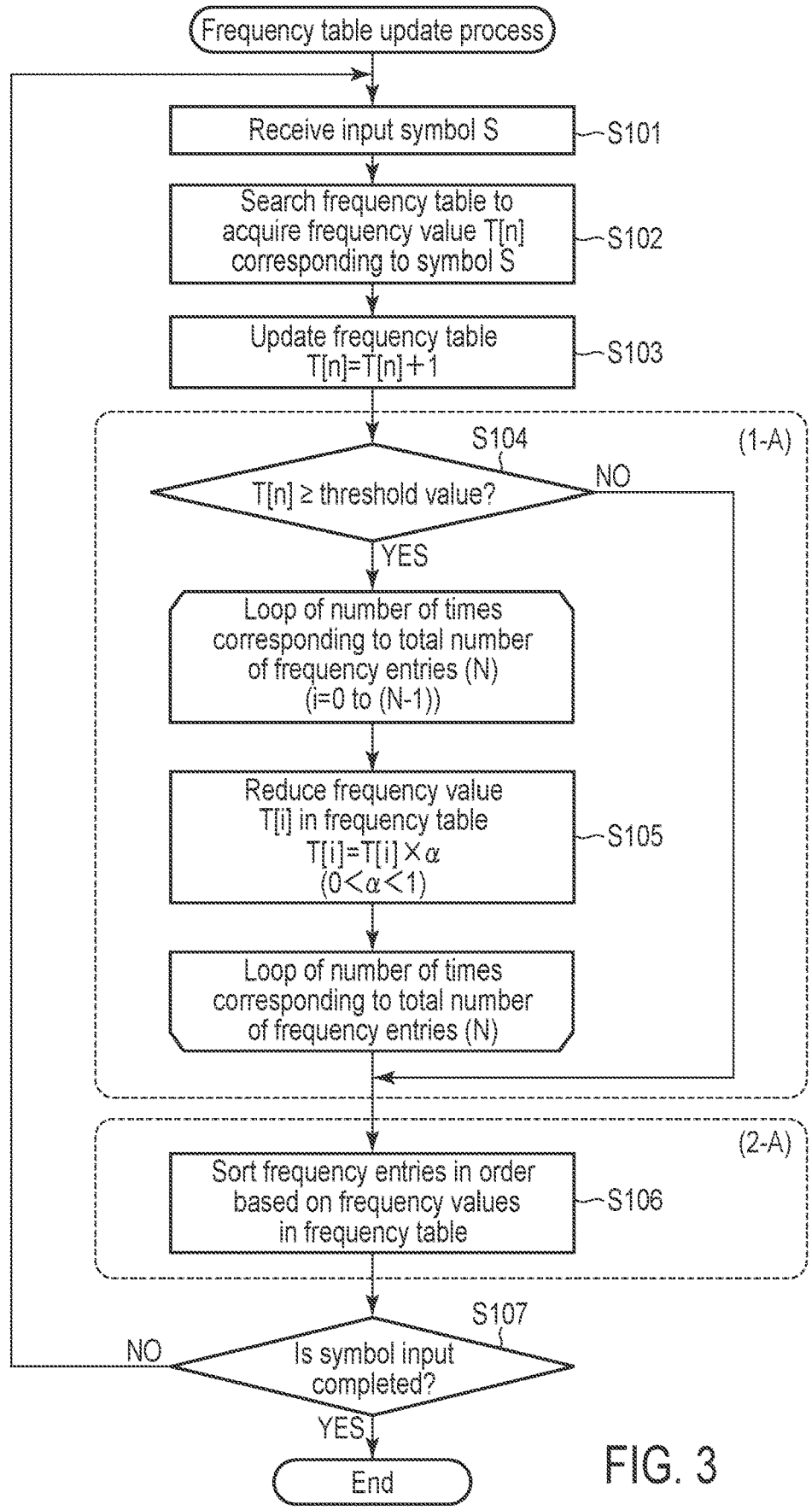
FIG. 3 is a flowchart illustrating an example of the procedure of a frequency table update process executed in a compressor according to a comparative example.

FIG. 3 is a flowchart illustrating an example of the procedure of a frequency table update process executed in a compressor in a memory system according to a comparative example. This compressor uses the adaptive entropy coding.

First, the compressor receives an input symbol S to be compressed (encoded) (step S101). The compressor searches the frequency table 71 to acquire a frequency value T[n] corresponding to the input symbol S (step S102). That is, the compressor specifies the frequency entry including the input symbol S from the frequency table 71 and acquires the frequency value T[n] included in the specified frequency entry. Then, the compressor adds (increments) one to the acquired frequency value T[n] to update the frequency table 71 (step S103).

Next, the compressor performs a frequency value reduction conversion process 1-A. In the frequency value reduction conversion process 1-A, conversion of reducing each of the frequency values in the frequency table 71 is performed so that each frequency value does not overflow. Specifically, the compressor determines whether or not the updated frequency value T[n] is larger than or equal to a threshold value (step S104). That is, the compressor determines whether or not the added frequency value T[n] needs to be reduced to avoid the overflow. For example, when the frequency value T[n] is 8-bit data, any value from 0 to 255 may be set as the frequency value T[n], so the threshold value is 255.

When the frequency value T[n] is larger than or equal to the threshold value (YES in step S104), the compressor multiplies a frequency value T[i] in the frequency table 71 by a specific ratio α (for example, 0.7) in each of N times loop process of increasing a variable i from 0 to N−1 by 1, thereby reducing the frequency value T[i] (step S105). N indicates the total number of frequency entries in the frequency table 71. Further, α is a value larger than zero and smaller than one. As a result, the compressor reduces each frequency value T[i] in the frequency table 71 to a specific ratio α (for example, 70%).

On the other hand, when the frequency value T[n] is smaller than the threshold value (NO in step S104), the compressor skips step S105. That is, the compressor does not reduce each frequency value T[i] in the frequency table 71.

Next, the compressor performs a sort process 2-A of the frequency entries in the frequency table 71 (step S106). In the sort process 2-A, the frequency entries in the frequency table 71 are rearranged in an order based on the frequency values (for example, descending order of the frequency values).

Then, the compressor determines whether or not the input of symbols is completed (step S107). When the input of symbols is not completed (NO in step S107), the compressor returns to step S101 and updates the frequency table 71 using the next input symbol.

When the input of symbols is completed (YES in step S107), the compressor ends the frequency table update process.

In the frequency table update process in the memory system according to the comparative example, after the input symbol S is received, the frequency table 71 is updated and sorted, and since there is a large amount of processing until the next input symbol S can be received, a critical path becomes longer and the circuit size becomes larger.

Specifically, in this frequency table update process, after the frequency value T[n] in the frequency table 71 is updated in accordance with the input symbol S, the frequency value reduction conversion process 1-A is performed. That is, since there is a dependency relationship with the processing of updating the frequency value T[n], the frequency value reduction conversion process 1-A starts after waiting for the update of the frequency table 71. This lengthens the critical path of the frequency table update process and contributes to the reduction of the throughput of the adaptive entropy coding.

Further, in this a frequency table update process, the sort process 2-A is performed on all the frequency entries in the frequency table 71. In this sort process 2-A, it is necessary to completely rearrange all the frequency entries in order based on the frequency values. Such rearrangement also lengthens the critical path of the frequency table update process and becomes a factor of reducing the throughput of the adaptive entropy coding. Further, since it is necessary to provide a large number of comparators for comparing the frequency values, the circuit size of the compressor (or the decompressor) becomes large.

Therefore, in the memory system 3A according to the present embodiment, the compressor 15 and the decompressor 16 capable of improving the throughput of the adaptive entropy coding and reducing the circuit size are realized. Specifically, the compressor 15 and the decompressor 16 perform a frequency value reduction conversion process using the number of input or decode symbols without using the frequency value T[n] updated according to an input symbol. As a result, since the frequency value reduction conversion process can start without waiting for the update of the frequency table 71 according to the input symbol or decode symbol, the critical path of a frequency table update process can be shortened and the throughput of adaptive entropy coding can be improved.

Further, the compressor 15 and the decompressor 16 do not completely sort all the frequency entries in the frequency table 71 in order based on the frequency values, but divide the frequency entries in the frequency table 71 into groups each including several consecutive frequency entries and simply (that is, approximately) sort the divided frequency entries in the groups. More specifically, the compressor 15 and the decompressor 16 perform a simplified sort of locally sorting the frequency entries using the frequency values in each group, and then swapping (exchanging) the frequency entries between adjacent groups. That is, the frequency entries are exchanged between adjacent groups.

As a result, since the number of comparators required to compare the frequency values (more specifically, the number of stages of the comparators) is reduced, the critical path of the frequency table update process can be shortened, the throughput of the adaptive entropy coding can be improved, and the circuit size can be reduced. Note that even if such a simplified sort is performed instead of performing a global sort in which all the frequency entries in the frequency table 71 are completely sorted, the influence on the compression efficiency is slight.

Figure 4:
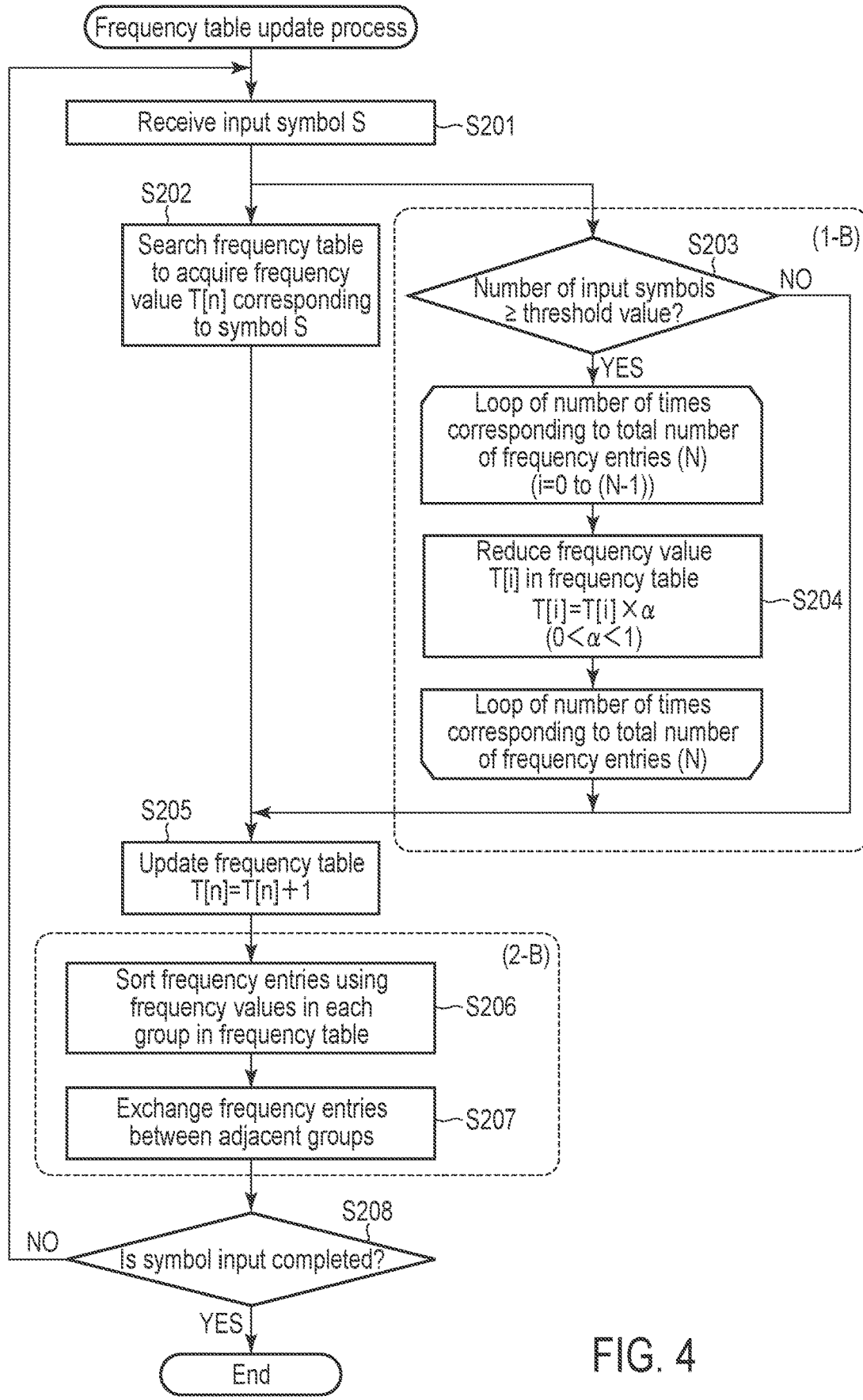
FIG. 4 is a flowchart illustrating an example of the procedure of a frequency table update process executed in a compressor in the memory system of the first embodiment.

FIG. 4 is a flowchart illustrating an example of the procedure of the frequency table update process executed in the compressor 15 in the memory system 3A of the present embodiment.

First, the compressor 15 receives an input symbol S to be compressed (step S201). Then, the compressor 15 performs a process of searching the frequency table 71 to acquire the frequency value T[n] corresponding to the input symbol S (step S202) and a frequency value reduction conversion process 1-B in parallel.

In the frequency value reduction conversion process 1-B, the conversion of reducing each of the frequency values in the frequency table 71 is performed so that each frequency value does not overflow. Specifically, the compressor 15 determines whether or not the number of input symbols is larger than or equal to a threshold value (step S203). The number of input symbols indicates, for example, the number of symbols input to the compressor 15 in a certain period. The compressor 15 counts the number of symbols input in the certain period. The compressor 15 determines, on the basis of the number of input symbols counted, whether or not the frequency values need to be reduced to avoid the overflow.

When the number of input symbols is larger than or equal to the threshold value (YES in step S203), the compressor 15 multiplies a frequency value T[i] in the frequency table 71 by a specific ratio $\alpha$ (for example, 0.7) in each of N times loop process of increasing a variable i from 0 to N−1 by 1, thereby reducing the frequency value T[i] (step S204). As a result, the compressor 15 reduces each frequency value T[i] in the frequency table 71 to a specific ratio $\alpha$ (for example, 70%).

On the other hand, when the number of input symbols is smaller than the threshold value (NO in step S203), the compressor 15 skips step S204. That is, the compressor 15 does not reduce each frequency value T[i] in the frequency table 71.

After step S202, and step S203 and step S204 are completed, the compressor 15 updates the frequency table 71 by adding one to the frequency value T[n] corresponding to the input symbol S (step S205). This frequency value T[n] may be a value reduced in the frequency value reduction conversion process 1-B.

Next, the compressor 15 performs a sort process 2-B of the frequency entries in the frequency table 71. In the sort process 2-B, the frequency entries in the frequency table 71 are divided into groups each including several consecutive frequency entries and locally sorted in each group. Specifically, the compressor 15 sorts the frequency entries using the frequency values in each group in the frequency table 71 (step S206). For example, the compressor 15 rearranges the frequency entries in each group so that the frequency entry including the maximum frequency value is located at the highest position and the frequency entry including the minimum frequency value is located at the lowest position. Alternatively, the compressor 15 may rearrange the frequency entries in each group in descending order based on the frequency values. Then, the compressor 15 exchanges the frequency entries between adjacent groups (step S207). The compressor 15 exchanges (that is, rearranges) the lowest frequency entry in a certain group and the highest frequency entry in the lower group adjacent to the group, for example.

Next, the compressor 15 determines whether or not the input of symbols is completed (step S208). When the input of symbols is not completed (NO in step S208), the compressor 15 returns to step S201 and updates the frequency table 71 using the next input symbol.

When the input of symbols is completed (YES in step S208), the compressor 15 ends the frequency table update process.

As described above, the frequency value reduction conversion process 1-A executed in the compressor in the memory system according to the comparative example described with reference to the flowchart of FIG. 3 starts after waiting for the update of the frequency table 71 according to the input symbol, whereas the frequency value reduction conversion process 1-B executed in the compressor 15 in the memory system 3A according to the present embodiment can start using the number of input symbols without waiting for the update of the frequency table 71. As a result, in the present embodiment, it is possible to improve the throughput of the adaptive entropy coding.

Further, the sort process 2-A executed in the compressor in the memory system according to the comparative example described above with reference to the flowchart of FIG. 3 completely sorts all the frequency entries in the frequency table 71 based on the frequency values, whereas the sort process 2-B executed in the compressor 15 in the memory system 3A according to the present embodiment divides the frequency entries in the frequency table 71 into groups each including several consecutive frequency entries, sorts the divided frequency entries in each group, and then exchanges the frequency entries between adjacent groups. As a result, in the present embodiment, the throughput of the adaptive entropy coding can be improved and the circuit size can be reduced.

Note that the compressor 15 (or the decompressor 16) in the memory system 3A according to the present embodiment may be configured to realize either the frequency value reduction conversion process 1-B in FIG. 3 or the sort process 2-B in FIG. 3. Each of the configurations of the compressor 15 and the decompressor 16 will be specifically described below.

(Compressor)

Figures 5, 6:
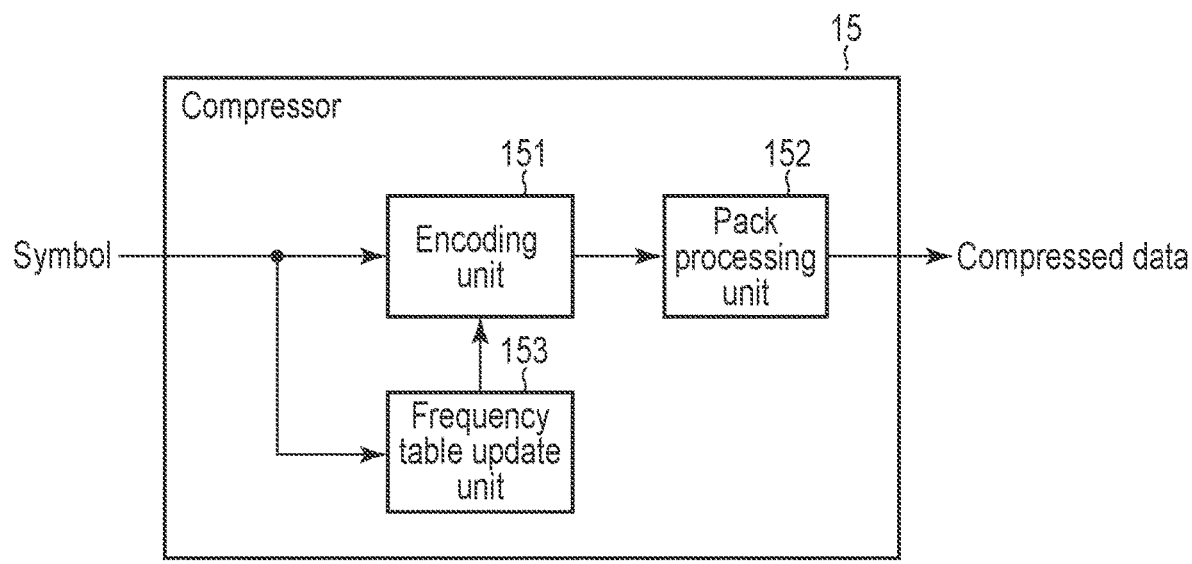
FIG. 5 is a block diagram illustrating a configuration example of the compressor in the memory system of the first embodiment.
FIG. 6 is a diagram illustrating an example in which frequency entries in a frequency table are divided into groups.

FIG. 5 is a block diagram illustrating a configuration example of the compressor 15. The compressor 15 includes, for example, an encoding unit 151, a pack processing unit 152, and a frequency table update unit 153.

The encoding unit 151 converts a symbol, which is input to the compressor 15, into a codeword. More specifically, the encoding unit 151 generates an encoding table for variable length coding, using the frequency table 71. The encoding table is a table for specifying a codeword corresponding to a symbol.

For example, the encoding unit 151 uses the frequency table 71 in which frequency entries are arranged in a first order. Each of the frequency entries includes a symbol and a frequency value associated with the symbol. By using the frequency table 71, the encoding unit 151 assigns codewords to symbols, respectively, which are included in the frequency entries, according to the first order. Each frequency entry in the frequency table 71 belongs to one of groups. Each group includes several consecutive frequency entries in the frequency table 71.

FIG. 6 illustrates an example in which frequency entries in the frequency table 71 are divided into groups. This frequency table 71 includes eight frequency entries 310 to 317. Each frequency entry 310 to 317 belongs to one of two groups. The number of frequency entries belonging to each group may be set freely.

In the example illustrated in FIG. 6, the four frequency entries 310 to 313 belong to group 0. Further, the following four frequency entries 314 to 317 belong to group 1 lower than the group 0.

The encoding unit 151 generates an encoding table by, for example, assigning a codeword to each symbol according to a specific rule. This specific rule is, for example, a rule that a symbol in a higher frequency entry (that is, symbol having a higher frequency value) is assigned a codeword having a shorter entropy code length, and a symbol in a lower frequency entry (that is, symbol having a lower frequency value) is assigned a codeword having a longer entropy code length.

For example, the encoding unit 151 assigns a codeword of first code length to each of the symbols included in the frequency entries 310 to 313 belonging to the group 0. In addition, the encoding unit 151 assigns a codeword having a second code length longer than the first code length to each of the symbols included in the frequency entries 314 to 317 belonging to the group 1.

Alternatively, the encoding unit 151 may use a fixed tree structure comprising leaf nodes that are associated with codewords, respectively, and assign the codewords to the symbols, respectively, which are included in the frequency entries 310 to 318. For example, the encoding unit 151 assigns codewords, which are associated with leaf nodes constituting a first subtree of the tree structure, to the symbols, respectively, which are included in the frequency entries 310 to 313 belonging to the group 0. In addition, the encoding unit 151 assigns codewords, which are associated with leaf nodes constituting a second subtree of the tree structure, to the symbols, respectively, which are included in the frequency entries 314 to 317 belonging to the group 1.

Figure 7:
FIG. 7 is a diagram illustrating a configuration example of an encoding table.

FIG. 7 illustrates a configuration example of an encoding table 72. The encoding table 72 includes entries corresponding to symbols. Each entry includes two fields: a symbol field; and a codeword field.

In the entry corresponding to a certain symbol, the symbol field indicates the symbol. In this entry, the codeword field indicates a codeword into which the symbol is to be converted.

The encoding unit 151 assigns a shorter codeword to a symbol that is associated with a higher frequency value. When using the frequency table 71 illustrated in FIG. 6, the encoding unit 151 assigns the shortest codeword C0 to the symbol S0 that is associated with the maximum frequency value (=70), for example, as illustrated in FIG. 7. Further, the encoding unit 151 assigns the longest codeword C7 to the symbol S7 that is associated with the minimum frequency value (=10), for example.

Figure 8:
FIG. 8 is a diagram illustrating another configuration example of the encoding table.

In addition, FIG. 8 illustrates another configuration example of an encoding table 73. The encoding table 73 includes entries corresponding to frequency entry numbers. Each of the entries includes two fields: a frequency entry number field; and a codeword field. As described above, a frequency entry number is a number that specifies one frequency entry on the basis of the order of the frequency entries arranged in the frequency table 71.

In the entry corresponding to a certain frequency entry number, the frequency entry number field indicates the frequency entry number. In this entry, the codeword field indicates a codeword into which the symbol, which is included in the frequency entry in the frequency table 71 specified by the frequency entry number, is to be converted.

The order of the frequency entries in the frequency table 71 may be changed depending on the input of symbols to the compressor 15. On the other hand, the order of the entries in the encoding table 73 is not changed (that is, fixed). When the order of a frequency entry including a certain symbol is changed in the frequency table 71, the frequency entry number corresponding to the frequency entry is changed. Therefore, before and after the frequency entry number corresponding to a certain frequency entry is changed, the codeword assigned to the symbol in the frequency entry is also changed.

Therefore, even when using the encoding table 73, the encoding unit 151 can assign a codeword to each symbol according to the order of the frequency entry including the symbol in the frequency table 71.

Note that the frequency table 71 may not include all frequency entries corresponding to all symbols that may be generated. The frequency table 71 may include, for example, only higher frequency entries to which short codewords are assigned and may not include lower frequency entries to which long codewords are assigned. The frequency table 71 does not include, for example, frequency entries belonging to the lowest group to which the codewords having the longest code length are assigned.

As a result, it is possible to reduce the circuit scale since a circuit (or circuits) for processing frequency entries, which correspond to codewords each having a long code length and have less contribution to the compression ratio, is not provided in the compressor 15, while increasing the compression ratio by converting symbols in higher frequency entries into codewords each having a short code length.

The encoding unit 151 converts an input symbol into a codeword on the basis of the assignment of the symbols and the codewords. More specifically, the encoding unit 151 acquires the codeword corresponding to the input symbol by using the encoding table 72 of FIG. 7, for example. Alternatively, the encoding unit 151 acquires the codeword corresponding to the frequency entry number of the frequency entry including the input symbol by using the encoding table 73 of FIG. 8. Then, the encoding unit 151 outputs the acquired codeword to the pack processing unit 152.

The pack processing unit 152 may collect one or more codewords output from the encoding unit 151 and output the collected codewords as compressed data (compressed stream) for each specific data size. For example, when the compressed data is data obtained by compressing data to be written into the NAND flash memory 5, the write control module 121 of the CPU 12 may write the compressed data, which includes one or more codewords, into the NAND flash memory 5 through the NAND I/F 13.

The frequency table update unit 153 updates the frequency table 71 when a symbol is input.

Figure 9:
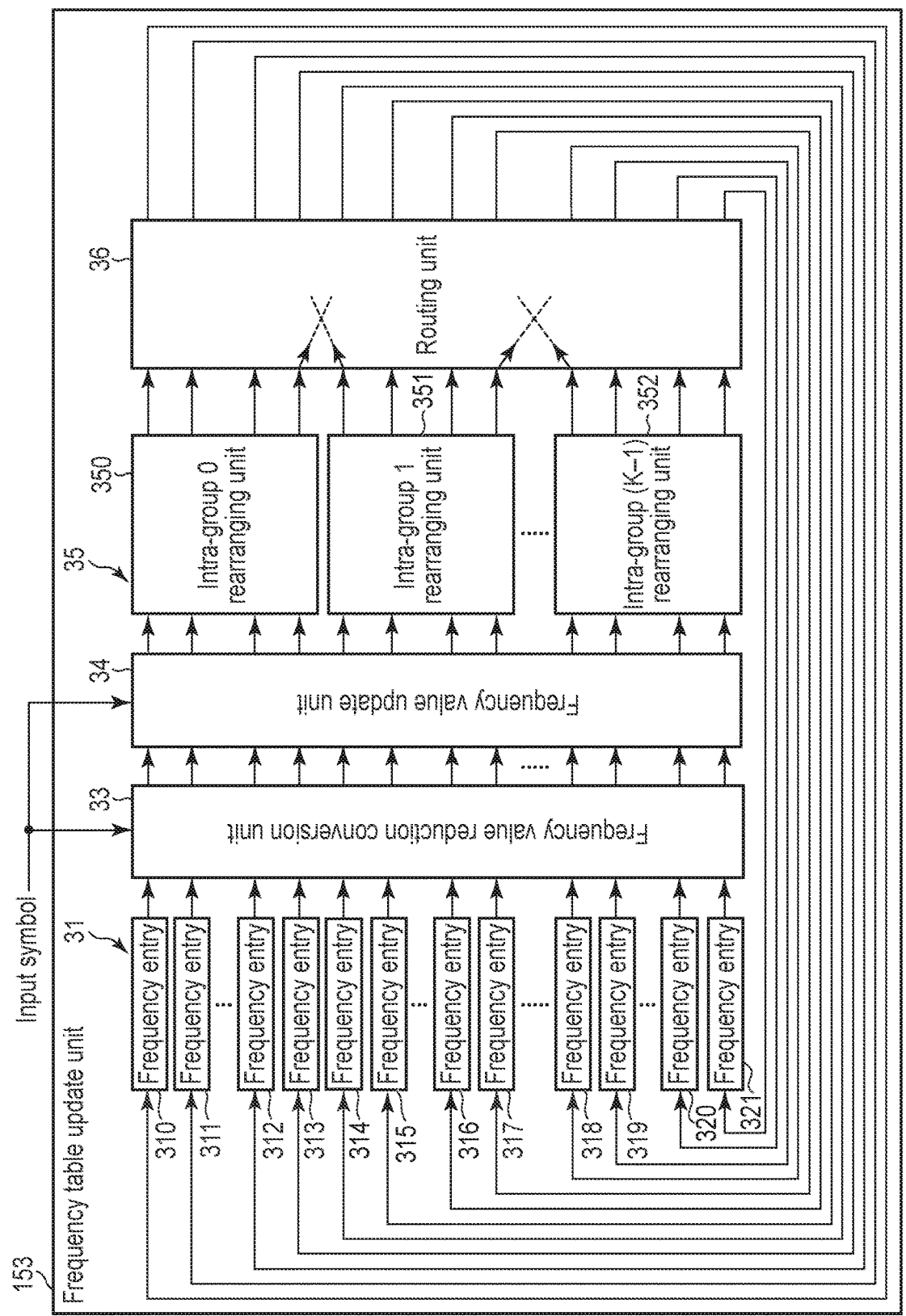
FIG. 9 is a block diagram illustrating a configuration example of a frequency table update unit.

FIG. 9 is a block diagram illustrating an example of the configuration of the frequency table update unit 153. The frequency table update unit 153 includes, for example, a frequency value reduction conversion unit 33, a frequency value update unit 34, intra-group rearranging units 350, 351, and 352, and a routing unit 36. Each of these units is realized as a circuit, for example.

A symbol and the frequency entries 31, which constitute the frequency table 71, are input to the frequency value reduction conversion unit 33. The total number of the frequency entries 31 constituting the frequency table 71 is N, for example. The input of each of the frequency entries 31 to the frequency value reduction conversion unit 33 is realized, for example, by causing a flip-flop circuit storing contents of the frequency entry to output the contents to the frequency value reduction conversion unit 33. The flip-flop circuit may output the contents of the frequency entry to a unit other than the frequency value reduction conversion unit 33 in the frequency table update unit 153. That is, the flip-flop circuit may be inserted at any position in the loop process by the frequency table update unit 153. The contents of the frequency entry updated by the frequency table update unit 153 are written back to this flip-flop circuit.

The order of the frequency entries 31 that are arranged in the vertical direction and illustrated in FIG. 9 is the same as the order in which the frequency entries 31 are arranged in the frequency table 71. The N frequency entries 31 constituting the frequency table 71 are also referred to as the frequency entries 31 below.

The frequency entries 31 in the frequency table 71 are divided into groups (here, K groups) each including several consecutive frequency entries on the basis of the order of arrangement in the frequency table 71. In the example illustrated in FIG. 9, the frequency entries 310 to 313 belong to group 0. The frequency entries 314 to 317 belong to group 1 lower than the group 0. The frequency entries 318 to 321 belong to group (K−1) lower than the group 1.

The frequency value reduction conversion unit 33 counts the number of input symbols. The frequency value reduction conversion unit 33 performs conversion for reducing the frequency value in each frequency entry 31 when the counted number of input symbols is greater than or equal to a threshold value. Thereby, the overflow of the frequency values can be avoided. The frequency value reduction conversion unit 33 outputs the frequency entries 31 each including the reduced frequency value to the frequency value update unit 34. Note that when the number of input symbols is smaller than the threshold value, the frequency value reduction conversion unit 33 outputs the input frequency entries 31 to the frequency value update unit 34 as they are. The operation of the frequency value reduction conversion unit 33 corresponds to the frequency value reduction conversion process 1-B described above with reference to the flowchart of FIG. 4.

The frequency value update unit 34 updates (for example, increments) the frequency value of the frequency entry including the input symbol, among the frequency entries 31 output from the frequency value reduction conversion unit 33, and outputs the frequency entry to the intra-group rearranging unit 35. More specifically, the frequency value update unit 34 adds a first value (for example, one) to the frequency value of the frequency entry including the input symbol and outputs the frequency entry to the intra-group rearranging unit 35. In addition, the frequency value update unit 34 outputs the frequency entries each of which does not include the input symbol, among the frequency entries 31 output from the frequency value reduction conversion unit 33, to the intra-group rearranging unit 35 as they are.

Note that the frequency table 71 may further include a frequency entry that belongs to group 2 that is lower than the group 1, the frequency entry being an empty frequency entry that does not include a symbol and a frequency value. When the frequency entries 31 in the frequency table 71 does not include a frequency entry including the input symbol, the frequency value update unit 34 changes the symbol included in the lowest frequency entry in the group 1 to the input symbol (that is, overwrite the symbol with the input symbol). The frequency value update unit 34 may set the first value as the frequency value of the lowest frequency entry in the group 1.

Alternatively, the frequency table 71 may further include: a frequency entry that belongs to the group 2 (that is, middle group) lower than the group 1, includes a symbol, and does not include a frequency value; and a frequency entry that belongs to group 3 (that is, lower group) lower than the group 2, and is an empty frequency entry which does not include a symbol and a frequency value. When the frequency entries 31 does not include a frequency entry including the input symbol, the frequency value update unit 34 adds a frequency entry including the input symbol to the highest position in the group 2 (middle group) and rearranges each of frequency entries, which are at the highest position in the group 2 or lower, to a lower position one by one. The frequency value update unit 34 may set, for example, the first value as the frequency value of the added frequency entry.

The intra-group rearranging unit 35 rearranges the frequency entries 31 output from the frequency value update unit 34 for each group using the frequency values as a key. The intra-group rearranging unit 35 rearranges the frequency entries belonging to the corresponding group so that in the frequency entries, the frequency entry including the maximum frequency value is located at the highest position, and the frequency entry including the minimum frequency value is located at the lowest position. Note that the intra-group rearranging unit 35 maintains the frequency entries other than the frequency entry including the maximum frequency value and the frequency entry including the minimum frequency value in, for example, the original order before the rearrangement. Alternatively, the intra-group rearranging unit 35 may exchange (swap) the highest frequency entry for the frequency entry including the maximum frequency value, exchange the lowest frequency entry for the frequency entry including the minimum frequency value, and maintain locations of the other frequency entries. Further, the intra-group rearranging unit 35 may sort the frequency entries in descending order of the frequency values. Such a rearrangement rule is matched in the intra-group rearranging unit 35 in the compressor 15 and the intra-group rearranging unit 35 in the decompressor 16 to be described later so that the encoding by the compressor 15 is consistent with the decoding by the decompressor 16.

The frequency table update unit 153 is provided with the number of intra-group rearranging units 35 according to the number of groups into which the frequency entries 31 are divided. In the example illustrated in FIG. 9, K intra-group rearranging units 350, 351, and 352 respectively corresponding to K groups are provided in the frequency table update unit 153.

More specifically, an intra-group 0 rearranging unit 350 rearranges the frequency entries 310 to 313 belonging to the group 0 using the frequency values. The intra-group 0 rearranging unit 350 rearranges the frequency entries 310 to 313 so that among the frequency entries 310 to 313, the frequency entry including the maximum frequency value is located at the highest position, and the frequency entry including the minimum frequency value is located at the lowest position. Alternatively, the intra-group 0 rearranging unit 350 may sort the frequency entries 310 to 313 in descending order of the frequency values. The intra-group 0 rearranging unit 350 outputs the rearranged frequency entries 310 to 313 to the routing unit 36.

Note that for the highest group 0, there is no higher group, and therefore swapping frequency entries between the group 0 and a group, which is adjacent to the group 0 and is higher than the group 0, is not performed. Therefore, the intra-group 0 rearranging unit 350 may rearrange the frequency entries 310 to 313 so that the frequency entry including the minimum frequency value is located at the lowest position. That is, in the rearranged frequency entries 310 to 313, the frequency entry including the maximum frequency value does not have to be located at the highest position.

An intra-group 1 rearranging unit 351 rearranges the frequency entries 314 to 317 belonging to the group 1 using the frequency values. The intra-group 1 rearranging unit 351 rearranges the frequency entries 314 to 317 so that among the frequency entries 314 to 317, the frequency entry including the maximum frequency value is located at the highest position, and the frequency entry including the minimum frequency value is located at the lowest position. Alternatively, the intra-group 1 rearranging unit 351 may sort the frequency entries 314 to 317 in descending order of the frequency values. The intra-group 1 rearranging unit 351 outputs the rearranged frequency entries 314 to 317 to the routing unit 36.

An intra-group (K−1) rearranging unit 352 rearranges the frequency entries 318 to 321 belonging to the group (K−1) using the frequency values. The intra-group (K−1) rearranging unit 352 rearranges the frequency entries 318 to 321 so that among the frequency entries 318 to 321, the frequency entry including the maximum frequency value is located at the highest position, and the frequency entry including the minimum frequency value is located at the lowest position. Alternatively, the intra-group (K−1) rearranging unit 352 may sort the frequency entries 318 to 321 in descending order of the frequency values. The intra-group (K−1) rearranging unit 352 outputs the rearranged frequency entries 318 to 321 to the routing unit 36.

Note that for the lowest group (K−1), there is no lower group, and therefore swapping frequency entries between the group (K−1) and a group, which is adjacent to the group (K−1) and is lower than the group (K−1), is not performed. Therefore, the intra-group (K−1) rearranging unit 352 may rearrange the frequency entries 318 to 321 so that the frequency entry including the maximum frequency value is located at the highest position. That is, in the rearranged frequency entries 318 to 321, the frequency entry including the minimum frequency value does not have to be located at the lowest position.

The routing unit 36 swaps (exchanges) frequency entries between adjacent groups. That is, the routing unit 36 rearranges a frequency entry of a certain group and a frequency entry of another group adjacent to the group. The two frequency entries to be rearranged are adjacent (consecutive) across the groups, for example.

Specifically, the routing unit 36 exchanges the lowest frequency entry of the group 0 for the highest frequency entry of the group 1 that is adjacent to the group 0 and is lower than the group 0, and output the exchanged entries. The routing unit 36 exchanges the lowest frequency entry of the group 1 for the highest frequency entry of a group that is adjacent to the group 1 and is lower than the group 1 (for example, group (K−1)), and output the exchanged entries. In addition, the routing unit 36 also outputs other frequency entries that are not to be swapped, as they are. Note that the frequency entries exchanged by the routing unit 36 are not limited to the example described above, and may be freely designated, for example, via an interface for rewriting the configuration of the routing unit 36. That is, the routing operation by the routing unit 36 may be freely changed via this interface.

The frequency entries 31 sorted in a certain order (In-Place Sort) and output by the routing unit 36 are written back to the frequency table 71. In response to the next input of a symbol, this frequency table 71 is used for encoding the symbol and is further updated. That is, the frequency entries 31 output by the routing unit 36 are input to the frequency value reduction conversion unit 33 at the time of the next symbol input. The frequency table update unit 153 updates the frequency table 71 every time a symbol is input.

With the configuration of the frequency table update unit 153 described above, the frequency table update process executed in the compressor 15 in the memory system 3A according to the present embodiment illustrated in FIG. 4 can be realized. That is, the frequency value reduction conversion unit 33 determines whether or not the reduction of frequency values is necessary by using the counted number of input symbols without waiting for the update of the frequency table 71, and reduces the frequency value in each frequency entry 31 when the number of input symbols is larger than or equal to the threshold value. Further, the intra-group rearranging units 350, 351, and 352, and the routing unit 36 locally sort frequency entries for each group and swap frequency entries between adjacent groups. As a result, the throughput of the adaptive entropy coding can be improved and the circuit scale can be reduced.

Figure 10:
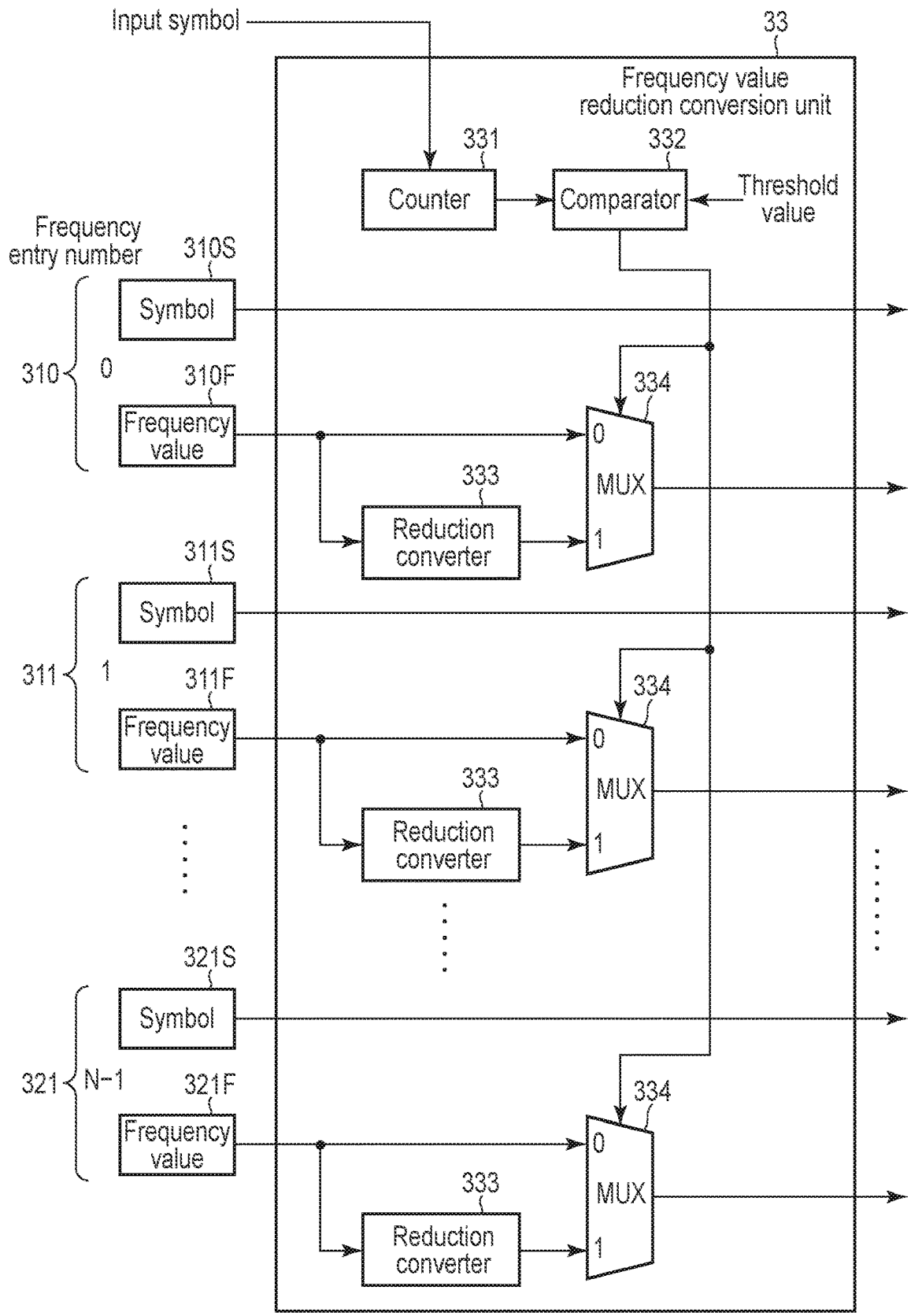
FIG. 10 is a block diagram illustrating a configuration example of a frequency value reduction conversion unit.

FIG. 10 is a block diagram illustrating a circuit configuration example of the frequency value reduction conversion unit 33. The frequency value reduction conversion unit 33 includes, for example, a counter 331, a comparator 332, N reduction converters 333, and N multiplexers (MUXs) 334. Note that the frequency table 71 is constituted by N frequency entries. That is, the frequency value reduction conversion unit 33 is provided with N reduction converters 333 and N MUXs 334 to perform reduction conversions on N frequency entries (more specifically, N frequency values). The frequency values 310F, 311F, . . . , 321F included in the frequency entries 310, 311, . . . , 321, respectively, are input to the corresponding reduction converter 333 and MUX 334.

The counter 331 counts the number of symbols input to the frequency value reduction conversion unit 33.

The comparator 332 outputs the result of comparing the number of input symbols counted by the counter 331 and the threshold value to each of the N multiplexers 334. When each frequency value 310F, 311F, . . . , 321F is, for example, 8-bit data, the threshold value is 255. The comparison result by the comparator 332 includes, for example different values depending on whether or not the number of input symbols is greater than or equal to the threshold value. When the comparator 332 determines that the number of input symbols is greater than or equal to the threshold value, the counter 331 resets the counted number of input symbols (that is, sets the number of input symbols to zero).

Each reduction converter 333 performs conversion to reduce the input frequency value. That is, the reduction converter 333 corresponding to the frequency entry 310 reduces the frequency value 310F in the frequency entry 310. The reduction converter 333 corresponding to the frequency entry 311 reduces the frequency value 311F in the frequency entry 311. In addition, the reduction converter 333 corresponding to the frequency entry 321 reduces the frequency value 321F in the frequency entry 321.

Each reduction converter 333 multiplies the input frequency value by a specific ratio α (for example, 0.7) to reduce the frequency value. Each reduction converter 333 may subtract a second value (for example, 50) from the input frequency value to reduce the frequency value. Alternatively, each reduction converter 333 may subtract a frequency value in a specific frequency entry from the input frequency value to reduce the input frequency value.

Each MUX 334 uses the comparison result by the comparator 332 to output, to the frequency value update unit 34, either the original frequency value 310F, 311F, . . . , 321F, which is included in the frequency entry and is the frequency value before the reduction converter 333 subtracts the second value, or the reduced frequency value 310F, 311F, . . . , 321F by the reduction converter 333. Specifically, when the comparison result by the comparator 332 indicates that the number of input symbols is greater than or equal to the threshold value, the MUXs 334 output the reduced frequency values 310F, 311F, . . . , 321F, respectively. On the other hand, when the comparison result by the comparator 332 indicates that the number of input symbols is less than the threshold value, the MUXs 334 output the original frequency values 310F, 311F, . . . , 321F, respectively, which are the frequency values before the reduction converters 333 subtract the second value.

Note that the frequency value reduction conversion unit 33 outputs the symbols 310S, 311S, . . . , 321S in the input frequency entries 310, 311, . . . , 321, to the frequency value update unit 34 as they are.

FIG. 11 illustrates an example in which the frequency value reduction conversion unit 33 reduces the frequency value of each frequency entry 31 in the frequency table 71. Here, the case where the reduction converter 333 multiplies a frequency value by a specific ratio α to reduce the frequency value is exemplified. Also, a is 0.5.

As illustrated in FIG. 11, the frequency value included in each frequency entry 31 is reduced by being multiplied by a. For example, the frequency value of the frequency entry 310 corresponding to the frequency entry number 0 is reduced from 70 to 35. In addition, for example, the frequency value of the frequency entry 317 corresponding to the frequency entry number 7 is reduced from 10 to 5.

Figure 12:
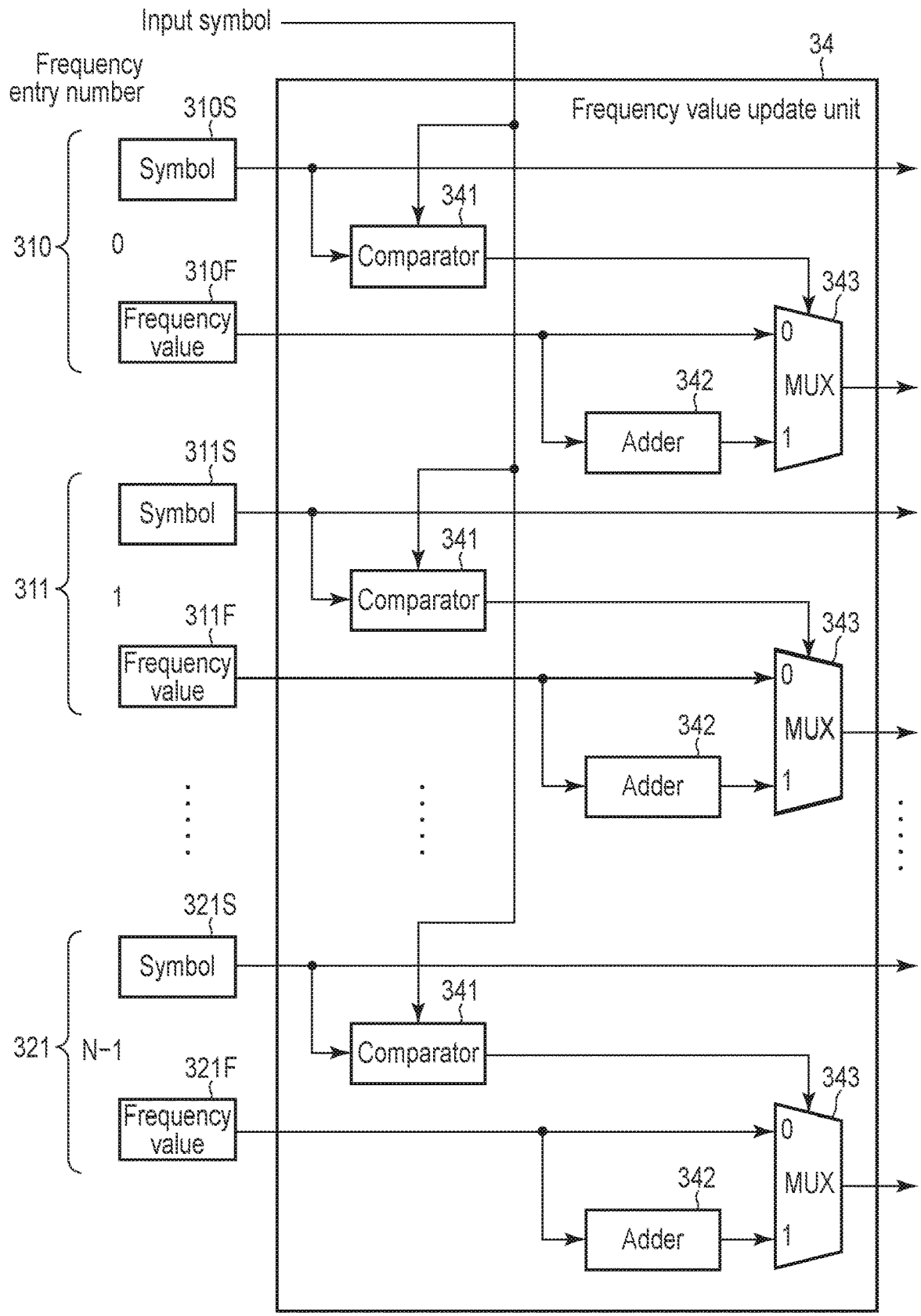
FIG. 12 is a block diagram illustrating a configuration example of a frequency value update unit.

FIG. 12 is a block diagram illustrating a circuit configuration example of the frequency value update unit 34. The frequency value update unit 34 updates the frequency value in the frequency entry corresponding to the input symbol. As described above, the frequency table 71 is constituted by N frequency entries. The frequency value update unit 34 includes, for example, N comparators 341, N adders 342, and N MUXs 343. The frequency value update unit 34 includes N comparators 341, N adders 342, and N MUXs 343 to update any one of N frequency entries (more specifically, N frequency values). That is, for each frequency entry, a comparator 341, an adder 342, and a MUX 343 determine whether or not the frequency value needs to be updated, and update the frequency value when it is determined that the frequency value needs to be updated.

The frequency entries 310, 311, . . . , 321 output by the frequency value reduction conversion unit 33 are input to the frequency value update unit 34. More specifically, the symbol 310S, 311S, . . . , 321S included in each of the frequency entries 310, 311, . . . , 321 is input to the corresponding comparator 341. The frequency value 310F, 311F, . . . , 321F included in each of the frequency entries 310, 311, . . . , 321 is input to the corresponding adder 342 and MUX 343.

Each comparator 341 outputs the result obtained by comparing the symbol in the corresponding frequency entry with the input symbol, to the connected multiplexer 343. The comparison result by the comparator 341 includes, for example, different values depending on whether or not the symbol in the frequency entry matches the input symbol.

Each adder 342 adds a first value (for example, one) to the input frequency value. That is, the adder 342 corresponding to the frequency entry 310 adds the first value to the frequency value 310F in the frequency entry 310. The adder 342 corresponding to the frequency entry 311 adds the first value to the frequency value 311F in the frequency entry 311. In addition, the adder 342 corresponding to the frequency entry 321 adds the first value to the frequency value 321F in the frequency entry 321.

Each MUX 343 uses the comparison result by the connected comparator 341 to output, to the intra-group rearranging unit 35, either the original frequency value 310F, 311F, . . . , 321F, which is in the frequency entry 310, 311, . . . , 321 and is the frequency value before the adder 342 adds the first value, or the added frequency value 310F, 311F, . . . , 321F by the adder 342. Specifically, when the comparison result by the comparator 341 indicates that the symbol in the frequency entry matches the input symbol, the corresponding MUX 334 outputs the added frequency value. On the other hand, when the comparison result by the comparator 341 indicates that the symbol in the frequency entry is different from the input symbol, the corresponding MUX 334 outputs the original frequency value which is the frequency value before the adder 342 adds the first value.

For example, the case where the input symbol matches the symbol 310S in the highest frequency entry 310 will be described. In this case, the MUX 343 corresponding to the frequency entry 310 outputs the added frequency value 310F. Further, since the input symbol is different from the symbol 311S in the second frequency entry 311, the MUX 334 corresponding to this frequency entry 311 outputs the original frequency value 311F, which is the frequency value in the frequency entry 311 and before the adder 342 adds the first value. Similarly, since the input symbol is different from the symbol 321S in the lowest frequency entry 321, the MUX 334 corresponding to this frequency entry 321 outputs the original frequency value 321F, which is the frequency value in the frequency entry 321 and before the adder 342 adds the first value.

Note that the frequency value update unit 34 outputs the symbols 310S, 311S, . . . , 321S in the input frequency entries 310, 311, . . . , 321, to the intra-group rearranging unit 35 as they are.

FIG. 13 illustrates an example in which the frequency value update unit 34 updates the frequency value in the frequency entry corresponding to the input symbol in the frequency table 71. Here, the case where the input symbol is the symbol S5 is exemplified. In addition, the first value added to the frequency value is one.

As illustrated in FIG. 13, one is added to the frequency value of the frequency entry 315 corresponding to the input symbol S5, and thereby the frequency value changes from 20 to 21. Further, the frequency values of the other frequency entries 310 to 314, 316, and 317 that do not correspond to the input symbol S5 are not changed.

FIG. 14 illustrates an example in which the frequency entries 310 to 317 in the frequency table 71 are rearranged for each group by the intra-group rearranging units 35.

After the first value is added to the frequency value corresponding to the input symbol by the frequency value update unit 34, the intra-group 0 rearranging unit 350 rearranges the frequency entries 310 to 313 belonging to the group 0 in the frequency table 71 using the frequency values included in the frequency entries 310 to 313. The intra-group 0 rearranging unit 350 rearranges the frequency entries 310 to 313 in order based on the frequency values (for example, descending order of the frequency values). Alternatively, the intra-group 0 rearranging unit 350 may rearrange the frequency entries 310 to 313 so that among the frequency entries 310 to 313, the frequency entry 310 including the maximum frequency value is located at the highest position, and the frequency entry 313 including the minimum frequency value is located at the lowest position.

In addition, after the first value is added to the frequency value corresponding to the input symbol by the frequency value update unit 34, the intra-group 1 rearranging unit 351 rearranges the frequency entries 314 to 317 belonging to the group 1 lower than the group 0 in the frequency table 71 using the frequency values included in the frequency entries 314 to 317. The intra-group 1 rearranging unit 351 rearranges the frequency entries 314 to 317 in order based on the frequency values. Alternatively, the intra-group 1 rearranging unit 351 may rearrange the frequency entries 314 to 317 so that among the frequency entries 314 to 317, the frequency entry 315 including the maximum frequency value is located at the highest position, and the frequency entry 317 including the minimum frequency value is located at the lowest position.

Figures 15, 16:
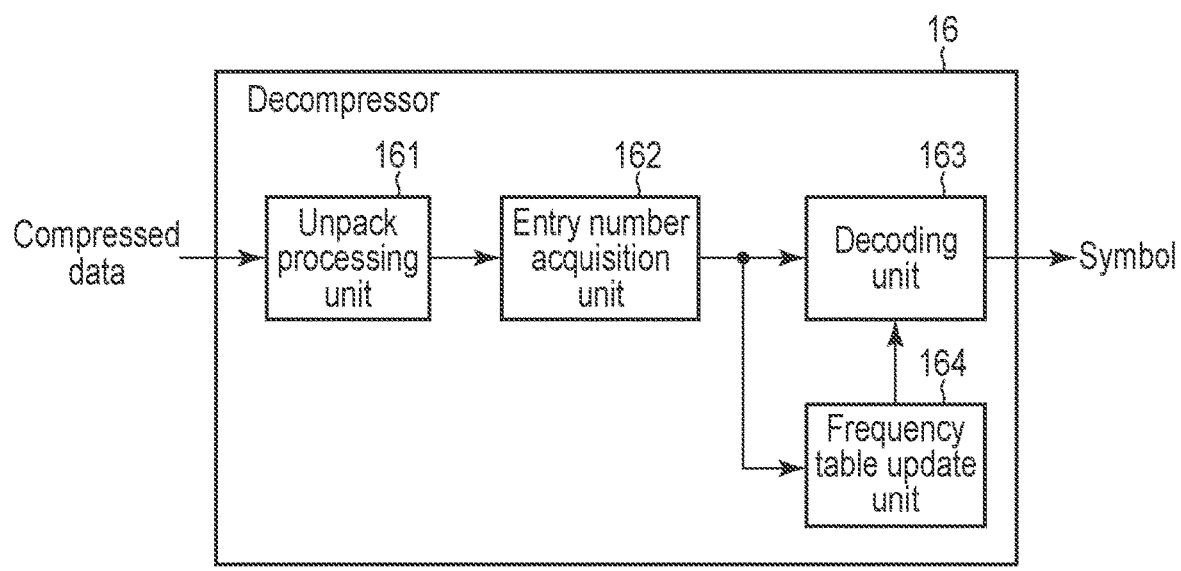
FIG. 15 is a diagram illustrating an example in which the frequency entries are routed by a routing unit.
FIG. 16 is a block diagram illustrating a configuration example of a decompressor in the memory system of the first embodiment.

FIG. 15 illustrates an example in which the routing unit 36 routes the frequency entries 310 to 317 in the frequency table 71.

In the frequency table 71 rearranged by the intra-group 0 rearranging unit 350 and the intra-group 1 rearranging unit 351, the routing unit 36 exchanges (swaps) at least one of the frequency entries 310 to 313 of the group 0 for at least one of the frequency entries 314 to 317 of the group 1. For example, in the frequency table 71, the routing unit 36 exchanges the frequency entry 313 that includes the minimum frequency value among the frequency entries 310 to 313 of the group 0 (that is, the lowest frequency entry 313 of the group 0) for the frequency entry 315 that includes the maximum frequency value among the frequency entries 314 to 317 of the group 1 (that is, the highest frequency entry 315 of the group 1).

Alternatively, in the frequency table 71, the routing unit 36 may exchange the frequency entry 313 including the minimum frequency value for the frequency entry 315 including the maximum frequency value when the minimum frequency value included in the frequency entries 310 to 313 of the group 0 (here, 20) is smaller than the maximum frequency value included in the frequency entries 314 to 317 of the group 1 (here, 21). Note that when the minimum frequency value in the frequency entries 310 to 313 of the group 0 is greater than or equal to the maximum frequency value in the frequency entries 314 to 317 of the group 1, the routing unit 36 does not exchange the frequency entry including the minimum frequency value for the frequency entry including the maximum frequency value.

In the frequency table 71 updated by the frequency value reduction conversion unit 33, the frequency value update unit 34, the intra-group rearranging unit 35, and the routing unit 36, the encoding unit 151 in the compressor 15 assigns symbols to codewords, respectively, according to the order in which the frequency entries are arranged, and generates the encoding table 72 or 73. The configurations of the encoding tables 72 and 73 are as described above with reference to FIGS. 7 and 8. The encoding unit 151 can convert the next input symbol into a codeword on the basis of the assignment indicated by the encoding table 72 or 73.

With the configuration described above, the compressor 15 can update the frequency table 71 in accordance with an input symbol while converting (that is, encoding) the input symbol into a codeword. The process of converting an input symbol into a codeword and updating the frequency table 71, in response to one input of the symbol is called a single cycle of the compression process. The compressor 15 (more specifically, frequency table update unit 153) may swap the frequency entries between two adjacent groups during the single cycle of the compression process. Note that the compressor 15 may be configured as a circuit that swaps frequency entries between groups in multiple cycles of the compression process according to an allowable coding throughput.

Note that in the above description, the case where one symbol is input in a symbol input for a single cycle is exemplified, but multiple symbols may be input in the symbol input for the single cycle. In that case, the encoding unit 151 converts the multiple symbols into multiple codewords, respectively. Further, the frequency value reduction conversion unit 33 and the frequency value update unit 34 may operate on the basis of the multiple symbols to update the frequency values in the frequency entries. The subsequent operations of the intra-group rearranging unit 35 and the routing unit 36 are as described above.

Further, either the improvement by the frequency value reduction conversion unit 33 or the improvement by the intra-group rearranging unit 35 and the routing unit 36 may be applied to the frequency table update unit 153.

(Decompressor)

FIG. 16 is a block diagram illustrating a configuration example of the decompressor 16. The decompressor 16 includes, for example, an unpack processing unit 161, an entry number acquisition unit 162, a decoding unit 163, and a frequency table update unit 164.

The unpack processing unit 161 acquires a codeword to be decoded by extracting data in units of a codeword from compressed data (compressed stream) that is input to the decompressor 16. The compressed data may include, not only data corresponding to codewords, but also control signals and the like. Therefore, the unpack processing unit 161 extracts, from the compressed data, data corresponding to a codeword generated by encoding a symbol. The compressed data is, for example, data read from the NAND flash memory 5 by the read control module 122 of the CPU 12 in accordance with a read command received from the host 2.

The entry number acquisition unit 162 acquires a frequency entry number corresponding to the acquired codeword. The frequency entry number is used for specifying one of the frequency entries 31 according to the order in which the frequency entries 31 are arranged in the frequency table 71. Each codeword used in the memory system 3A can have a corresponding fixed frequency entry number, or determine a corresponding frequency entry number on the basis of a specific rule (for example, a rule in which a codeword with a shorter code length is assigned a smaller frequency entry number). Therefore, the entry number acquisition unit 162 can convert a variable-length codeword into a fixed-length frequency entry number.

As described above with reference to FIG. 6, each frequency entry 31 in the frequency table 71 belongs to any one of the groups. Each group includes several consecutive frequency entries in the frequency table 71.

When specifying one of the frequency entries 310 to 313 belonging to the group 0, the entry number acquisition unit 162 acquires a frequency entry number corresponding to a codeword of first code length. In addition, when specifying one of the frequency entries 314 to 317 belonging to the group 1 lower than the group 0, the entry number acquisition unit 162 acquires a frequency entry number corresponding to a codeword having second code length longer than the first code length.

Alternatively, the entry number acquisition unit 162 may use a fixed tree structure comprising leaf nodes that are associated with codewords, respectively, to acquire the frequency entry number corresponding to the acquired codeword. For example, when specifying one of the frequency entries 310 to 313 belonging to the group 0, the entry number acquisition unit 162 acquires a frequency entry number corresponding to a codeword that is associated with one of leaf nodes constituting a first subtree of the tree structure. In addition, when specifying one of the frequency entries 314 to 317 belonging to the group 1 lower than the group 0, the entry number acquisition unit 162 acquires a frequency entry number corresponding to a codeword that is associated with one of leaf nodes constituting a second subtree of the tree structure.

The decoding unit 163 specifies the frequency entry corresponding to the acquired frequency entry number from the frequency table 71, and acquires the symbol included in the frequency entry. As a result, the decoding unit 163 can convert the codeword extracted from the compressed data into the symbol.

The operation of the frequency table update unit 164 is similar to the operation of the frequency table update unit 153 of the compressor 15 except that the decode symbol or the frequency entry number corresponding to the decode symbol (that is, the frequency entry number acquired by the entry number acquisition unit 162) is used instead of an input symbol. Hereinafter, with respect to the operation of the frequency table update unit 164, the difference from the frequency table update unit 153 of the compressor 15 will be mainly described.

The frequency value reduction conversion unit 33 in the frequency table update unit 164 reduces each of the frequency values included in the frequency entries 31 in the frequency table 71 when, for example, the number of symbols (decode symbols) obtained in the conversion by the decoding unit 163 becomes greater than or equal to a threshold value. Alternatively, the frequency value reduction conversion unit 33 may reduce each of the frequency values included in the frequency entries 31, when the number of frequency entry numbers input to the frequency value reduction conversion unit 33 becomes greater than or equal to the threshold value. As the circuit configuration example of the frequency value reduction conversion unit 33 in a case where the decode symbol or the frequency entry number is used, the circuit configuration of the frequency value reduction conversion unit 33 in the compressor 15, which is described above with reference to FIG. 10, may be used by replacing the input symbol with the decode symbol or the frequency entry number.

The frequency value update unit 34 in the frequency table update unit 164 adds the first value (for example, one) to the frequency value associated with the decode symbol in the entry in the frequency table 71. When each frequency value in the frequency table 71 is reduced by the frequency value reduction conversion unit 33, the frequency value update unit 34 adds the first value to the frequency value associated with the decode symbol in the frequency table 71 including each reduced frequency value. As the circuit configuration example of the frequency value update unit 34 in a case where the decode symbol is used, the circuit configuration of the frequency value update unit 34 in the compressor 15, which is described above with reference to FIG. 12, is used by replacing the input symbol with the decode symbol.

The frequency value update unit 34 may add the first value to the frequency value associated with the decode symbol by using the frequency entry number acquired by the entry number acquisition unit 162 without using the decode symbol. In this case, the frequency value update unit 34 adds the first value to the frequency value included in the frequency entry specified by the frequency entry number. By using the frequency entry number, the frequency entry whose frequency value is to be updated (that is, the frequency entry including the decode symbol) can be easily specified. The circuit configuration example of the frequency value update unit 34 in a case where the frequency entry number is used will be described later with reference to FIG. 17.

The operation of the frequency value update unit 34 when there is no frequency entry including the decode symbol in the frequency table 71 is similar to that of the frequency value update unit 34 of the compressor 15.

The operations of the intra-group rearranging units 35 and the routing unit 36 in the frequency table update unit 164 are similar to the operations of the intra-group rearranging units 35 and the routing unit 36 in the frequency table update unit 153 of the compressor 15.

The unpack processing unit 161 acquires the next codeword from the compressed data. The entry number acquisition unit 162 acquires the frequency entry number corresponding to the acquired codeword.

The decoding unit 163 acquires the symbol included in the frequency entry specified by the acquired frequency entry number in the frequency table 71 that is updated by the frequency value reduction conversion unit 33, the frequency value update unit 34, the intra-group rearranging units 35, and the routing unit 36, thereby converting the codeword into the symbol.

Figure 17:
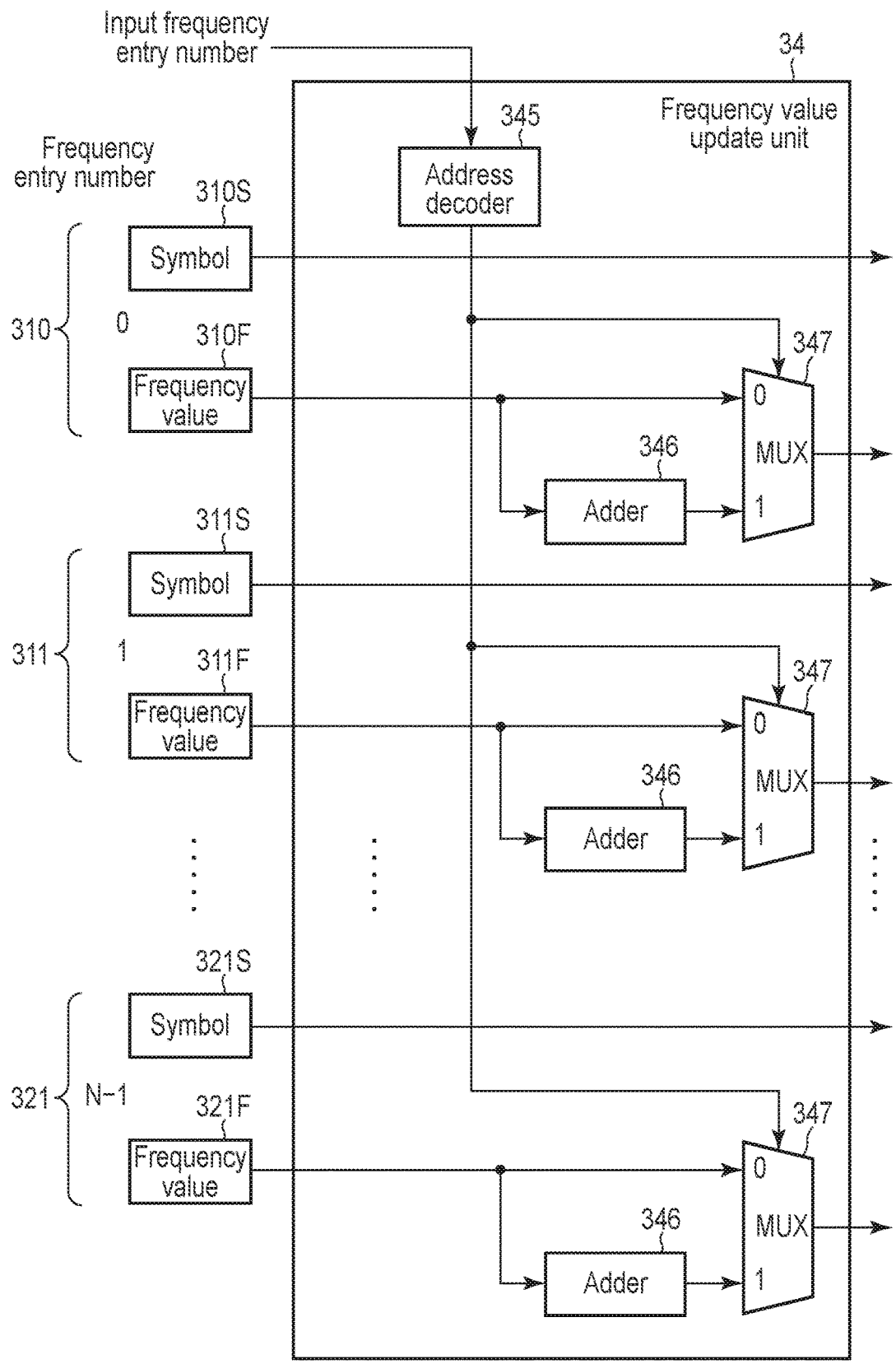
FIG. 17 is a block diagram illustrating another configuration example of the frequency value update unit.

FIG. 17 is a block diagram illustrating a circuit configuration example of the frequency value update unit 34 in the frequency table update unit 164. Here, the case where the frequency value update unit 34 updates a frequency value of a frequency entry corresponding to a frequency entry number is exemplified. The frequency value update unit 34 includes, for example, an address decoder 345, N adders 346, and N MUXs 347. The frequency table 71 is constituted by N frequency entries. The frequency value update unit 34 includes N adders 346 and N MUXs 347 to update any one of N frequency entries (more specifically, N frequency values). That is, for one frequency entry, one adder 346 and one MUX 347 may update the frequency value in the frequency entry. Each of the frequency values 310F, 311F, . . . , 321F included in the frequency entries 310, 311, . . . , 321 is input to the corresponding adder 346 and MUX 347.

The frequency entry number acquired by the entry number acquisition unit 162 is input to the address decoder 345. The address decoder 345 outputs different values for each MUX 347 depending on whether or not the input frequency entry number matches the frequency entry number of each of the frequency entries 310, 311, . . . , 321.

Each adder 346 adds the first value (for example, one) to the input frequency value. That is, the adder 346 corresponding to the frequency entry 310 adds the first value to the frequency value 310F in the frequency entry 310. The adder 346 corresponding to the frequency entry 311 adds the first value to the frequency value 311F in the frequency entry 311. In addition, the adder 346 corresponding to the frequency entry 321 adds the first value to the frequency value 321F in the frequency entry 321.

Each MUX 347 uses the value output from the address decoder 345 to output, to the intra-group rearranging unit 35, either the original frequency value 310F, 311F, . . . , 321F, which is included in the frequency entry 310, 311, . . . , 321 and is the frequency value before the adder 346 adds the first value, or the added frequency value 310F, 311F, . . . , 321F by the adder 346. Specifically, when the value output by the address decoder 345 indicates that the frequency entry number of the frequency entry matches the input frequency entry number, the MUX 347 corresponding to the frequency entry outputs the added frequency value. On the other hand, when the value output by the address decoder 345 indicates that the frequency entry number of the frequency entry is different from the input frequency entry number, the MUX 347 corresponding to the frequency entry outputs the original frequency value which is the frequency value before the adder 346 adds the first value.

For example, the case where the input frequency entry number is zero and corresponds to the highest frequency entry 310 will be described. In this case, the address decoder 345 outputs, to the MUX 347 corresponding to the frequency entry 310, a value indicating that the frequency entry number matching the frequency entry number of the frequency entry 310 is input. In addition, the address decoder 345 outputs, to the MUX 347 corresponding to the second frequency entry 311, a value indicating that the frequency entry number different from the frequency entry number of the frequency entry 311 is input. Similarly, the address decoder 345 outputs, to the MUX 347 corresponding to the lowest frequency entry 321, a value indicating that the frequency entry number different from the frequency entry number of the frequency entry 321 is input.

Then, the MUX 347 corresponding to the frequency entry 310 outputs the added frequency value 310F in accordance with the value that is received from the address decoder 345 and indicates that the matched frequency entry number is input. Further, the MUX 347 corresponding to the second frequency entry 311 outputs the original frequency value 311F which is the frequency value in the frequency entry 311 and before the adder 346 adds the first value, in accordance with the value that is received from the address decoder 345 and indicates that a different frequency entry number is input. Similarly, the MUX 347 corresponding to the lowest frequency entry 321 outputs the original frequency value 321F, which is the frequency value in the frequency entry 321 and before the adder 346 adds the first value, in accordance with the value that is received from the address decoder 345 and indicates that a different frequency entry number is input.

Note that the frequency value update unit 34 outputs the symbols 310S, 311S, . . . , 321S in the input frequency entries 310, 311, . . . , 321 to the intra-group rearranging unit 35 as they are.

In the configuration of the frequency value update unit 34 illustrated in FIG. 17, one address decoder 345 is provided instead of the N comparators 341 provided in the frequency value update unit 34 illustrated in FIG. 12. In the configuration of the frequency value update unit 34 illustrated in FIG. 17, the frequency value to which the first value is to be added, which corresponds to the decode symbol, can be easily determined by the address decoder 345 using the input frequency entry number. Therefore, since it is not necessary to provide N comparators 341 to determine the frequency value in the frequency entry corresponding to the decode symbol, it is possible to reduce the delay to improve the throughput and reduce the circuit scale.

With the configuration described above, the decompressor 16 can update the frequency table 71 according to a decode symbol while converting (that is, decoding) a codeword into the symbol. The processing of converting a codeword into a symbol and updating the frequency table 71 in response to a single input of the codeword is called a single cycle of the decompression process. The decompressor 16 (more specifically, frequency table update unit 164) may swap frequency entries between two adjacent groups during the single cycle of the decompression process. Note that the decompressor 16 may be configured as a circuit that swaps frequency entries between groups in multiple cycles of the decompression process according to an allowable decoding throughput.

In the description described above, the case where one codeword is input in a codeword input for a single cycle is exemplified, but multiple codewords may be input in the codeword input for the single cycle. In that case, the decoding unit 163 converts the codewords into symbols, respectively. Further, the frequency value reduction conversion unit 33 and the frequency value update unit 34 may operate on the basis of the codewords (or the corresponding frequency entry numbers) to update the frequency values in the frequency entries. The subsequent operations of the intra-group rearranging unit 35 and the routing unit 36 are as described above.

Further, either the improvement by the frequency value reduction conversion unit 33 or the improvement by the intra-group rearranging unit 35 and the routing unit 36 may be applied to the frequency table update unit 164.

Second Embodiment

In the first embodiment, the compressor 15 exchanges frequency entries between adjacent groups during a single cycle of the compression process, and the decompressor 16 exchanges frequency entries between adjacent groups during a single cycle of the decompression process. On the other hand, in a second embodiment, a compressor 15 exchanges frequency entries between adjacent groups during two cycles of a compression process, and a decompressor 16 exchanges frequency entries between adjacent groups during two cycles of a decompression process.

(Compressor)

The configuration of the compressor 15 according to the second embodiment is similar to that of the compressor 15 of the first embodiment, and the second embodiment is different from the first embodiment only in an operation of rearranging frequency entries in a group, an operation of exchanging frequency entries between adjacent groups, and an operation of selecting candidates of frequency entries to be exchanged between groups. The compressor 15 according to the second embodiment includes an encoding unit 151 and a pack processing unit 152 similar to those of the compressor 15 according to the first embodiment. Hereinafter, the differences from the first embodiment will be mainly described.

Figure 18:
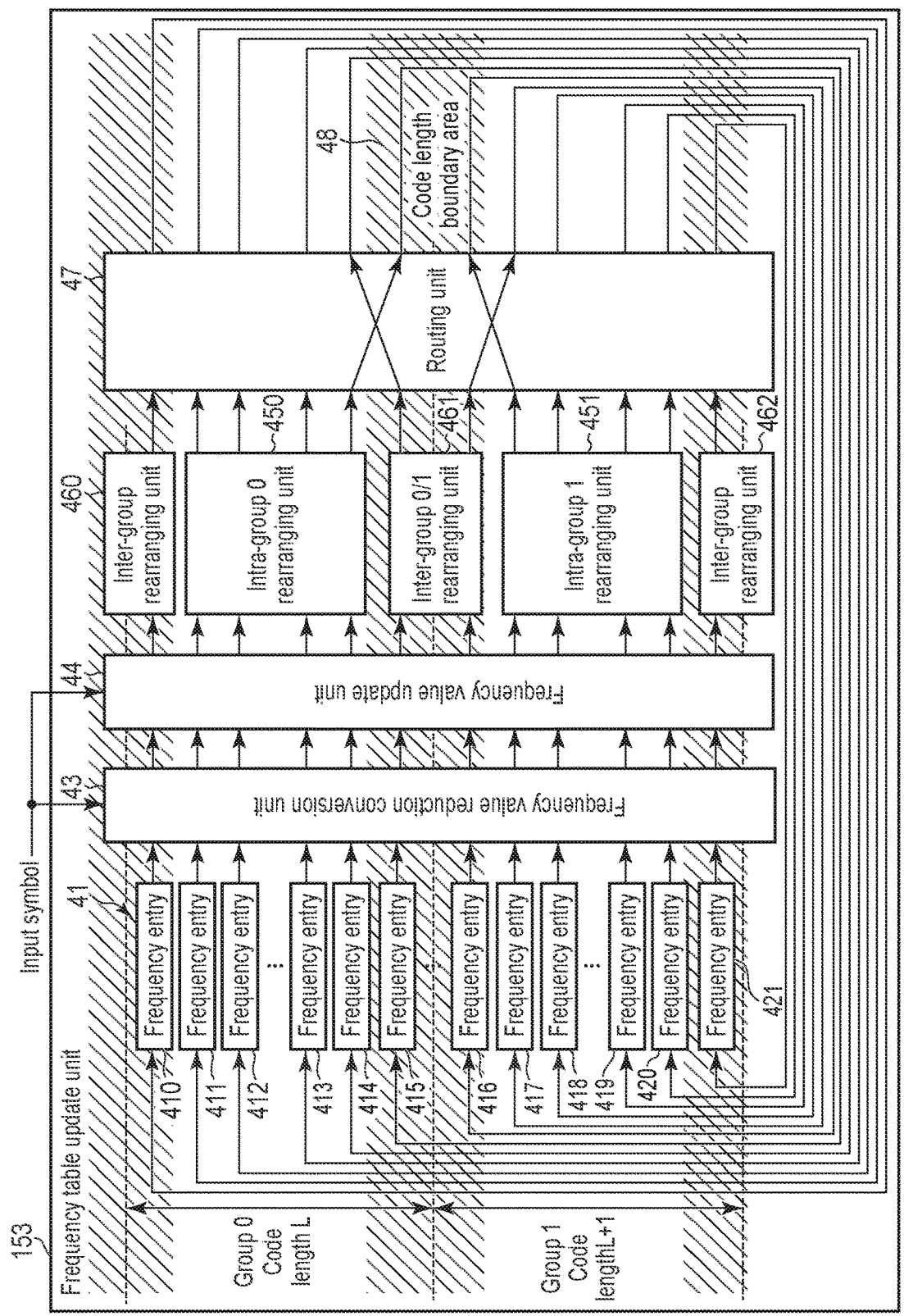
FIG. 18 is a block diagram illustrating a configuration example of a frequency table update unit in a memory system according to a second embodiment.

FIG. 18 is a block diagram illustrating a configuration example of a frequency table update unit 153 in the compressor 15 according to the second embodiment. Here, a case where each of frequency entries 41 in a frequency table 71 belongs to either group 0 or group 1 will be exemplified. Frequency entries 410 to 415 belong to the group 0. Subsequent frequency entries 416 to 421 belong to the group 1 lower than the group 0. A codeword of code length L, for example, is assigned to each of the frequency entries 410 to 415 belonging to the group 0. Further, for example, a codeword of code length L+1 longer than the code length L is assigned to each of the frequency entries 416 to 421 belonging to the group 1.

The frequency table update unit 153 includes, for example, a frequency value reduction conversion unit 43, a frequency value update unit 44, intra-group rearranging units 450 and 451, inter-group rearranging units 460, 461, and 462, and a routing unit 47. Each of these units is realized as a circuit, for example.

The frequency value reduction conversion unit 43 and the frequency value update unit 44 operate similarly to the frequency value reduction conversion unit 33 and the frequency value update unit 34 that are described in the first embodiment.

The frequency table update unit 153 is provided with the number of intra-group rearranging units according to the number of groups into which the frequency entries 41 are divided. For example, when the frequency entries 41 are divided into K groups, the frequency table update unit 153 is provided with K intra-group rearranging units. In addition, an inter-group rearranging unit is also provided for swapping frequency entries between two consecutive groups of the K groups.

In FIG. 18, in order to make the explanation easy to understand, a case where two intra-group rearranging units 450 and 451 respectively corresponding to two groups (that is, the group 0 and the group 1) are provided in the frequency table update unit 153 is exemplified. In addition, an inter-group 0/1 rearranging unit 461 is provided for swapping frequency entries between the group 0 and the group 1.

Note that the frequency table update unit 153 is provided with an inter-group rearranging unit 460 to which several higher frequency entries in the highest group (in FIG. 18, the highest frequency entry 410 in the group 0) are input, and an inter-group rearranging unit 462 to which several lower frequency entries in the lowest group (in FIG. 18, the lowest frequency entry 421 in the group 1) are input. When another group is provided further above the group 0, the inter-group rearranging unit 460 rearranges frequency entries that are consecutive across the group 0 and the other group. When another group is provided further below the group 1, the inter-group rearranging unit 462 rearranges frequency entries that are consecutive across the group 1 and the other group.

After the frequency value update unit 44 adds the first value (for example, one) to the frequency value in the frequency entry including the input symbol, the intra-group rearranging units 450 and 451 rearrange, by using the frequency values, the frequency entries in the frequency table 71 that are obtained by excluding the highest frequency entry and the lowest frequency entry from the frequency entries that belong to the corresponding group. The highest frequency entry and the lowest frequency entry of the frequency entries belonging to each group are included in code length boundary areas 48.

The inter-group rearranging units 460, 461, and 462 rearrange frequency entries that are consecutive across groups (for example, frequency entries in a code length boundary area 48 including a boundary between two adjacent groups) on the basis of the frequency values included in the frequency entries. The frequency entries that are consecutive across the groups are selected as swap target frequency entries in the previous cycle of the compression process. The swap target frequency entries may be swapped between the adjacent groups.

FIG. 19 illustrates an example in which the frequency entries 410 to 421 in the frequency table 71 are rearranged by the intra-group 0 rearranging unit 450, the intra-group 1 rearranging unit 451 and the inter-group 0/1 rearranging unit 461.

After the frequency value update unit 44 adds the first value to the frequency value in the frequency entry including the input symbol, the intra-group 0 rearranging unit 450 rearranges the frequency entries 411 to 414 in the frequency table 71 that are obtained by excluding the highest frequency entry 410 and the lowest frequency entry 415 from the frequency entries 410 to 415 belonging to the group 0, by using the frequency values included in the frequency entries 411 to 414. The intra-group 0 rearranging unit 450 rearranges the frequency entries 411 to 414 in order based on the frequency values included in the frequency entries 411 to 414 (for example, descending order of the frequency values). Alternatively, the intra-group 0 rearranging unit 450 may rearrange the frequency entries 411 to 414 so that among the frequency entries 411 to 414, the frequency entry including the maximum frequency value is located at the highest position, and the frequency entry including the minimum frequency value is located at the lowest position. In the example illustrated in FIG. 19, the frequency entry 412 including the maximum frequency value among the frequency entries 411 to 414 is rearranged with the frequency entry 411.

After the frequency value update unit 44 adds the first value to the frequency value corresponding to the input symbol, the intra-group 1 rearranging unit 451 rearranges the frequency entries 417 to 420 in the frequency table 71 that are obtained by excluding the highest frequency entry 416 and the lowest frequency entry 421 from the frequency entries 416 to 421 that belong to the group 1, by using the frequency values included in the frequency entries 417 to 420. The intra-group 1 rearranging unit 451 rearranges the frequency entries 417 to 420 in order based on the frequency values included in the frequency entries 417 to 420 (for example, descending order of the frequency values). Alternatively, the intra-group 1 rearranging unit 451 may rearrange the frequency entries 417 to 420 so that among the frequency entries 417 to 420, the frequency entry including the maximum frequency value is located at the highest position, and the frequency entry including the minimum frequency value is located at the lowest position. In the example illustrated in FIG. 19, the frequency entry 419 and the frequency entries 417 and 418 are rearranged so that among the frequency entries 417 to 420, the frequency entry 419 including the maximum frequency value is located at the highest position and the frequency entries 417 and 418 are located at a lower position one by one accordingly.

When in the frequency table 71, the frequency value included in the lowest frequency entry 415 of the group 0 is smaller than the frequency value included in the highest frequency entry 416 of the group 1, the inter-group 0/1 rearranging unit 461 rearranges the frequency entry 415 and the frequency entry 416. In addition, when in the frequency table 71, for example, the frequency value included in the lowest frequency entry 415 of the group 0 is greater than or equal to the frequency value included in the highest frequency entry 416 of the group 1, the inter-group 0/1 rearranging unit 461 does not rearrange the frequency entry 415 and the frequency entry 416. In the frequency table 71, the frequency entry 415 and the frequency entry 416 may be adjacent to each other. In the example illustrated in FIG. 19, since a frequency value of the frequency entry 415 (=2) is smaller than a frequency value of the frequency entry 416 (=3), these frequency entries 415 and 416 are rearranged.

Next, in the frequency table 71 rearranged by the intra-group rearranging units 450 and 451 and the inter-group rearranging units 460, 461, and 462, the routing unit 47 exchanges a frequency entry within a code length boundary area 48 for a frequency entry outside the code length boundary area 48. The frequency entry newly arranged in the code length boundary area 48 becomes a frequency entry to be swapped in the next cycle of the compression process.

FIG. 20 illustrates an example in which the frequency entries are exchanged by the routing unit 47. As illustrated in FIG. 20, when the frequency entry 415 and the frequency entry 416 are rearranged by the inter-group 0/1 rearranging unit 461, the routing unit 47 (1) exchanges the frequency entry 416 for the lowest frequency entry 414 of the frequency entries 411 to 414 rearranged by the intra-group 0 rearranging unit 450, and (2) exchanges the frequency entry 415 for the highest frequency entry 419 of the frequency entries 417 to 420 rearranged by the intra-group 1 rearranging unit 451. That is, when the frequency entry 415 and the frequency entry 416 are rearranged by the inter-group 0/1 rearranging unit 461, the routing unit 47 rearranges the lowest frequency entry 414 of the frequency entries 411 to 414 rearranged by the intra-group 0 rearranging unit 450 so as to be located at the lowest position in the group 0, and the frequency entry 416 so as to be located at a position other than the lowest position in the group 0, and the routing unit 47 rearranges the highest frequency entry 419 of the frequency entries 417 to 420 rearranged by the intra-group 1 rearranging unit 451 so as to be located at the highest position in the group 1, and the frequency entry 415 so as to be located at a position other than the highest position in the group 1. The frequency entry 414 arranged so as to be located at the lowest position in the group 0 and the frequency entry 419 arranged so as to be located at the highest position in the group 1 become swap target frequency entries in the next cycle of the compression process.

Note that when the frequency entry 415 and the frequency entry 416 are not rearranged by the inter-group 0/1 rearranging unit 461, the routing unit 47 (1) exchanges the frequency entry 415 for the lowest frequency entry 414 of the frequency entries 411 to 414 rearranged by the intra-group 0 rearranging unit 450, and (2) exchanges the frequency entry 416 for the highest frequency entry 419 of the frequency entries 417 to 420 rearranged by the intra-group 1 rearranging unit 451. That is, when the frequency entry 415 and the frequency entry 416 are not rearranged by the inter-group 0/1 rearranging unit 461, the routing unit 47 rearranges the lowest frequency entry 414 of the frequency entries 411 to 414 rearranged by the intra-group 0 rearranging unit 450 so as to be located at the lowest position in the group 0, and the frequency entry 415 so as to be located at a position other than the lowest position in the group 0, and the routing unit 47 rearranges the highest frequency entry 419 of the frequency entries 417 to 420 rearranged by the intra-group 1 rearranging unit 451 so as to be located at the highest position in the group 1, and the frequency entry 416 so as to be located at a position other than the highest position in the group 1.

Then, the encoding unit 151 assigns the symbols to the codewords, respectively, according to the order in which the frequency entries 41 are arranged in the updated frequency table 71 (that is, the frequency table 71 including the frequency entries 41 output by the routing unit 47). Then, the encoding unit 151 converts the next input symbol into a codeword on the basis of this assignment.

With the configuration described above, the compressor 15 can update the frequency table 71 according to an input symbol while converting the input symbol into the codeword. Further, by providing the inter-group rearranging units 460, 461, and 462, the compressor 15 may exchange frequency entries between two adjacent groups during two cycles of the compression process. Therefore, as compared with the compressor 15 of the first embodiment that may exchange frequency entries between groups during a single cycle of the compression process, the compressor 15 of the second embodiment can further reduce the amount of processing of rearranging frequency entries per cycle, so the throughput can be improved.

Note that in the above description, the case where one symbol is input in a symbol input for a single cycle is exemplified, but multiple symbols may be input in the symbol input for the single cycle. In that case, the encoding unit 151 converts the multiple symbols into multiple codewords, respectively. Further, the frequency value reduction conversion unit 43 and the frequency value update unit 44 may operate on the basis of the multiple symbols to update the frequency values in the frequency entries. The subsequent operations of the intra-group rearranging units 450 and 451, the inter-group rearranging units 460, 461, and 462, and the routing unit 47 are as described above.

(Decompressor)

The configuration of the decompressor 16 according to the second embodiment is similar to that of the decompressor 16 of the first embodiment, and the second embodiment is different from the first embodiment only in an operation of rearranging frequency entries in a group, an operation of exchanging frequency entries between adjacent groups, and an operation of selecting candidates of frequency entries to be exchanged between groups. The decompressor 16 of the second embodiment includes an unpack processing unit 161, an entry number acquisition unit 162, and a decoding unit 163, which are similar to those of the decompressor 16 of the first embodiment.

Further, the frequency table update unit 164 provided in the decompressor 16 of the second embodiment has a configuration in which the intra-group rearranging units 350, 351, and 352, and the routing unit 36 provided in the frequency table update unit 164 of the decompressor 16 of the first embodiment are replaced with the intra-group rearranging units 450 and 451, the inter-group rearranging units 460, 461, and 462, and the routing unit 47 of the compressor 15 described above.

With the configuration described above, the decompressor 16 can update the frequency table 71 in accordance with a symbol while converting a codeword into the symbol. Further, by providing the inter-group rearranging units 460, 461, and 462, the decompressor 16 may exchange frequency entries between two adjacent groups during two cycles of the decompression process. Therefore, as compared with the decompressor 16 of the first embodiment that may exchange frequency entries between groups during a single cycle of the decompression process, the decompressor 16 of the second embodiment can further reduce the amount of processing of rearranging frequency entries per cycle, so the throughput can be improved.

Note that multiple codewords may be input instead of a single codeword in a codeword input for a single cycle. In that case, the decoding unit 163 converts the multiple codewords into multiple symbols, respectively. Further, the frequency value reduction conversion unit 43 and the frequency value update unit 44 may operate on the basis of the multiple codewords (or the corresponding frequency entry numbers) to update the frequency values in the frequency entries. The subsequent operations of the intra-group rearranging units 450 and 451, the inter-group rearranging units 460, 461, and 462, and the routing unit 47 are as described above.

Third Embodiment

In the first embodiment, the compressor 15 exchanges frequency entries between adjacent groups during a single cycle of the compression process, and the decompressor 16 exchanges frequency entries between adjacent groups during a single cycle of the decompression process. In addition, in the second embodiment, the compressor 15 exchanges frequency entries between adjacent groups during two cycles of the compression process, and the decompressor 16 exchanges frequency entries between adjacent groups during two cycles of the decompression process. On the other hand, in a third embodiment, a compressor 15 exchanges frequency entries between adjacent groups during three cycles of a compression process, and a decompressor 16 exchanges frequency entries between adjacent groups during three cycles of a decompression process.

(Compressor)

The configuration of the compressor 15 according to the third embodiment is similar to the compressors 15 according to the first and second embodiments, and the third embodiment is different from the first and second embodiments only in an operation of rearranging frequency entries in a group, an operation of rearranging swap candidates of frequency entries in a group set, an operation of rearranging swap targets of frequency entries between groups, and an operation of selecting a swap target of frequency entries and swap candidates of frequency entries in a group set. The compressor 15 of the third embodiment includes an encoding unit 151 and a pack processing unit 152 similar to those of the compressors 15 of the first and second embodiments. Hereinafter, the differences from the first and second embodiments will be mainly described.

Figure 21:
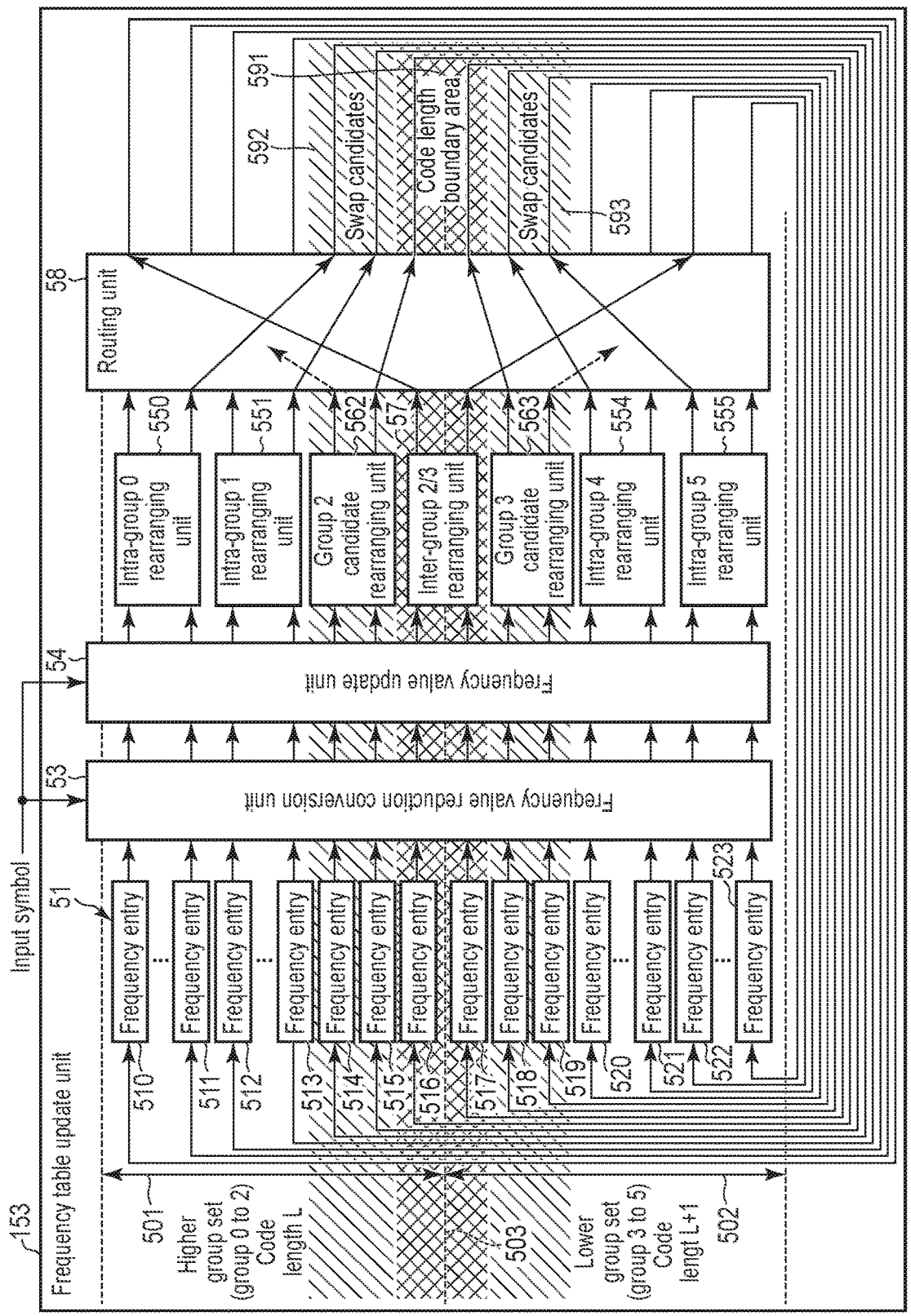
FIG. 21 is a block diagram illustrating a configuration example of a frequency table update unit in a memory system according to a third embodiment.

FIG. 21 is a block diagram illustrating a configuration example of a frequency table update unit 153 in the compressor 15 according to the third embodiment. Here, the case where each of frequency entries 51 in a frequency table 71 belongs to any one of groups 0 to 5 is exemplified, but the number of groups into which the frequency entries 51 are divided may be set freely. Frequency entries 510 and 511 belong to the group 0. Frequency entries 512 and 513 belong to the group 1 lower than the group 0. The frequency entries 514 to 516 belong to the group 2 lower than the group 1. The frequency entries 517 to 519 belong to the group 3 lower than the group 2. Frequency entries 520 and 521 belong to the group 4 lower than the group 3. Frequency entries 522 and 523 belong to the group 5 lower than the group 4. Each of the groups 0, 1, 4, and 5 includes two or more frequency entries.

Further, the groups 0 to 2 constitute a group set 501 (hereinafter, referred to as a higher group set 501). The groups 3 to 5 constitute another group set 502 (hereinafter, referred to as a lower group set 502). The number of groups constituting each of the group sets 501 and 502 is set freely. Although the case where the number of group sets is two is exemplified, the number of group sets may be set freely.

For example, a codeword of code length L is assigned to each symbol of the frequency entries 510 to 516 included in the higher group set 501. For example, a codeword of code length L+1 longer than the code length L is assigned to each symbol of the frequency entries 517 to 523 included in the lower group set 502.

The group 2 and the group 3 are in contact with a boundary 503 between the higher group set 501 and the lower group set 502. The frequency entry 516 of the group 2 and the frequency entry 517 of the group 3 which are adjacent to each other across the boundary 503 are located in a code length boundary area 591. The frequency entries 516 and 517 in the code length boundary area 591 are swap target entries that may be swapped between the adjacent group sets 501 and 502 in a current cycle of the compression process. More specifically, the frequency entry 516 is a swap target entry in the higher group set 501. In addition, the frequency entry 517 is a swap target entry in the lower group set 502.

The frequency entries 514 and 515 of the group 2, which are obtained by excluding the frequency entry 516 in the code length boundary area 591 from the frequency entries 514 to 516 of the group 2, are swap candidates between the adjacent group sets 501 and 502. One of the frequency entries 514 and 515 of swap candidates becomes a swap target entry of the higher group set 501 in the next cycle of the compression process. In addition, the frequency entries 514 and 515 of swap candidates are located in a higher swap candidate area 592 adjacent to the code length boundary area 591.

In addition, the frequency entries 518 and 519 of the group 3, which obtained by excluding the frequency entry 517 in the code length boundary area 591 from the frequency entries 517 to 519 of the group 3, are swap candidates between the adjacent group sets 501 and 502.

One of the frequency entries 518 and 519 of swap candidates becomes a swap target entry of the lower group set 502 in the next cycle of the compression process. In addition, the frequency entries 518 and 519 of swap candidates are included in a lower swap candidate area 593 adjacent to the code length boundary area 591.

The frequency table update unit 153 includes, for example, a frequency value reduction conversion unit 53, a frequency value update unit 54, intra-group rearranging units 550, 551, 554, and 555, swap candidate rearranging units 562 and 563, an inter-group rearranging unit 57, and a routing unit 58. Each of these units is realized as a circuit, for example.

The frequency value reduction conversion unit 53 and the frequency value update unit 54 operate similarly to the frequency value reduction conversion unit 33 and the frequency value update unit 34 described in the first embodiment.

In the frequency table update unit 153, the number of intra-group rearranging units, the number of swap candidate rearranging units, and the number of inter-group rearranging units may be determined according to the number of groups into which the frequency entries 51 are divided, the number of group sets each comprising several groups, and the number of groups constituting each of the group sets. That is, the number of intra-group rearranging units, the number of swap candidate rearranging units, and the number of inter-group rearranging units provided in the frequency table update unit 153 change by freely setting the total number of groups, the total number of group sets, and the number of groups constituting each of the group sets.

In FIG. 21, in order to make the explanation easy to understand, a case where six groups (that is, groups 0 to 5) configure two group sets 501 and 502 for every three groups, is exemplified. In this case, the frequency table update unit 153 is provided with four intra-group rearranging units 550, 551, 554, and 555, two swap candidate rearranging units 562 and 563, and an inter-group rearranging unit 57.

After the frequency value update unit 54 adds the first value to the frequency value of the frequency entry including an input symbol, each of the intra-group rearranging units 550, 551, 554, and 555 rearranges frequency entries in the frequency table 71 that belong to each group, which is a target of intra-group rearrangement, by using the frequency values included in these frequency entries. The target groups of intra-group rearrangement are not in contact with the boundary 503 between the higher group set 501 and the lower group set 502. In the example illustrated in FIG. 21, the target groups of intra-group rearrangement are the group 0, the group 1, the group 4, and the group 5.

After the frequency value update unit 54 adds the first value to the frequency value of the frequency entry including the input symbol, each of the swap candidate rearranging units 562 and 563 rearranges swap candidate entries in the frequency table 71 that belong to a group (here, the group 2 or the group 3) adjacent to the boundary 503 between the two group sets 501 and 502, by using the frequency values included in the frequency entries. The number of swap candidate entries included in a group corresponds to the number of target groups of intra-group rearrangement in the group set including the group (here, two). For example, the number of swap candidate entries 514 and 515 included in the group 2 corresponds to the number of the target groups 0 and 1 of intra-group rearrangement in the higher group set 501. Similarly, the number of swap candidate entries 518 and 519 included in the group 3 corresponds to the number of the target groups 4 and 5 of intra-group rearrangement in the lower group set 502.

The inter-group rearranging unit 57 rearranges the frequency entries 516 and 517 that are consecutive across the group sets 501 and 502 (that is, the swap target entries 516 and 517 in the code length boundary area 591) on the basis of the frequency values included in the frequency entries 516 and 517. That is, the inter-group rearranging unit 57 is called an inter-group 2/3 rearranging unit that rearranges the frequency entry 516 of the group 2 and the frequency entry 517 of the group 3 adjacent to the frequency entry 516 on the basis of the frequency values.

Figure 22:
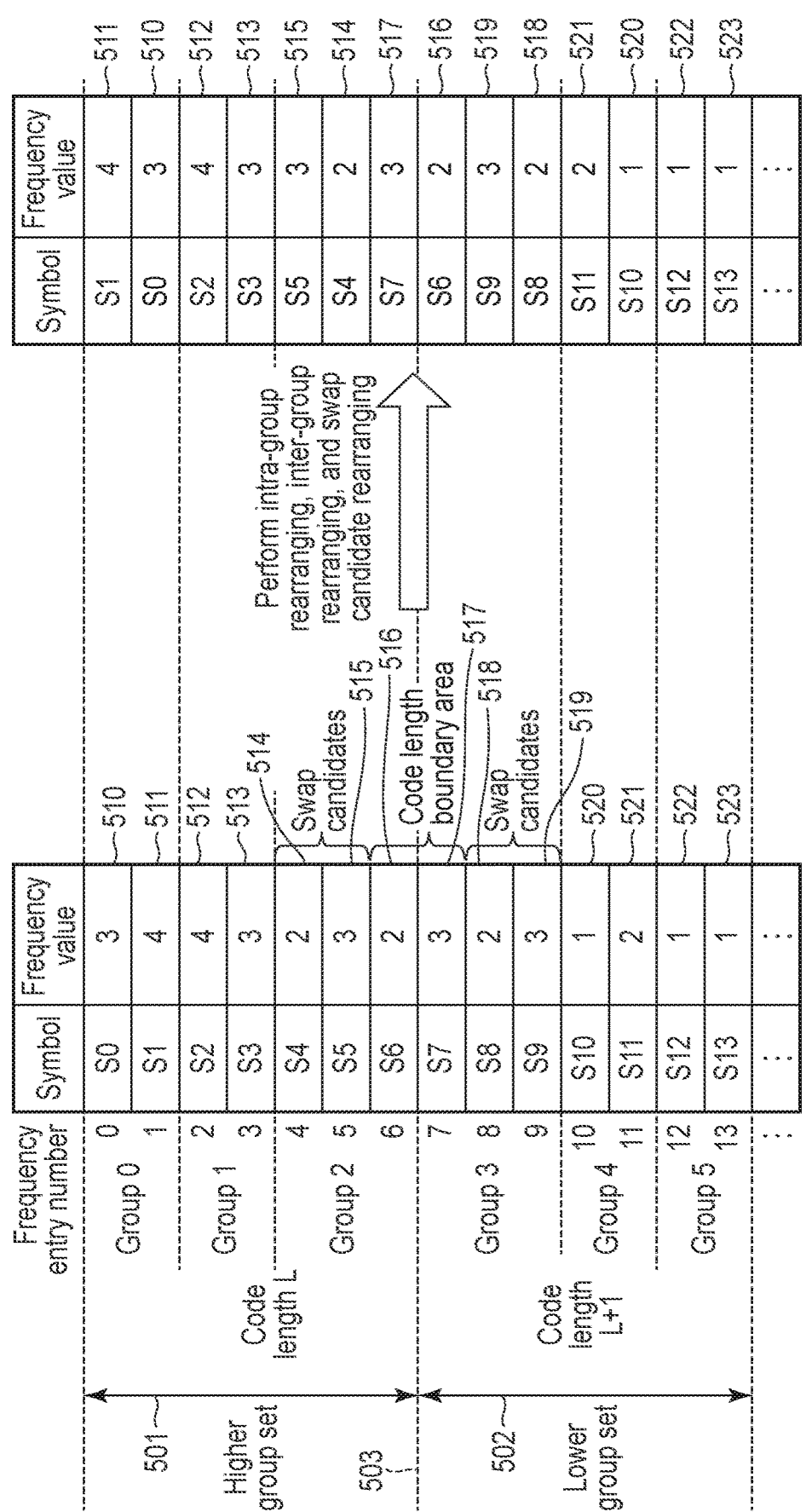
FIG. 22 is a diagram illustrating an example in which frequency entries are rearranged by an intra-group rearranging unit, a swap candidate rearranging unit and an inter-group rearranging unit.

FIG. 22 illustrates an example in which the frequency entries 510 to 523 in the frequency table 71 are rearranged by the intra-group rearranging units 550, 551, 554, and 555, the swap candidate rearranging units 562 and 563, and the inter-group rearranging unit 57.

After the frequency value update unit 54 adds the first value to the frequency value of the frequency entry including an input symbol, the intra-group rearranging unit 550 corresponding to the group 0 (hereinafter, referred to as the intra-group 0 rearranging unit 550) rearranges the frequency entries 510 and 511 in the frequency table 71 that belong to the group 0, by using the frequency values included in the frequency entries 510 and 511. The intra-group 0 rearranging unit 550 rearranges the frequency entries 510 and 511 in order based on the frequency values (for example, descending order of the frequency values). Alternatively, the intra-group 0 rearranging unit 550 may rearrange the frequency entries 510 and 511 so that among the frequency entries 510 and 511, the frequency entry 511 including the maximum frequency value is located at the highest position and the frequency entry 510 including the minimum frequency value is located at the lowest position.

After the frequency value update unit 54 adds the first value to the frequency value corresponding to the input symbol, the intra-group rearranging unit 551 corresponding to the group 1 (hereinafter, referred to as the intra-group 0 rearranging unit 551) rearranges the frequency entries 512 and 513 in the frequency table 71 that belong to the group 1, by using the frequency values included in the frequency entries 512 and 513. The intra-group 1 rearranging unit 551 rearranges the frequency entries 512 and 513 in order based on the frequency values. Alternatively, the intra-group 1 rearranging unit 551 may rearrange the frequency entries 512 and 513 so that among the frequency entries 512 and 513, the frequency entry 512 including the maximum frequency value is located at the highest position and the frequency entry 513 including the minimum frequency value is located at the lowest position. As illustrated in FIG. 22, when the frequency entry 512 including the maximum frequency value is already located at the highest position and the frequency entry 513 including the minimum frequency value is already located at the lowest position, the intra-group 1 rearranging unit 551 may output the frequency entries 512 and 513 in that order.

After the frequency value update unit 54 adds the first value to the frequency value of the frequency entry including the input symbol, the intra-group rearranging unit 554 corresponding to the group 4 (hereinafter, referred to as the intra-group 4 rearranging unit 554) rearranges the frequency entries 520 and 521 in the frequency table 71 that belong to the group 4, by using the frequency values included in the frequency entries 520 and 521. The intra-group 4 rearranging unit 554 rearranges the frequency entries 520 and 521 in order based on the frequency values. Alternatively, the intra-group 4 rearranging unit 554 may rearrange the frequency entries 520 and 521 so that among the frequency entries 520 and 521, the frequency entry 521 including the maximum frequency value is located at the highest position and the frequency entry 520 including the minimum frequency value is located at the lowest position.

After the frequency value update unit 54 adds the first value to the frequency value corresponding to the input symbol, the intra-group rearranging unit 555 corresponding to the group 5 (hereinafter, referred to as the intra-group 5 rearranging unit 555) rearranges the frequency entries 522 and 523 in the frequency table 71 that belong to the group 5, by using the frequency values included in the frequency entries 522 and 523. The intra-group 5 rearranging unit 555 rearranges the frequency entries 522 and 523 in order based on the frequency values. Alternatively, the intra-group 5 rearranging unit 555 may rearrange the frequency entries 522 and 523 so that among the frequency entries 522 and 523, the frequency entry including the maximum frequency value is located at the highest position and the frequency entry including the minimum frequency value is located at the lowest position. As illustrated in FIG. 22, when the frequency entries 522 and 523 include the same frequency value, the intra-group 5 rearranging unit 555 may output the frequency entries 522 and 523 in that order.

In addition, after the frequency value update unit 54 adds the first value to the frequency value corresponding to the input symbol, the swap candidate rearranging unit 562 corresponding to the group 2 (hereinafter, referred to as the group 2 candidate rearranging unit 562) rearranges the frequency entries 514 and 515 other than the lowest frequency entry 516 among the frequency entries 514 to 516 that belong to the group 2 in the frequency table 71, by using the frequency values included in the frequency entries 514 and 515. The group 2 candidate rearranging unit 562 rearranges the frequency entries 514 and 515 in order based on the frequency values (for example, descending order of the frequency values). Alternatively, the group 2 candidate rearranging unit 562 may rearrange the frequency entries 514 and 515 so that among the frequency entries 514 and 515, the frequency entry 515 including the maximum frequency value is located at the highest position and the frequency entry 514 including the minimum frequency value is located at the lowest position.

After the frequency value update unit 54 adds the first value to the frequency value corresponding to the input symbol, the swap candidate rearranging unit 563 corresponding to the group 3 (hereinafter, referred to as the group 3 candidate rearranging unit 563) rearranges the frequency entries 518 and 519 other than the highest frequency entry 517 among the frequency entries 517 to 519 that belong to the group 3 in the frequency table 71, by using the frequency values included in the frequency entry 518 and 519. The group 3 candidate rearranging unit 563 rearranges the frequency entries 518 and 519 in order based on the frequency values. Alternatively, the group 3 candidate rearranging unit 563 may rearrange the frequency entries 518 and 519 so that among the frequency entries 518 and 519, the frequency entry 519 including the maximum frequency value is located at the highest position and the frequency entry 518 including the minimum frequency value is located at the lowest position.

In addition, after the frequency value update unit 54 adds the first value to the frequency value corresponding to the input symbol, the inter-group rearranging unit 57 rearranges the lowest frequency entry 516 of the group 2 and the highest frequency entry 517 of the group 3 when the frequency value in the frequency entry 516 is smaller than the frequency value in the frequency entry 517. Note that when the frequency value in the frequency entry 516 is larger than or equal to the frequency value in the frequency entry 517, the inter-group rearranging unit 57 outputs the frequency entry 516 and the frequency entry 517 as they are without rearranging the frequency entry 516 and the frequency entry 517.

Then, in the frequency table 71 rearranged by the intra-group rearranging units 550, 551, 554, and 555, the swap candidate rearranging units 562 and 563, and the inter-group rearranging unit 57, the routing unit 58 replaces the frequency entry of swap target in the code length boundary area 591 with the frequency entry of swap candidate outside the code length boundary area 591 for each of the group sets 501 and 502, and selects frequency entries of next swap candidates.

Figure 23:
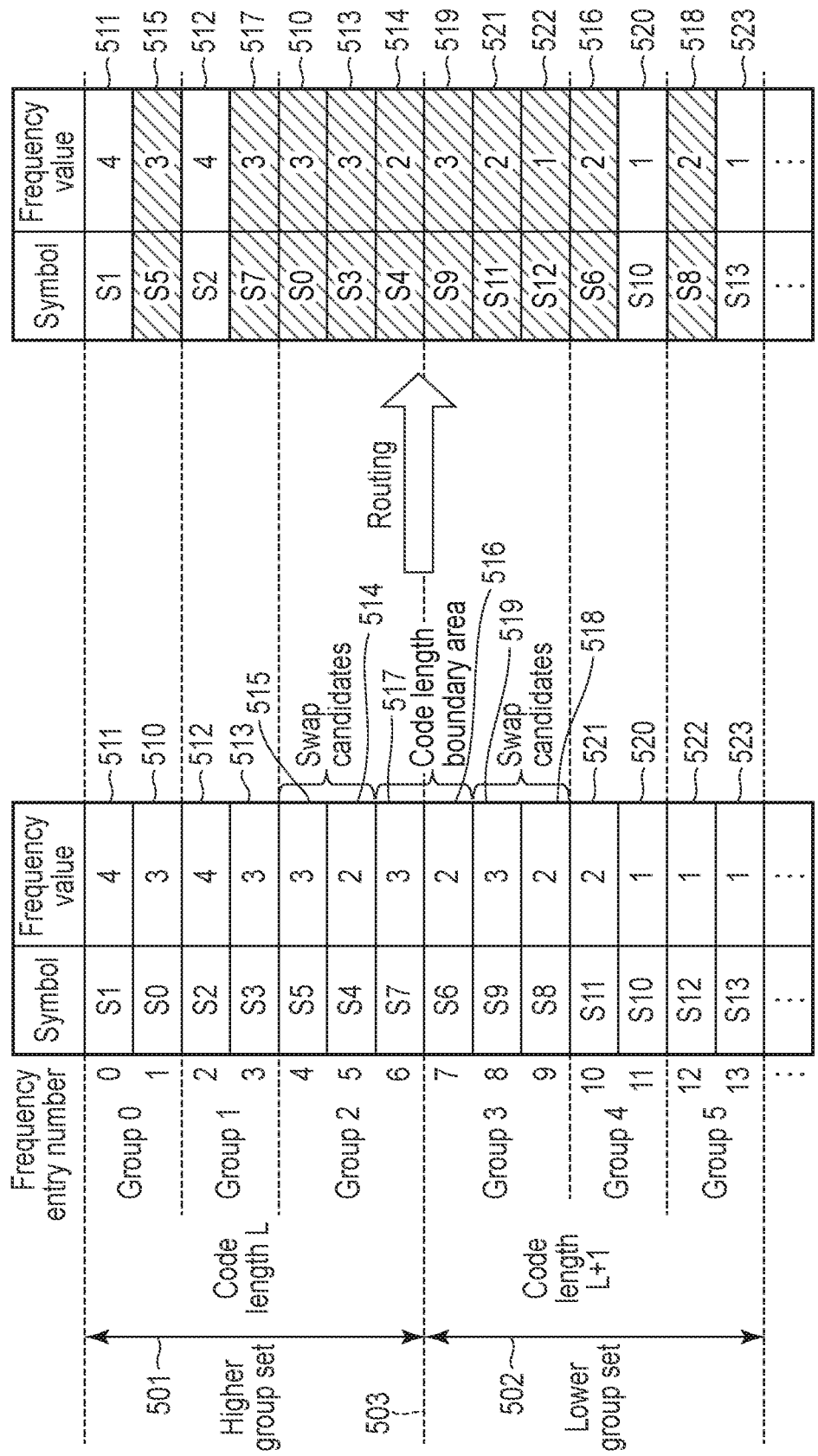
FIG. 23 is a diagram illustrating an example in which the frequency entries are routed by a routing unit.

FIG. 23 illustrates an example in which the frequency entries are exchanged by the routing unit 58.

As illustrated in FIG. 23, the routing unit 58 rearranges (1) the lowest frequency entry 514 of the frequency entries 514 and 515 rearranged by the group 2 candidate rearranging unit 562 so as to be located at the lowest position in the group 2 (that is, the lowest position in the higher group set 501), and (2) the highest frequency entry 519 of the frequency entries 518 and 519 rearranged by the group 3 candidate rearranging unit 563 so as to be located at the highest position in the group 3 (that is, the highest position in the lower group set 502).

Further, when the frequency entry 516 and the frequency entry 517 are rearranged by the inter-group rearranging unit 57, the routing unit 58 rearranges (3) the lowest frequency entry 510 of the frequency entries 510 and 511 rearranged by the intra-group 0 rearranging unit 550 and the lowest frequency entry 513 of the frequency entries 512 and 513 rearranged by the intra-group 1 rearranging unit 551 so as to be located at positions other than the lowest position in the group 2, (4) the frequency entry 517 so as to be located in the group 0 or the group 1 (in FIG. 23, at the lowest position in the group 1), (5) the highest frequency entry 521 of the frequency entries 520 and 521 rearranged by the intra-group 4 rearranging unit 554 and the highest frequency entry 522 of the frequency entries 522 and 523 rearranged by the intra-group 5 rearranging unit 555 so as to be located at positions other than the highest position in the group 3, and (6) the frequency entry 516 so as to be located in the group 4 or the group 5 (in FIG. 23, at the highest position in the group 4).

Further, when the frequency entry 516 and the frequency entry 517 are not rearranged by the inter-group rearranging unit 57, the routing unit 58 rearranges (7) the lowest frequency entry 510 of the frequency entries 510 and 511 rearranged by the intra-group 0 rearranging unit 550 and the lowest frequency entry 513 of the frequency entries 512 and 513 rearranged by the intra-group 1 rearranging unit 551 so as to be located at positions other than the lowest frequency in the group 2, (8) the frequency entry 516 so as to be located in the group 0 or the group 1, (9) the highest frequency entry 521 of the frequency entries 520 and 521 rearranged by the intra-group 4 rearranging unit 554 and the highest frequency entry 522 rearranged by the intra-group 5 rearranging unit 555 so as to be located at positions other than the highest position in the group 3, and (10) the frequency entry 517 so as to be located in the group 4 or the group 5.

In other words, the routing unit 58 rearranges the frequency entries 510 and 511 rearranged by the intra-group 0 rearranging unit 550, the frequency entries 512 and 513 rearranged by the intra-group 1 rearranging unit 551, and the frequency entry other than the lowest frequency entry among the frequency entries 514 and 515 rearranged by the group 2 candidate rearranging unit 562 so that each of these frequency entries is located at any position of positions in the group 0, positions in the group 1, and positions other than the lowest positions in the group 2. Also, the routing unit 58 rearranges the frequency entry other than the highest frequency entry among the frequency entries 518 and 519 rearranged by the group 3 candidate rearranging unit 563, the frequency entries 520 and 521 rearranged by the intra-group 4 rearranging unit 554, and the frequency entries 522 and 523 rearranged by the intra-group 5 rearranging unit 555 so that each of these entries is located at any position of positions other than the highest position in the group 3, positions in the group 4, and positions in the group 5.

Note that the routing unit 58 is an example of a configuration that reduces the number of times of exchanging frequency entries, but other various configurations are possible. Since the swap without comparison of values in the routing unit 58 has a low circuit cost in terms of area and power consumption, various rearrangement including shift of the order of the frequency entries may be applied to the routing unit 58.

The rule to follow when determining the configuration of the routing unit 58 is not to cause the exchange of frequency entries between group sets in units other than inter-group rearranging unit 57. The configuration of the routing unit 58 can be designed with a relatively high degree of freedom to improve the convergence and stability of the sort only by following this rule. In other words, the configuration of the routing unit 58 can be variously modified according to this rule.

Then, the encoding unit 151 assigns the symbols to the codewords, respectively, according to the order in which the frequency entries 51 are arranged in the updated frequency table 71 (that is, the frequency table 71 including the frequency entries 51 output by the routing unit 47).

Note that the encoding unit 151 assigns, for example, a codeword of first code length to each of the symbols included in the frequency entries belonging to the group 0. The encoding unit 151 assigns a codeword of second code length to each of the symbols included in the frequency entries belonging to the group 1. The encoding unit 151 assigns a codeword of third code length to each of the symbols included in the frequency entries belonging to the group 2. The encoding unit 151 assigns a codeword of fourth code length to each of the symbols included in the frequency entries belonging to the group 3. The encoding unit 151 assigns a codeword of fifth code length to each of the symbols included in the frequency entries belonging to the group 4. The encoding unit 151 assigns a codeword of sixth code length to each of the symbols included in the frequency entries belonging to the group 5.

In addition, the first code length is shorter than or equal to the second code length. The second code length is shorter than or equal to the third code length. The third code length is shorter than or equal to the fourth code length. The fourth code length is shorter than or equal to the fifth code length. The fifth code length is shorter than or equal to the sixth code length.

When the groups 0 to 2 constitute the higher group set 501, the first, second and third code lengths may be the same. When the groups 3 to 5 constitute the lower group set 502, the fourth, fifth and sixth code lengths may be the same. Also, when the higher group set 501 and the lower group set 502 are configured, the first, second and third code lengths are shorter than the fourth, fifth and sixth code lengths.

Alternatively, the encoding unit 151 may use a fixed tree structure comprising leaf nodes in which codewords are associated, respectively, to assign the codewords to the symbols included in the frequency entries, respectively. For example, the encoding unit 151 assigns codewords associated with leaf nodes constituting a first subtree of the tree structure to the symbols, respectively, which are included in the frequency entries belonging to the higher group set 501 (that is, groups 0 to 2). The encoding unit 151 assigns codewords associated with leaf nodes constituting a second subtree of the tree structure to the symbols, respectively, which are included in the frequency entries belonging to the lower group set 502 (that is, groups 3 to 5).

The encoding unit 151 converts the next input symbol into a codeword on the basis of the assignment of the symbols and the codewords.

With the configuration described above, the compressor 15 can update the frequency table 71 according to an input symbol while converting the input symbol into a codeword. Further, by providing the swap candidate rearranging units 562 and 563, the compressor 15 may exchange frequency entries between two adjacent group sets during three cycles of the compression process. Therefore, as compared with the compressor 15 of the first embodiment that may exchange frequency entries between groups during a single cycle of the compression process and the compressor 15 of the second embodiment that may exchange frequency entries between groups during two cycles of the compression process, the compressor 15 of the third embodiment can further reduce the amount of processing of rearrangement of the frequency entries per cycle, so the throughput can be improved.

Note that in the above description, the case where one symbol is input in a symbol input for a single cycle is exemplified, but multiple symbols may be input in the symbol input for the single cycle. In that case, the encoding unit 151 converts the multiple symbols into multiple codewords, respectively. Further, the frequency value reduction conversion unit 53 and the frequency value update unit 54 may operate on the basis of the multiple symbols to update the frequency values in the frequency entries. The subsequent operations of the intra-group rearranging units 550, 551, 554, and 555, the swap candidate rearranging units 562 and 563, the inter-group rearranging unit 57, and the routing unit 58 are as described above.

(Decompressor)

The configuration of the decompressor 16 according to the third embodiment is similar to the decompressors 16 according to the first and second embodiments, and the third embodiment is different from the first and second embodiments only in an operation of rearranging frequency entries in a group, an operation of rearranging frequency entries of swap candidates in a group set, an operation of rearranging swap targets of frequency entries between groups, and an operation of selecting a swap target of frequency entries and swap candidates of frequency entries in a group set. The decompressor 16 of the third embodiment includes an unpack processing unit 161, an entry number acquisition unit 162, and a decoding unit 163, which are similar to those of the decompressors 16 of the first and second embodiments.

As described above, the entry number acquisition unit 162 acquires the frequency entry number corresponding to an acquired codeword. Here, when specifying each of the frequency entries 510 to 523 illustrated in FIG. 21, the frequency entry number acquired by the entry number acquisition unit 162 will be described.

When specifying one of the frequency entries 510 and 511 belonging to the group 0, the entry number acquisition unit 162 acquires the frequency entry number corresponding to a codeword of a first code length. When specifying one of the frequency entries 512 and 513 belonging to the group 1, the entry number acquisition unit 162 acquires the frequency entry number corresponding to a codeword of a second code length. When specifying one of the frequency entries 514 to 516 belonging to the group 2, the entry number acquisition unit 162 acquires the frequency entry number corresponding to a codeword of a third code length. When specifying one of the frequency entries 517 to 519 belonging to the group 3, the entry number acquisition unit 162 acquires the frequency entry number corresponding to a codeword of a fourth code length. When specifying one of the frequency entries 520 and 521 belonging to the group 4, the entry number acquisition unit 162 acquires the frequency entry number corresponding to a codeword of a fifth code length. When specifying one of the frequency entries 522 and 523 belonging to the group 5, the entry number acquisition unit 162 acquires the frequency entry number corresponding to a codeword of a sixth code length.

In addition, the first code length is shorter than or equal to the second code length. The second code length is shorter than or equal to the third code length. The third code length is shorter than or equal to the fourth code length. The fourth code length is shorter than or equal to the fifth code length. The fifth code length is shorter than or equal to the sixth code length.

When the groups 0 to 2 constitute the higher group set 501, the first, second and third code lengths may be the same. When the groups 3 to 5 constitute the lower group set 502, the fourth, fifth and sixth code lengths may be the same. Also, when the higher group set 501 and the lower group set 502 are configured, the first, second and third code lengths are shorter than the fourth, fifth and sixth code lengths.

Alternatively, the entry number acquisition unit 162 may use a fixed tree structure comprising leaf nodes that are associated with codewords, respectively, to acquire the frequency entry number corresponding to the acquired codeword. For example, when specifying one of the frequency entries 510 to 516 belonging to the higher group set 501 (that is, groups 0 to 2), the entry number acquisition unit 162 acquires the frequency entry number corresponding to a codeword associated with one of leaf nodes constituting a first subtree of the tree structure. In addition, when specifying one of the frequency entries 517 to 523 belonging to the lower group set (that is, groups 3 to 5), the entry number acquisition unit 162 acquires the frequency entry number corresponding to a codeword associated with one of leaf nodes constituting a second subtree of the tree structure.

Further, the frequency table update unit 164 provided in the decompressor 16 of the third embodiment has a configuration in which the intra-group rearranging units 350, 351, and 352, and the routing unit 36 provided in the frequency table update unit 164 of the decompressor 16 of the first embodiment are replaced with the intra-group rearranging units 550, 551, 554, and 555, the swap candidate rearranging units 562 and 563, the inter-group rearranging unit 57, and the routing unit 58 of the compressor 15 of the third embodiment described above.

With the configuration described above, the decompressor 16 can update the frequency table 71 in accordance with a symbol while converting a codeword into the symbol. Further, by providing the swap candidate rearranging units 562 and 563, the decompressor 16 may exchange frequency entries between two adjacent group sets during three cycles of the decompression process. Therefore, as compared with the decompressor 16 of the first embodiment that may exchange frequency entries between groups during a single cycle of the decompression process and the decompressor 16 of the second embodiment that may exchange frequency entries between groups during two cycles of the decompression process, the decompressor 16 of the third embodiment can further reduce the amount of processing of rearrangement of frequency entries per cycle, so the throughput can be improved.

Note that multiple codewords may be input instead of one codeword in a codeword input for a single cycle. In that case, the decoding unit 163 converts the multiple codewords into multiple symbols, respectively. Further, the frequency value reduction conversion unit 53 and the frequency value update unit 54 may operate on the basis of the multiple codewords (or the corresponding frequency entry numbers) to update the frequency values in the frequency entries. The subsequent operations of the intra-group rearranging units 550, 551, 554, and 555, the swap candidate rearranging units 562 and 563, the inter-group rearranging unit 57, and the routing unit 58 are as described above.

Fourth Embodiment

The first embodiment illustrates an example in which data compression and decompression are realized by hardware (circuit) as the compressor 15 and the decompressor 16. On the other hand, a fourth embodiment describes an example in which the functions of the compressor 15 and the decompressor 16 of the first embodiment are realized by software (that is, programs) executed by at least one processor.

Figure 24:
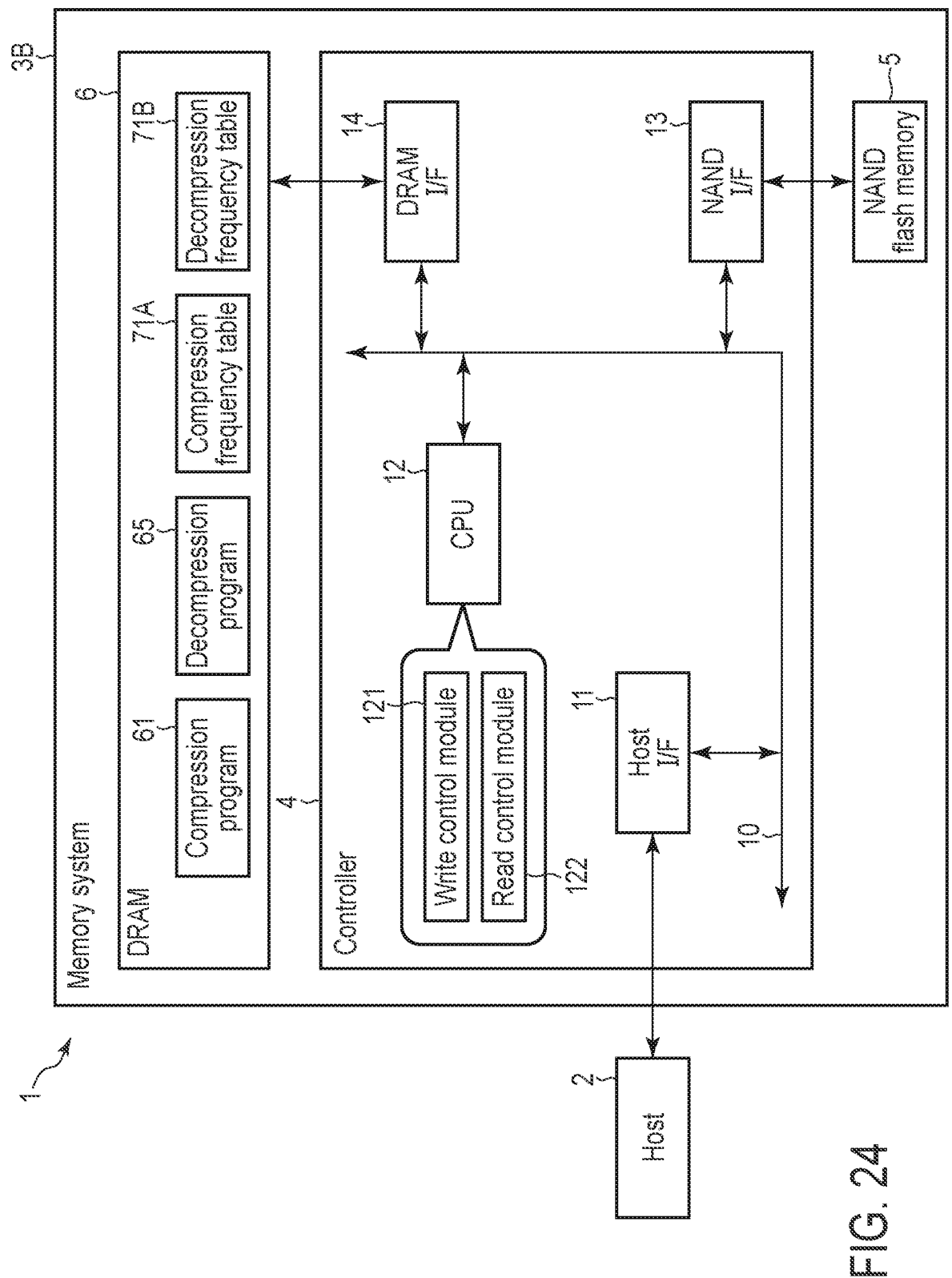
FIG. 24 is a block diagram illustrating a configuration example of an information processing system including a memory system according to a fourth embodiment.

FIG. 24 is a block diagram illustrating a configuration example of an information processing system 1 including a memory system 3B according to the fourth embodiment. The memory system 3B of the fourth embodiment has a configuration in which the compressor 15 and the decompressor 16 are excluded from the memory system 3A of the first embodiment, and other components of the memory system 3B are similar to those of the memory system 3A.

In the memory system 3B, a CPU 12 loads a compression program 61 and a decompression program 65 from a NAND flash memory 5 into a DRAM 6, for example, and executes these programs 61 and 65. As a result, in the memory system 3B, the functions similar to those of the compressor 15 and the decompressor 16 can be realized. Note that the compression program 61 and the decompression program 65 may be executed by not only the memory system 3B but also various electronic devices each having components capable of executing the programs (for example, a CPU, a RAM, a nonvolatile memory, and the like). The electronic devices include a personal computer, a server computer, and a mobile information device.

Further, the NAND flash memory 5 may store either the compression program 61 or the decompression program 65. That is, the electronic device such as the memory system 3B may have any one of the compression function and decompression function of data. In that case, the CPU 12 executes either one of the compression program 61 and the decompression program 65 loaded from the NAND flash memory 5 into the DRAM 6.

The DRAM 6 may store a compression frequency table 71A used by the CPU 12 executing the compression program 61. In addition, the DRAM 6 may store a decompression frequency table 71B used by the CPU 12 executing the decompression program 65.

The compression frequency table 71A has a configuration similar to that of the frequency table 71 described above with reference to FIG. 6. Each of frequency entries in the compression frequency table 71A belongs to any one of groups. Each of the groups includes several consecutive frequency entries in the compression frequency table 71A.

The decompression frequency table 71B has a configuration similar to that of the frequency table 71 described above with reference to FIG. 6. Each of frequency entries in the decompression frequency table 71B belongs to any one of groups. Each of the groups includes several consecutive frequency entries in the decompression frequency table 71B.

In this way, the CPU 12 uses different frequency tables 71A and 71B when executing the compression program 61 and when executing the decompression program 65. In the following description, the description that may be common to the compression program 61 and the decompression program 65 may be simply referred to as the frequency table 71. This frequency table 71 means the compression frequency table 71A when the CPU 12 is executing the compression program 61, and means the decompression frequency table 71B when the CPU 12 is executing the decompression program 65.

Figure 25:
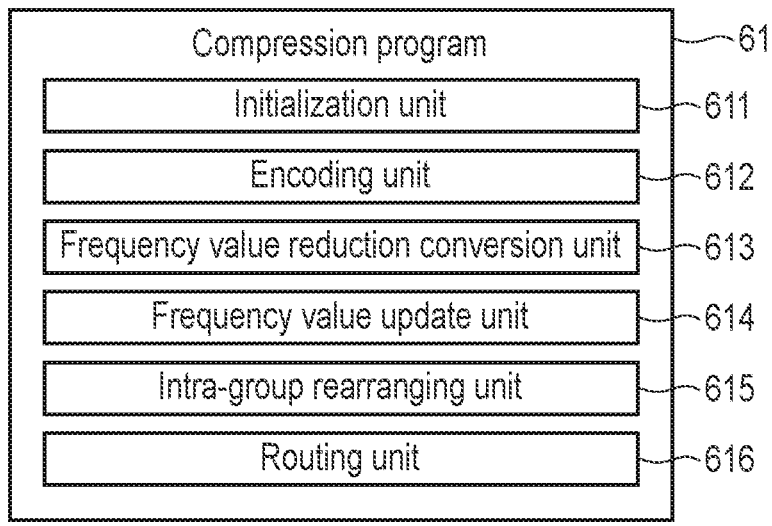
FIG. 25 is a block diagram illustrating a functional configuration example of a compression program executed in the memory system of the fourth embodiment.

FIG. 25 is a block diagram illustrating a functional configuration example of the compression program 61. The CPU 12 that executes the compression program 61 may function as an initialization unit 611, an encoding unit 612, a frequency value reduction conversion unit 613, a frequency value update unit 614, an intra-group rearranging unit 615, and a routing unit 616.

The initialization unit 611 initializes the frequency table 71 and variables used when the compression program 61 is executed. The encoding unit 612, the frequency value reduction conversion unit 613, the frequency value update unit 614, the intra-group rearranging unit 615, and the routing unit 616 have the functions similar to those of the encoding unit 151, the frequency value reduction conversion unit 33, the frequency value update unit 34, the intra-group rearranging unit 35, and the routing unit 36, respectively, in the compressor 15 of the first embodiment.

Figure 26:
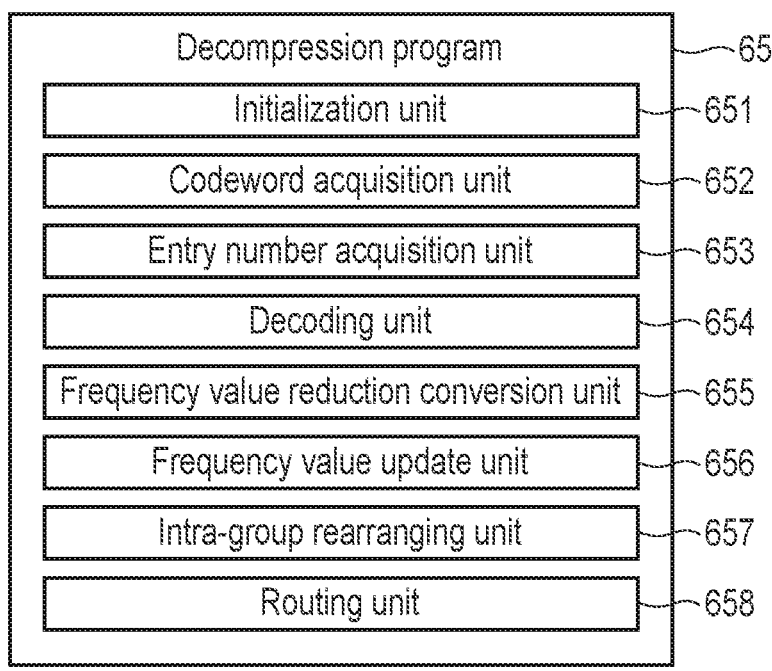
FIG. 26 is a block diagram illustrating a functional configuration example of a decompression program executed in the memory system of the fourth embodiment.

FIG. 26 is a block diagram illustrating a functional configuration example of the decompression program 65. The CPU 12 that executes the decompression program 65 may function as an initialization unit 651, a codeword acquisition unit 652, an entry number acquisition unit 653, a decoding unit 654, a frequency value reduction conversion unit 655, a frequency value update unit 656, an intra-group rearranging unit 657, and a routing unit 658.

The initialization unit 651 initializes the frequency table 71 and variables used when the decompression program 65 is executed. The codeword acquisition unit 652, the entry number acquisition unit 653, the decoding unit 654, the frequency value reduction conversion unit 655, the frequency value update unit 656, the intra-group rearranging unit 657, and the routing unit 658 have the functions similar to those of the unpack processing unit 161, the entry number acquisition unit 162, the decoding unit 163, the frequency value reduction conversion unit 33, the frequency value update unit 34, the intra-group rearranging unit 35, and the routing unit 36, respectively, in the decompressor 16 of the first embodiment.

(Compression Process)

Figure 27:
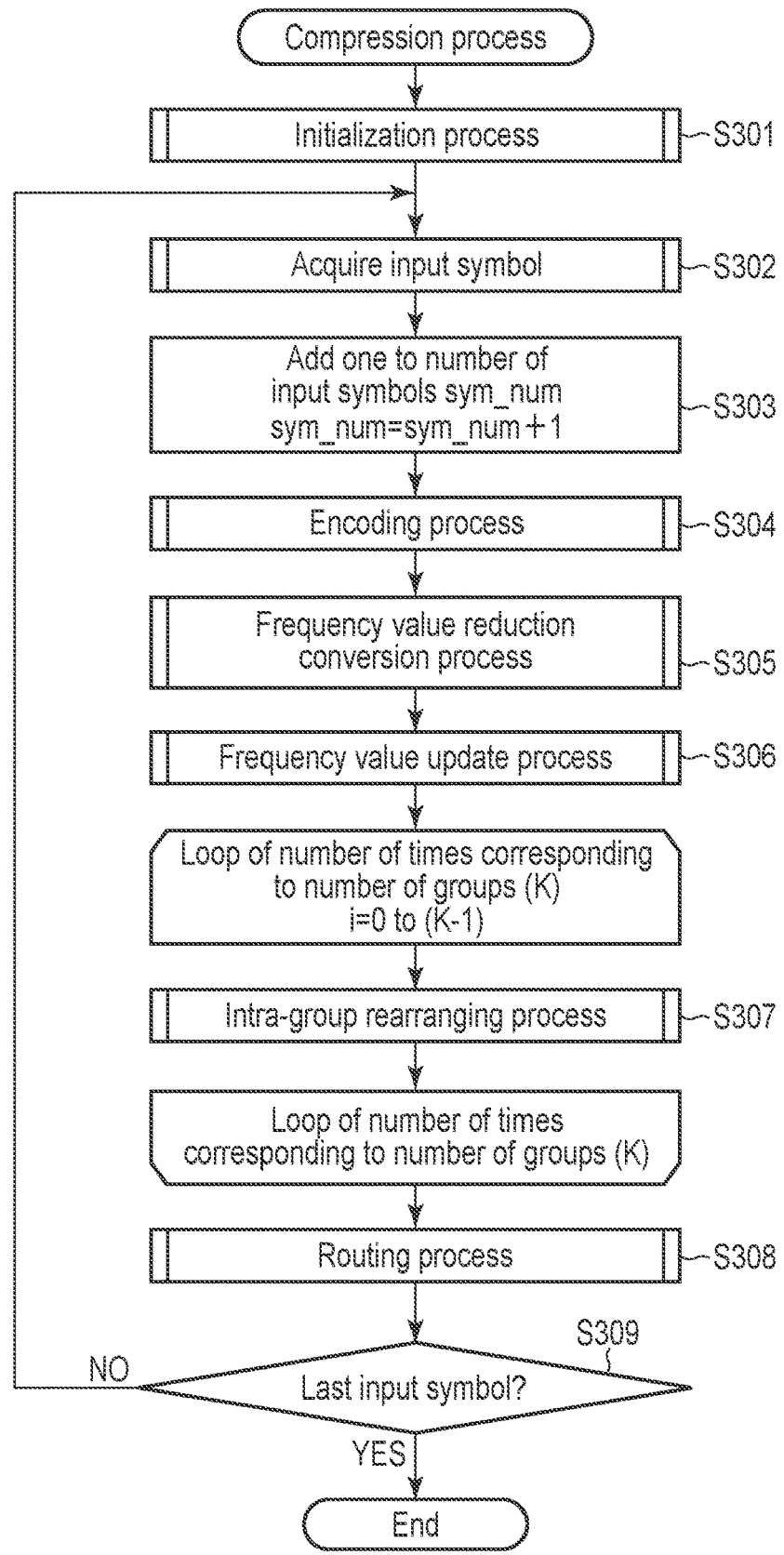
FIG. 27 is a flowchart illustrating an example of the procedure of a compression process executed in the memory system of the fourth embodiment.

FIG. 27 is a flowchart illustrating an example of the procedure of a compression process executed in the memory system 3B. This compression process is realized by, for example, the CPU 12 executing the compression program 61. In the following, an example in which a symbol is input (acquired) at a time is described in order to make the explanation easy to understand. Note that multiple symbols may be input at a time.

The CPU 12 performs an initialization process for initializing variables used in the compression process (step S301). The specific procedure of the initialization process will be described later with reference to the flowchart of FIG. 28.

Next, the CPU 12 acquires an input symbol (step S302). The CPU 12 adds one to the number of input symbols sym_num for counting the number of input symbols (step S303). That is, the number of input symbols sym_num is incremented.

The CPU 12 performs an encoding process for converting the input symbol into a codeword (step S304). The specific procedure of the encoding process will be described later with reference to the flowchart of FIG. 29.

The CPU 12 performs a frequency value reduction conversion process for reducing a frequency value included in each of the frequency entries in the frequency table 71 (step S305). The specific procedure of the frequency value reduction conversion process will be described later with reference to the flowchart of FIG. 30.

Then, the CPU 12 performs a frequency value update process for updating a frequency value in the frequency table 71 on the basis of the input symbol (step S306). The specific procedure of the frequency value update process will be described later with reference to the flowchart of FIG. 31.

The CPU 12 performs an intra-group rearranging process for rearranging the frequency entries for each group in the frequency table 71 in a specific order (step S307). Each of the frequency entries in the frequency table 71 belongs to any one of K groups (specifically, 0-th to (K−1)-th groups). Each of the groups includes several consecutive frequency entries in the frequency table 71.

The CPU 12 rearranges frequency entries belonging to an i-th group on the basis of the frequency values in, for example, each of K times loop process of increasing an variable i from 0 to K−1 by 1. The specific procedure of the intra-group rearranging process will be described later with reference to the flowchart in FIG. 32.

Further, the CPU 12 performs a routing process for exchanging (swapping) frequency entries between two adjacent groups in the frequency table 71 (step S308). The specific procedure of the routing process will be described later with reference to the flowchart of FIG. 33.

Next, the CPU 12 determines whether or not the current input symbol acquired in step S302 is the last input symbol (step S309). When the current input symbol is not the last input symbol (NO in step S309), the CPU 12 returns to step S302 and continues the process for the subsequent input symbol.

When the current input symbol is the last input symbol (YES in step S309), the CPU 12 ends the compression process.

Through the compression process described above, the CPU 12 can update the frequency table 71 in accordance with an input symbol while converting the input symbol into a codeword.

Figure 28:
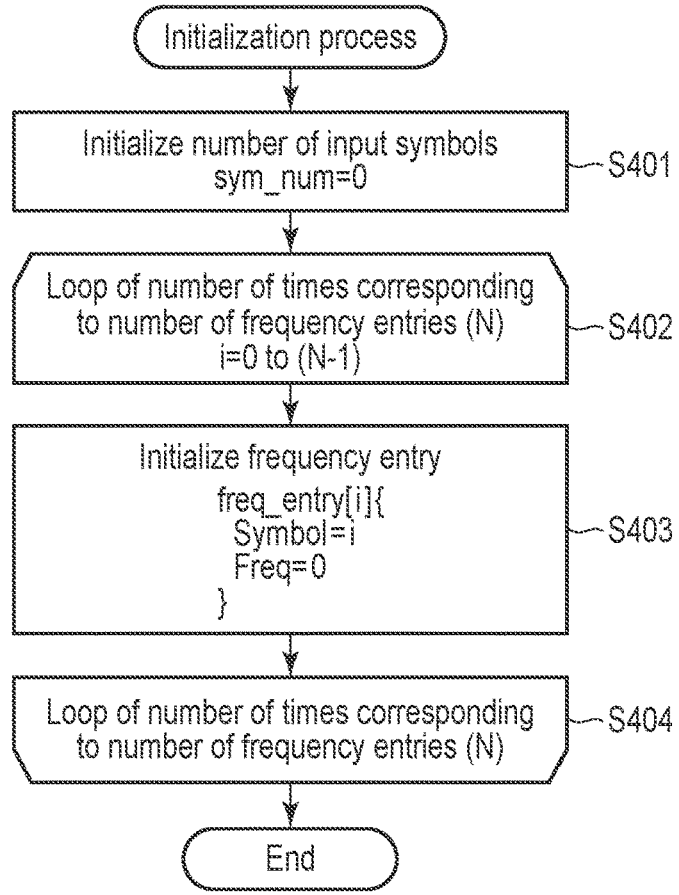
FIG. 28 is a flowchart illustrating an example of the procedure of an initialization process executed in the memory system of the fourth embodiment.

FIG. 28 is a flowchart illustrating an example of the procedure of the initialization process executed in the memory system 3B. The initialization process corresponds to step S301 of the compression process described above with reference to FIG. 27. In addition, the initialization process is realized by, for example, the initialization unit 611 in the compression program 61 executed by the CPU 12.

First, the CPU 12 initializes the number of input symbols sym_num (step S401). That is, the CPU 12 sets zero to the number of input symbols sym_num.

Next, the CPU 12 initializes each of N frequency entries freq_entry included in the frequency table 71 (step S402). More specifically, the CPU 12 initializes the i-th frequency entry freq_entry[i] in each of N times loop process of increasing a variable i from 0 to N−1 by 1. The frequency entry freq_entry[i] includes a symbol value and a frequency value. Here, the CPU 12 sets i as the symbol value (Symbol=i) and zero as the frequency value (Freq=0), in the frequency entry freq_entry[i].

Through the initialization process described above, the CPU 12 initializes the number of input symbols sym_num and each frequency entry in the frequency table 71. In the N frequency entries in the frequency table 71, the CPU 12 sets different values (that is, the variable i) as the symbol values, and sets zero as the frequency values.

Figure 29:
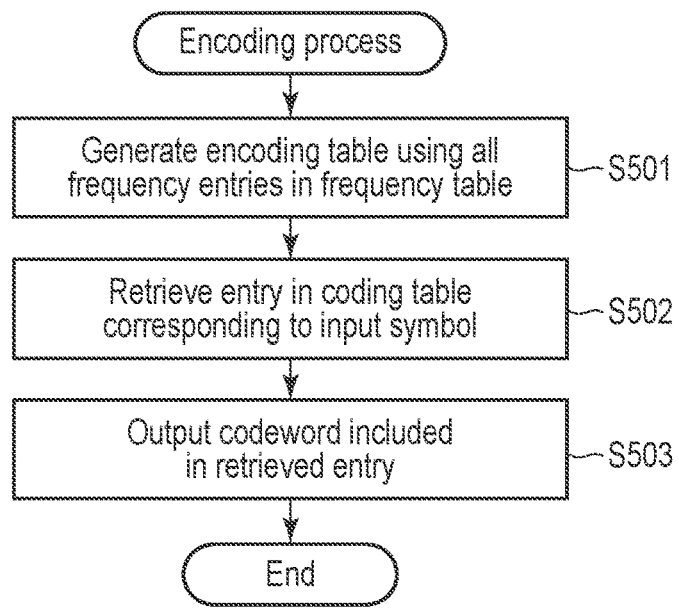
FIG. 29 is a flowchart illustrating an example of the procedure of an encoding process executed in the memory system of the fourth embodiment.

FIG. 29 is a flowchart illustrating an example of the procedure of the encoding process executed in the memory system 3B. The encoding process corresponds to step S304 of the compression process described above with reference to FIG. 27. In addition, the encoding process is realized by, for example, the encoding unit 612 in the compression program 61 executed by the CPU 12.

The CPU 12 generates an encoding table using all the frequency entries in the frequency table 71 (step S501). The generated encoding table may be an encoding table 72 indicative of relationship between each symbol and each codeword, or an encoding table 73 indicative of relationship between each frequency entry number and each codeword. The encoding table 72 includes entries each including a symbol and a codeword, as described above with reference to FIG. 7. The encoding table 73 includes entries each including a frequency entry number and a codeword, as described above with reference to FIG. 8.

The CPU 12 acquires the entry in the encoding table 72 corresponding to the input symbol (step S502). Alternatively, the CPU 12 may use the frequency table 71 to specify the frequency entry number corresponding to the input symbol and acquire the entry in the encoding table 73 corresponding to the frequency entry number.

Then, the CPU 12 outputs the codeword included in the acquired entry (step S503).

Through the encoding process described above, the CPU 12 can generate the encoding table 72 or 73 using the current frequency table 71 and convert an input symbol into a codeword.

Figure 30:
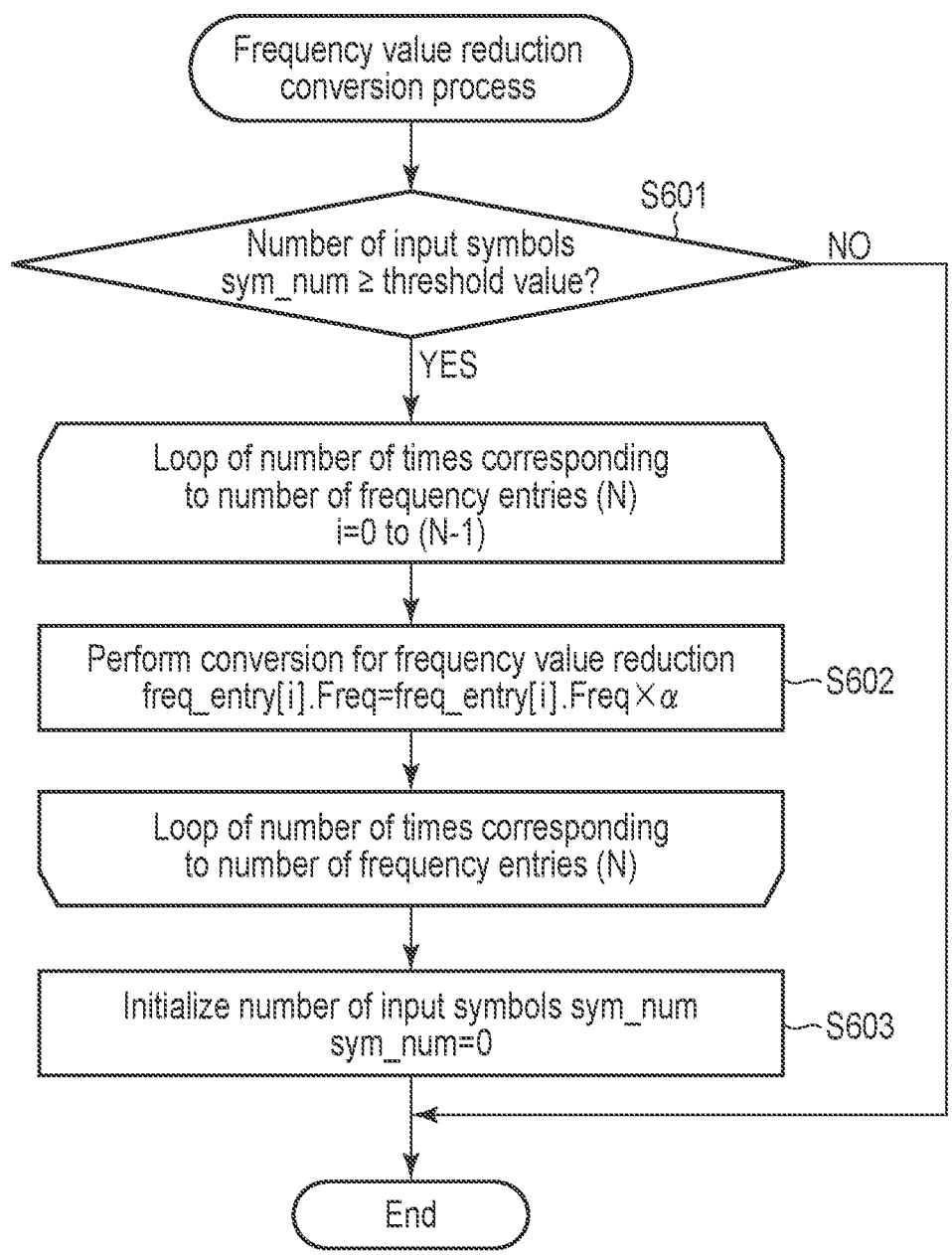
FIG. 30 is a flowchart illustrating an example of the procedure of a frequency value reduction conversion process executed in the memory system of the fourth embodiment.

FIG. 30 is a flowchart illustrating an example of the procedure of the frequency value reduction conversion process executed in the memory system 3B. The frequency value reduction conversion process corresponds to step S305 of the compression process described above with reference to FIG. 27. In addition, the frequency value reduction conversion process is realized by, for example, the frequency value reduction conversion unit 613 in the compression program 61 executed by the CPU 12.

First, the CPU 12 determines whether or not the number of input symbols sym_num is larger than or equal to a threshold value (step S601). When the number of input symbols sym_num is smaller than the threshold value (NO in step S601), the CPU 12 ends the frequency value reduction conversion process.

On the other hand, when the number of input symbols sym_num is larger than or equal to the threshold value (YES in step S601), the CPU 12 performs conversion for frequency value reduction on each of the N entries in the frequency table 71 (step S602). More specifically, the CPU 12 reduces a frequency value (freq_entry[i].Freq) in the i-th frequency entry freq_entry[i], in each of N times loop process of increasing a variable i from 0 to N−1 by 1. The CPU 12 reduces the frequency value in the i-th frequency entry freq_entry[i] to, for example, a specific ratio α (for example, 70%). That is, the CPU 12 multiplies the frequency value in the i-th frequency entry freq_entry[i] by a specific ratio α to obtain the reduced frequency value. Further, a is a value larger than zero and smaller than one.

Note that the CPU 12 may subtract a second value from the frequency value in the i-th frequency entry freq_entry[i] to obtain the reduced frequency value. Alternatively, the CPU 12 may subtract a frequency value in a specific frequency entry from the frequency value in the i-th frequency entry freq_entry[i] to obtain the reduced frequency value.

Then, the CPU 12 initializes the number of input symbols sym_num (step S603), and ends the frequency value reduction conversion process.

Through the frequency value reduction conversion process described above, the frequency value included in each frequency entry can be reduced when the number of input symbols becomes larger than or equal to the threshold value. As a result, the overflow of the frequency value included in each frequency entry can be avoided.

Figure 31:
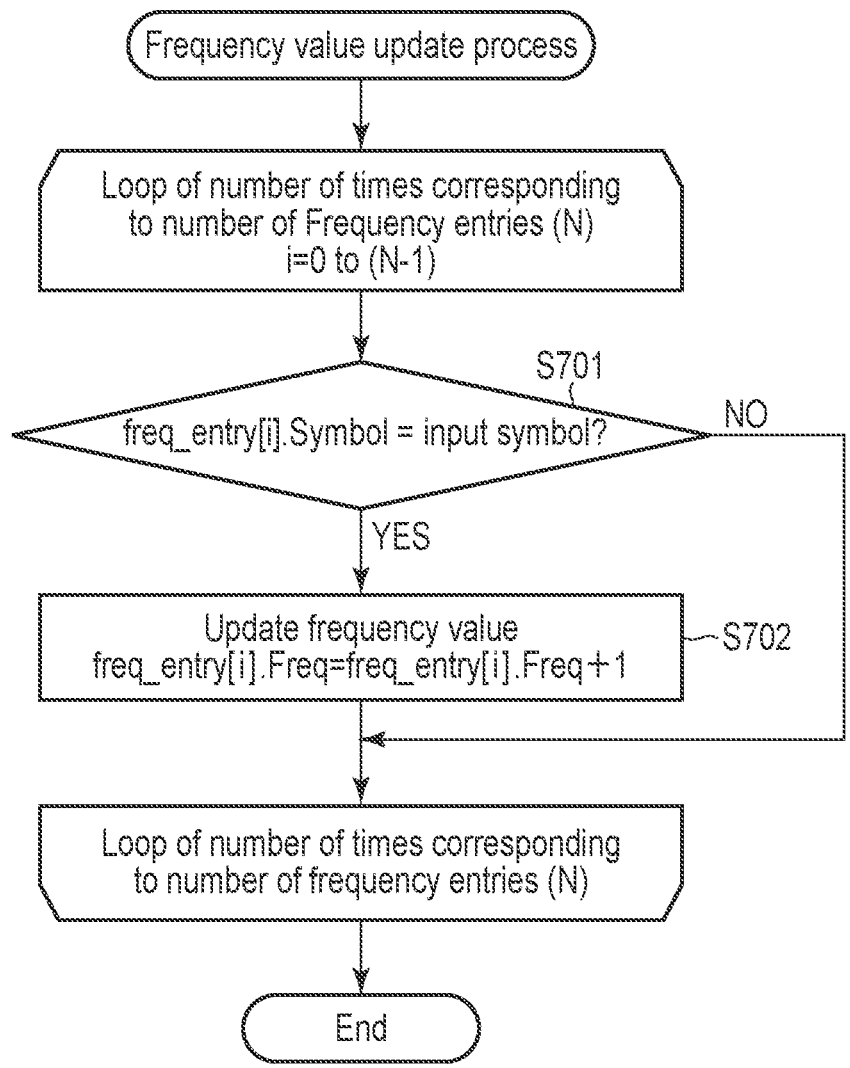
FIG. 31 is a flowchart illustrating an example of the procedure of a frequency value update process executed in the memory system of the fourth embodiment.

FIG. 31 is a flowchart illustrating an example of the procedure of the frequency value update process executed in the memory system 3B. The frequency value update process corresponds to step S306 of the compression process described above with reference to FIG. 27. In addition, the frequency value update process is realized by, for example, the frequency value update unit 614 in the compression program 61 executed by the CPU 12.

The CPU 12 executes the procedure of step S701 and step S702 in each of N times loop process of increasing a variable i from 0 to N−1 by 1.

In each of the N times loop process, the CPU 12 first determines whether or not the symbol (freq_entry[i].Symbol) in the i-th frequency entry in the frequency table 71 matches the input symbol (step S701). When the symbol in the i-th frequency entry matches the input symbol (YES in step S701), the CPU 12 updates the frequency value (freq_entry[i].Freq) in the i-th frequency entry (step S702). For example, the CPU 12 adds one to the frequency value in the i-th frequency entry. Note that when one symbol is input at a time, the CPU 12 may specify a frequency entry including a symbol matching the input symbol, update the frequency value in the frequency entry, and then end the frequency value update process. This is because each frequency entry includes a unique symbol. That is, this is because when the input symbol matches a symbol in a certain frequency entry, the input symbol will not match any of symbols in the other frequency entries.

On the other hand, when the symbol in the i-th frequency entry is different from the input symbol (NO in step S701), the CPU 12 skips step S702.

Through the frequency value update process described above, the CPU 12 can update the frequency value of the frequency entry corresponding to an input symbol.

Figure 32:
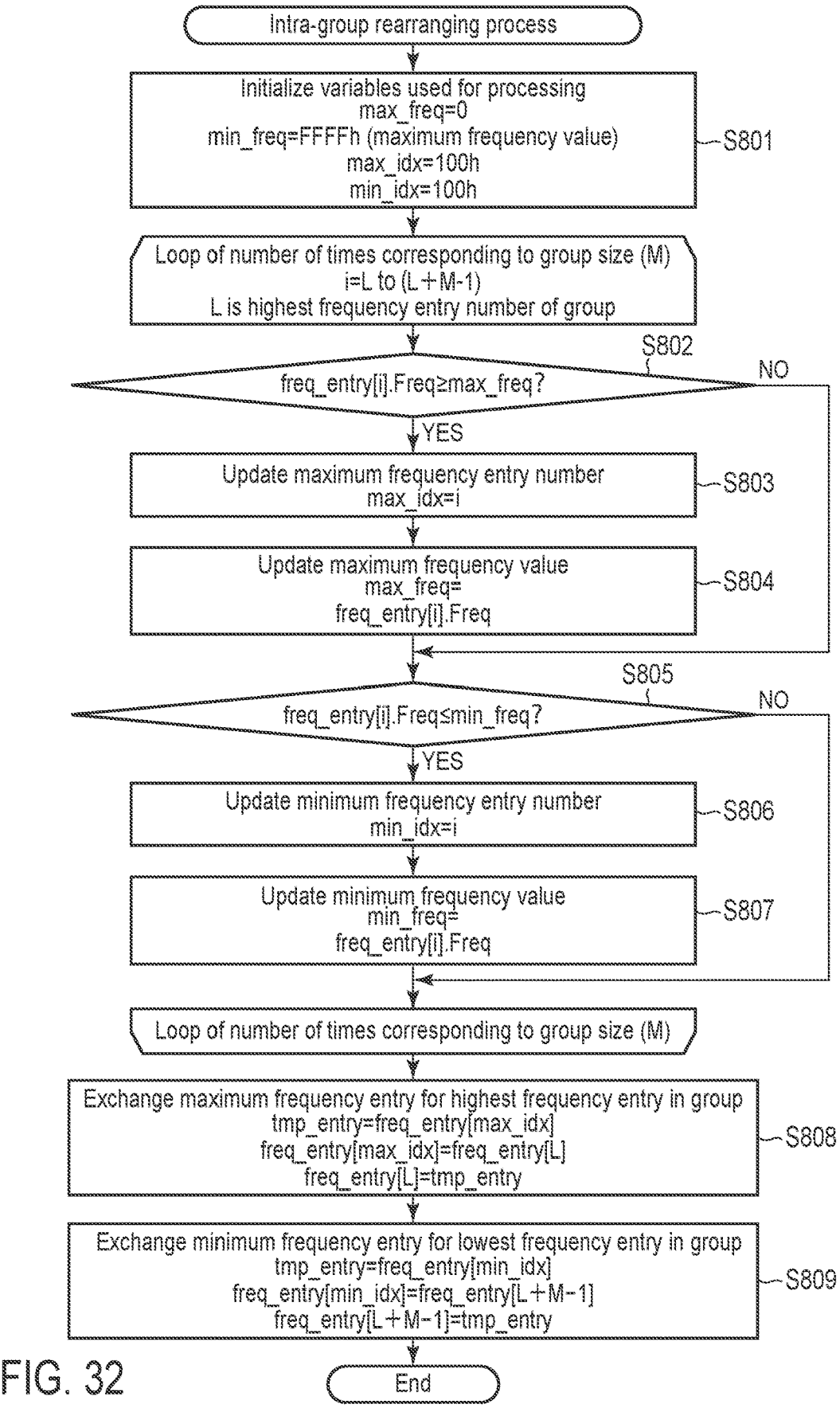
FIG. 32 is a flowchart illustrating an example of the procedure of an intra-group rearranging process executed in the memory system of the fourth embodiment.

FIG. 32 is a flowchart illustrating an example of the procedure of the intra-group rearranging process executed in the memory system 3B. The intra-group rearranging process corresponds to step S307 of the compression process described above with reference to FIG. 27. In addition, the intra-group rearranging process is realized by, for example, the intra-group rearranging unit 615 in the compression program 61 executed by the CPU 12.

Hereinafter, the case where the intra-group rearranging process is performed on a group including M frequency entries is exemplified. The total number M of frequency entries included in a group is also referred to as a group size.

First, the CPU 12 initializes four variables max_freq, min_freq, max_idx, and min_idx used for the intra-group rearranging process (step S801). The max_freq is used for storing the maximum frequency value in a group. The min_freq is used for storing the minimum frequency value in the group. The max_idx is used for storing the frequency entry number of the frequency entry including the maximum frequency value in the group (hereinafter, also referred to as the maximum frequency entry number). The min_idx is used for storing the frequency entry number of the frequency entry including the minimum frequency value in the group (hereinafter, also referred to as the minimum frequency entry number). The CPU 12 sets zero as the variable max_freq. The CPU 12 sets, as the variable min_freq, a maximum value (for example, "FFFFh") which may be set as a frequency value. The CPU 12 sets, as each of the variables max_idx and min_idx, a value (for example, "100 h") corresponding to the total number of frequency entries in the frequency table 71.

Next, the CPU 12 executes the procedure of step S802 to step S807 in each of M times loop process of increasing a variable i from L to L+M−1 by 1. Note that L indicates the frequency entry number corresponding to the highest (that is, foremost) frequency entry in the group.

In each of the M times loop process, the CPU 12 determines whether or not the frequency value in the i-th frequency entry freq_entry[i] is larger than or equal to the max_freq (step S802). When the frequency value in the i-th frequency entry freq_entry[i] is larger than or equal to the max_freq (YES in step S802), the CPU 12 updates the maximum frequency entry number stored in the max_idx (step S803). More specifically, the CPU 12 sets i as the max_idx. Then, the CPU 12 updates the maximum frequency value stored in the max_freq (step S804). That is, the CPU 12 sets the frequency value (freq_entry[i].Freq) in the i-th frequency entry freq_entry[i] as the max_freq.

When the frequency value in the i-th frequency entry freq_entry[i] is smaller than the max_freq (NO in step S802), the CPU 12 skips step S803 and step S804 in order not to update the maximum frequency entry number stored in the max_idx and the maximum frequency value stored in the max_freq.

Next, the CPU 12 determines whether or not the frequency value in the i-th frequency entry freq_entry[i] is smaller than or equal to the min_freq (step S805). When the frequency value in the i-th frequency entry freq_entry[i] is smaller than or equal to the min_freq (YES in step S805), the CPU 12 updates the minimum frequency entry number stored in the min_idx (step S806). More specifically, the CPU 12 sets i as the min_idx. Then, the CPU 12 updates the minimum frequency value stored in the min_freq (step S807). That is, the CPU 12 sets the frequency value (freq_entry[i].Freq) in the i-th frequency entry freq_entry[i] as the min_freq.

When the frequency value in the i-th frequency entry freq_entry[i] exceeds the min_freq (NO in step S805), the CPU 12 skips step S806 and step S807 in order not to update the minimum frequency entry number stored in the min_idx and the minimum frequency value stored in the min_freq.

In response to the completion of the M times loop process each including the procedure from step S802 to step S807, the maximum frequency entry number of the group is set as the max_idx, and the minimum frequency entry number of the group is set as the min_idx.

Then, the CPU 12 exchanges the frequency entry including the maximum frequency value specified by the maximum frequency entry number max_idx for the highest frequency entry in the group, in the frequency table 71 (step S808). Specifically, the CPU 12 copies the contents (that is, the symbol value and the frequency value) of the frequency entry freq_entry[max_idx] including the maximum frequency value to a tmp_entry that is used for temporarily storing contents of a frequency entry. Next, the CPU 12 overwrites the frequency entry freq_entry[max_idx] including the maximum frequency value, with the contents of the highest frequency entry freq_entry[L] in the group. Then, the CPU 12 overwrites the highest frequency entry freq_entry[L] with the contents of the tmp_entry.

As a result, the CPU 12 can exchange the frequency entry including the maximum frequency value for the highest frequency entry in the frequency table 71.

In addition, the CPU 12 exchanges the frequency entry including the minimum frequency value specified by the minimum frequency entry number min_idx for the lowest frequency entry in the group, in the frequency table 71 (step S809). Specifically, the CPU 12 copies the contents of the frequency entry freq_entry[min_idx] including the minimum frequency value to the tmp_entry. Next, the CPU 12 overwrites the frequency entry freq_entry[min_idx] of the minimum frequency value with the contents of the lowest frequency entry freq_entry[L+M−1] in the group. Then, the CPU 12 overwrites the lowest frequency entry freq_entry[L+M−1] with the contents of the tmp_entry.

As a result, the CPU 12 can exchange the frequency entry including the minimum frequency value for the lowest frequency entry, in the frequency table 71.

Through the intra-group rearranging process described above, the CPU 12 can rearrange the frequency entries in the group so that the frequency entry including the maximum frequency value is located at the highest position in the group and the frequency entry including the minimum frequency value is located at the lowest position in the group. When codewords having the same code length are assigned to symbols in frequency entries that belong to a group, as long as the CPU 12 exchanges the frequency entry including the maximum frequency value for the highest frequency entry and exchanges the frequency entry including the minimum frequency value for the lowest frequency entry, the CPU 12 does not need to rearrange other frequency entries other than these four frequency entries on the basis of the frequency values. Codewords having the same code length are assigned to the other frequency entries regardless of the rearrangement. Therefore, the presence or absence of rearrangement for the other frequency entries does not affect the compression ratio. Note that the CPU 12 may rearrange the frequency entries in the group in descending order of the frequency values.

Figure 33:
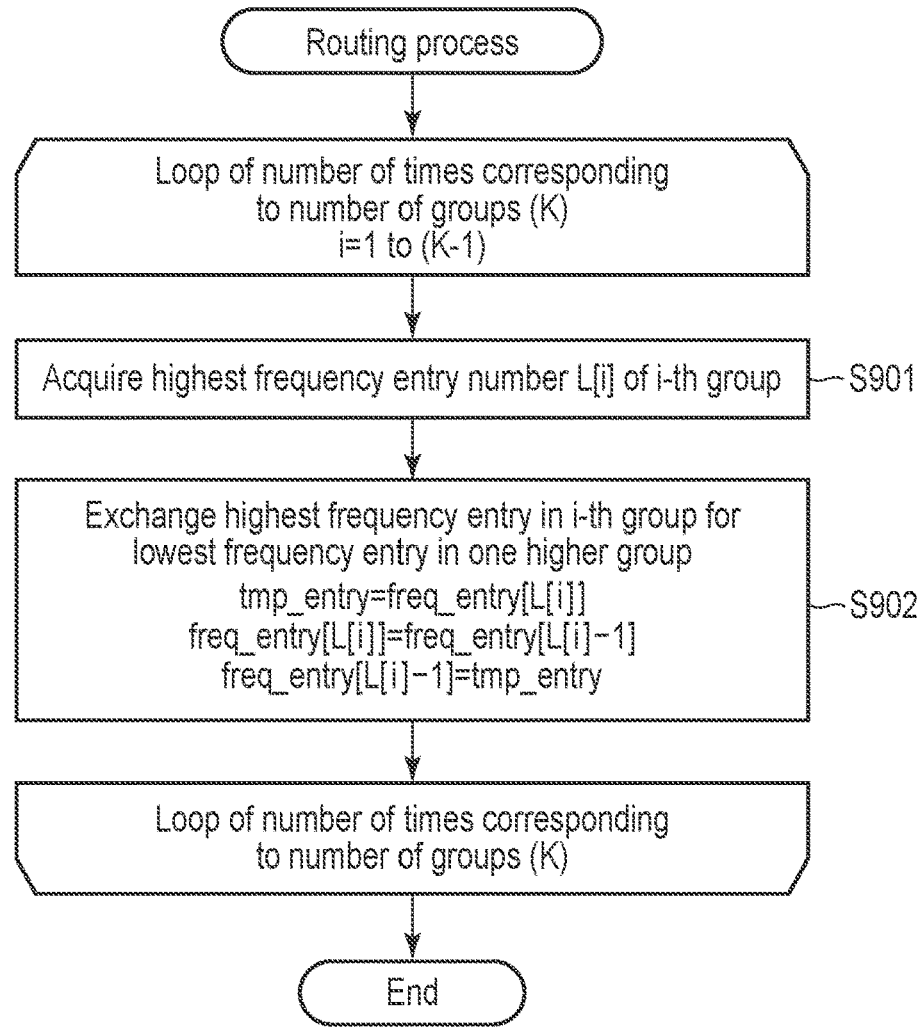
FIG. 33 is a flowchart illustrating an example of the procedure of a routing process executed in the memory system of the fourth embodiment.

FIG. 33 is a flowchart illustrating an example of the procedure of a routing process executed in the memory system 3B. The routing process corresponds to step S308 of the compression process described above with reference to FIG. 27. In addition, the routing process is realized by, for example, the routing unit 616 in the compression program 61 executed by the CPU 12. As described above, each of the frequency entries in the frequency table 71 belongs to one of the K groups.

The CPU 12 executes the procedure of step S901 and step S902 in each of (K−1) times loop process of increasing a variable i from 1 to K−1 by 1.

In each of the (K−1) times loop process, first, the CPU 12 acquires the frequency entry number L[i] corresponding to the highest frequency entry of the i-th group (step S901). Then, the CPU 12 exchanges (swaps) the highest frequency entry in the i-th group, which is specified by the acquired frequency entry number L[i], for the lowest frequency entry in the group that is one higher than the i-th group (that is, the (i−1)-th group) (step S902). Specifically, the CPU 12 copies the contents of the highest frequency entry freq_entry[L[i]] in the i-th group to a tmp_entry, which is used for temporarily storing contents of a frequency entry. Next, the CPU 12 overwrites the highest frequency entry freq_entry[L[i]] in the i-th group with the contents of the lowest frequency entry freq_entry[L[i]−1] in the one higher group. Then, the CPU 12 overwrites the lowest frequency entry freq_entry[L[i]−1] in the one higher group with the contents of the tmp_entry.

Figure 34:
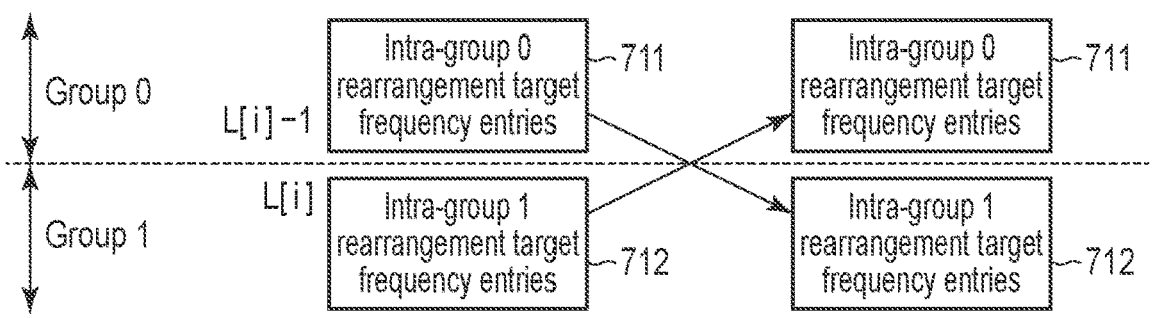
FIG. 34 is a diagram illustrating an example of exchanging the frequency entries by the routing process of FIG. 33.

FIG. 34 illustrates an example of exchanging frequency entries according to the procedure of step S901 and step S902 of the routing process. Intra-group 0 rearrangement target frequency entries 711 belong to the group 0, and indicate frequency entries to be targets of the intra-group rearranging process in the next cycle of the compression process. Intra-group 1 rearrangement target frequency entries 712 belong to the group 1, and indicate frequency entries to be targets of the intra-group rearranging process in the next cycle of the compression process.

For example, the CPU 12 exchanges the highest frequency entry freq_entry[L[i]] of the intra-group 1 rearrangement target frequency entries 712 for the frequency entry freq_entry[L[i]−1] that is one higher than the freq_entry[L[i]]. In other words, the CPU 12 exchanges the lowest frequency entry freq_entry[L[i]−1] in the group 0 for the highest frequency entry freq_entry[L[i]] in the group 1.

Through the routing process described with reference to FIGS. 33 and 34, the CPU 12 can exchange two frequency entries adjacent to each other across groups in the frequency table 71. That is, the CPU 12 can rearrange the lowest frequency entry belonging to a certain group and the highest frequency entry belonging to the subsequent group.

(Decompression Process)

Figure 35:
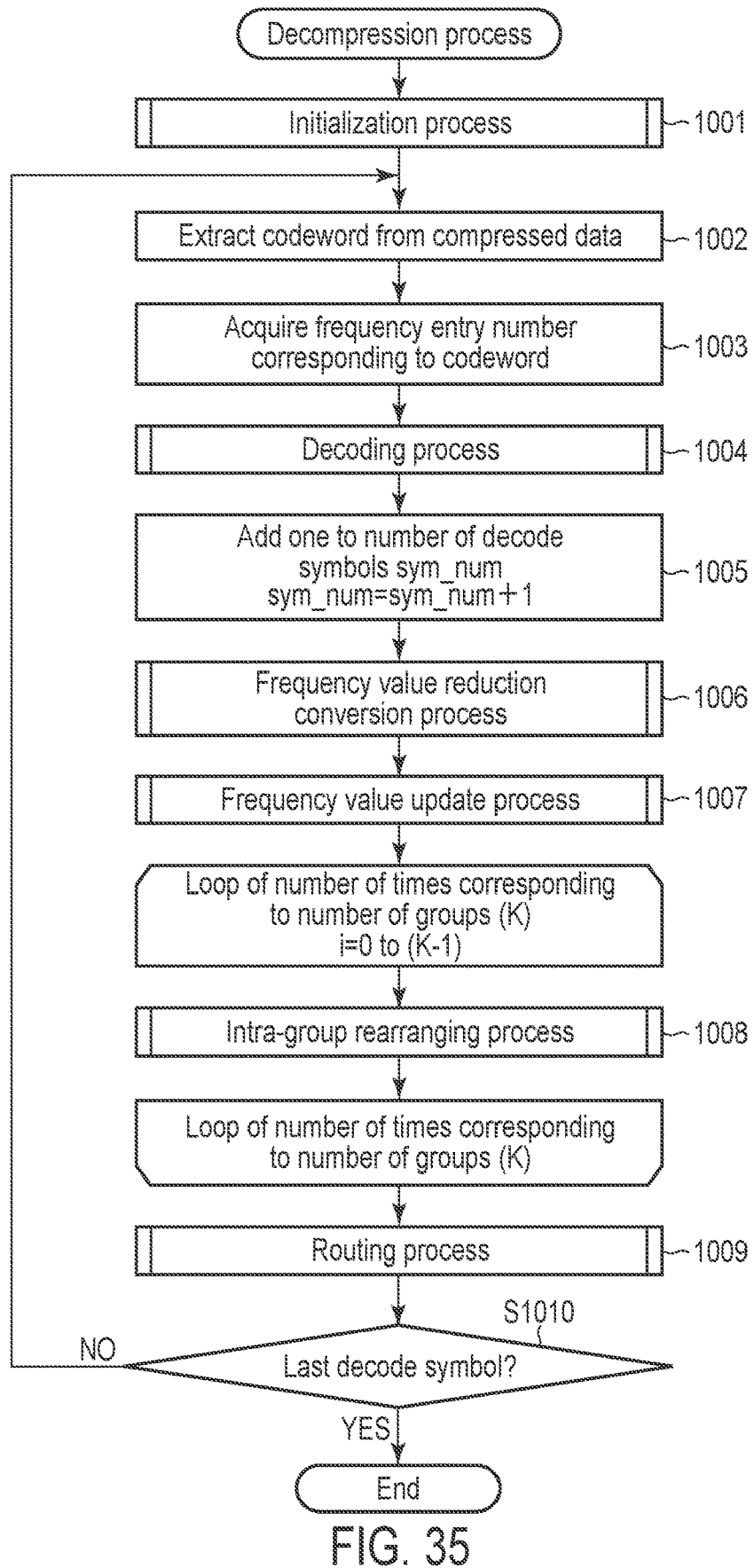
FIG. 35 is a flowchart illustrating an example of the procedure of a decompression process executed in the memory system of the fourth embodiment.

FIG. 35 is a flowchart illustrating an example of the procedure of the decompression process executed in the memory system 3B. This decompression process is realized by, for example, the CPU 12 that executes the decompression program 65. In the following, an example in which codewords are acquired from compressed data one at a time is illustrated in order to make the explanation easy to understand.

The CPU 12 performs an initialization process for initializing variables used in the decompression process (step S1001). The specific procedure of this initialization process is that the number of input symbols is replaced with the number of decode symbols in the procedure of the initialization process described above with reference to the flowchart in FIG. 28. The number of decode symbols is used to count the number of symbols (decode symbols) that are obtained by decoding codewords. The initialization process is realized by, for example, the initialization unit 651 in the decompression program 65 executed by the CPU 12.

Next, the CPU 12 extracts a codeword from compressed data to be decoded (step S1002). The extraction of the codeword is realized by the codeword acquisition unit 652 in the decompression program 65 executed by the CPU 12, for example.

The CPU 12 acquires the frequency entry number corresponding to the extracted codeword (step S1003). The acquisition of the frequency entry number is realized by the entry number acquisition unit 653 in the decompression program 65 executed by the CPU 12, for example. The CPU 12 uses, for example, the encoding table 73 indicative of the relationship between each frequency entry number and each codeword in order to acquire the frequency entry number corresponding to the codeword. Alternatively, the CPU 12 may acquire the frequency entry number corresponding to the codeword on the basis of a specific rule for assigning a codeword to a frequency entry number (for example, a rule for assigning a codeword having a shorter code length to a smaller frequency entry number).

The CPU 12 performs a decoding process for converting the codeword into a symbol using the frequency entry number (step S1004). The specific procedure of the decoding process will be described later with reference to the flowchart of FIG. 36.

Then, the CPU 12 adds one to the number of decode symbols sym_num (step S1005).

Next, the CPU 12 performs a frequency value reduction conversion process for reducing a frequency value included in each entry in the frequency table 71 (step S1006). The specific procedure of this frequency value reduction conversion process is that the number of input symbols is replaced with the number of decode symbols in the procedure of the frequency value reduction conversion process described above with reference to the flowchart in FIG. 30. In addition, the frequency value reduction conversion process is realized by, for example, the frequency value reduction conversion unit 655 in the decompression program 65 executed by the CPU 12.

The CPU 12 performs a frequency value update process for updating a frequency value in the frequency table 71 on the basis of the decode symbol (step S1007). The specific procedure of this frequency value update process is that the input symbol is replaced with the decode symbol in the procedure of the frequency value update process described above with reference to the flowchart in FIG. 31. Alternatively, as the specific procedure of the frequency value update process, the procedure to be described later with reference to the flowchart of FIG. 37 may be used. The frequency value update process is realized by, for example, the frequency value update unit 656 in the decompression program 65 executed by the CPU 12.

The CPU 12 performs an intra-group rearranging process for rearranging frequency entries for each group in the frequency table 71 in a specific order (step S1008). Each of the frequency entries in the frequency table 71 belongs to one of the K groups. The CPU 12 rearranges frequency entries belonging to the i-th group on the basis of the frequency values in, for example, each of K times loop process of increasing a variable i from 0 to K−1 by 1. The specific procedure of the intra-group rearranging process is as described above with reference to the flowchart in FIG. 32. The intra-group rearranging process is realized by, for example, the intra-group rearranging unit 657 in the decompression program 65 executed by the CPU 12.

Further, the CPU 12 performs a routing process for exchanging (swapping) frequency entries between two adjacent groups in the frequency table 71 (step S1009). The specific procedure of the routing process is described as described above with reference to the flowchart of FIG. 33. The routing process is realized by, for example, the routing unit 658 in the decompression program 65 executed by the CPU 12.

Next, the CPU 12 determines whether or not the symbol obtained by the decoding in step S1004 is the last decode symbol in the compressed data (step S1010). In other words, the CPU 12 determines whether or not the codeword extracted in step S1002 is the last codeword in the compressed data to be decoded. When the symbol obtained by the decoding in step S1004 is not the last decode symbol (NO in step S1010), the CPU 12 returns to step S1002 and continues the process for the subsequent codeword.

When the symbol obtained by the decoding in step S1004 is the last decode symbol (YES in step S1010), the CPU 12 ends the decompression process.

Through the decompression process described above, the CPU 12 can update the frequency table 71 in accordance with a symbol while converting a codeword into the symbol. Note that the CPU 12 uses the frequency entry number corresponding to the codeword in the conversion from the codeword into the symbol. Further, the CPU 12 may use the frequency entry number used for the conversion from the codeword into the symbol instead of the decode symbol for updating the frequency table 71.

Figure 36:
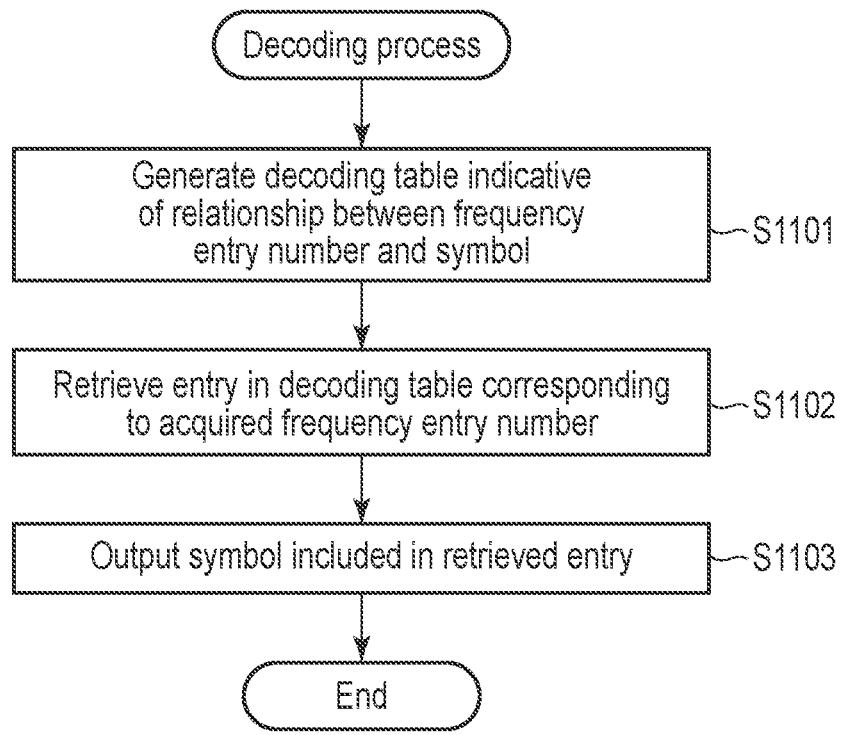
FIG. 36 is a flowchart illustrating an example of the procedure of a decoding process executed in the memory system of the fourth embodiment.

FIG. 36 is a flowchart illustrating an example of the procedure of the decoding process executed in the memory system 3B. The decoding process corresponds to step S1004 of the decompression process described above with reference to FIG. 35. In addition, the decoding process is realized by, for example, the decoding unit 654 in the compression program 61 executed by the CPU 12.

The CPU 12 generate a decoding table indicative of the relationship between each frequency entry number and each symbol, by using all the frequency entries in the frequency table 71 (step S1101). This decoding table includes, for example, entries each including a frequency entry number and a symbol. The CPU 12 may also use the frequency table 71 as the decoding table. The CPU 12 can acquire the relationship between each frequency entry number and each symbol according to the order in which the frequency entries in the frequency table 71 are arranged.

On the basis of the frequency entry number corresponding to the codeword to be decoded (that is, the frequency entry number acquired in step S1003 of the decompression process of FIG. 35), the CPU 12 acquires the entry in the decoding table corresponding to the frequency entry number (step S1102). The CPU 12 may acquire the frequency entry corresponding to the frequency entry number using the frequency table 71, for example.

Then, the CPU 12 outputs the symbol included in the acquired entry (step S1103).

Through the decoding process described above, the CPU 12 can convert a codeword to be decoded into a symbol by using the current frequency table 71 and the frequency entry number corresponding to the codeword.

Figure 37:
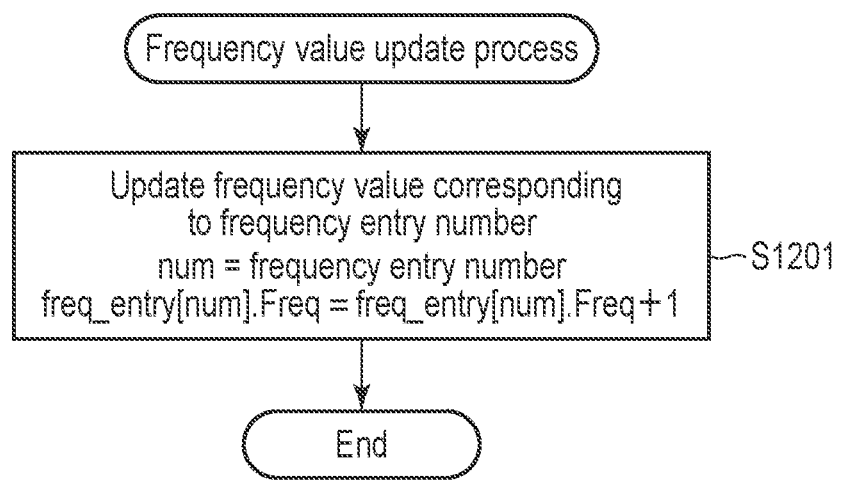
FIG. 37 is a flowchart illustrating an example of the procedure of a frequency value update process executed in the memory system of the fourth embodiment.

FIG. 37 is a flowchart illustrating an example of the procedure of the frequency value update process executed in the memory system 3B. The frequency value update process corresponds to step S1007 of the decompression process described above with reference to FIG. 35. In addition, the frequency value update process is realized by, for example, the frequency value update unit 656 in the decompression program 65 executed by the CPU 12.

The CPU 12 specifies the frequency entry corresponding to the frequency entry number, which corresponds to the codeword to be decoded (that is, the frequency entry number acquired in step S1003 of the decompression process in FIG. 35) and updates the frequency value included in the frequency entry, in the frequency table 71 (step S1201). More specifically, the CPU 12 sets the frequency entry number as, for example, a variable num. Then, the CPU 12 adds one to the frequency value (freq_entry[num].Freq) in the frequency entry specified by the variable num.

Through the frequency value update process described above, the CPU 12 can update the frequency table 71 using the frequency entry number corresponding to the decode symbol instead of using the decode symbol. In this case, the CPU 12 uses the frequency entry number to specify the frequency entry including the decode symbol in the frequency table 71. Therefore, the CPU 12 does not need to compare the decode symbol with a symbol in each frequency entry to find the frequency entry including the decode symbol from the frequency table 71. Therefore, the frequency value update process using the frequency entry number can reduce the amount of processing as compared with the frequency value update process using the decode symbol.

Note that the compression of data may be performed by the compressor 15 of the memory system 3A according to the first embodiment, and the decompression of the compressed data may be performed by causing the CPU 12 of the memory system 3B according to the fourth embodiment to execute the decompression program 65. Alternatively, the compression of data may be performed by causing the CPU 12 of the memory system 3B according to the fourth embodiment to execute the compression program 61, and the decompression of the compressed data may be performed by the decompressor 16 of the memory system 3A according to the first embodiment.

Fifth Embodiment

The second embodiment describes an example in which data compression and decompression are realized by hardware as the compressor 15 and the decompressor 16. On the other hand, a fifth embodiment describes an example in which the functions of the compressor 15 and the decompressor 16 of the second embodiment are realized by software executed by at least one processor.

The configuration of a memory system 3B according to the fifth embodiment is similar to the configuration of the memory system 3B according to the fourth embodiment in which data compression and decompression are realized by software, and the fifth embodiment is different from the fourth embodiment only in the procedure of the intra-group rearranging process executed by each of the intra-group rearranging units 615 and 657, the procedure of the process of rearranging frequency entries between groups, and the procedure of the routing process executed by each of the routing units 616 and 658. Hereinafter, the differences from the fourth embodiment will be mainly described.

Figure 38:
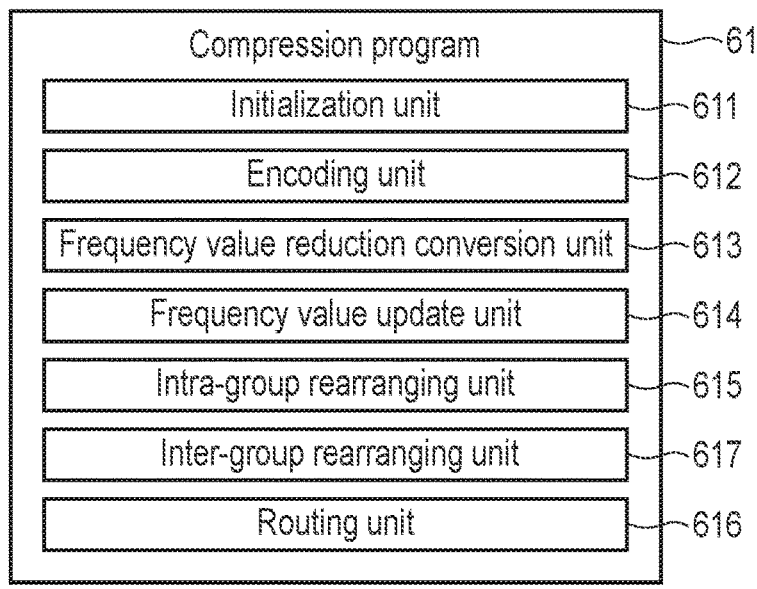
FIG. 38 is a block diagram illustrating a functional configuration example of a compression program executed in a memory system according to a fifth embodiment.

FIG. 38 is a block diagram illustrating a functional configuration example of a compression program 61. The CPU 12 executing the compression program 61 may function as an initialization unit 611, an encoding unit 612, a frequency value reduction conversion unit 613, a frequency value update unit 614, an intra-group rearranging unit 615, an inter-group rearranging unit 617, and a routing unit 616. The operation of the initialization unit 611 is as described in the fourth embodiment. Further, the encoding unit 612, the frequency value reduction conversion unit 613, the frequency value update unit 614, the intra-group rearranging unit 615, the inter-group rearranging unit 617, and the routing unit 616 have the functions similar to those of the encoding unit 151, the frequency value reduction conversion unit 43, the frequency value update unit 44, the intra-group rearranging units 450 and 451, the inter-group rearranging units 460, 461, and 462, and the routing unit 47, respectively, in the compressor 15 of the second embodiment.

Figure 39:
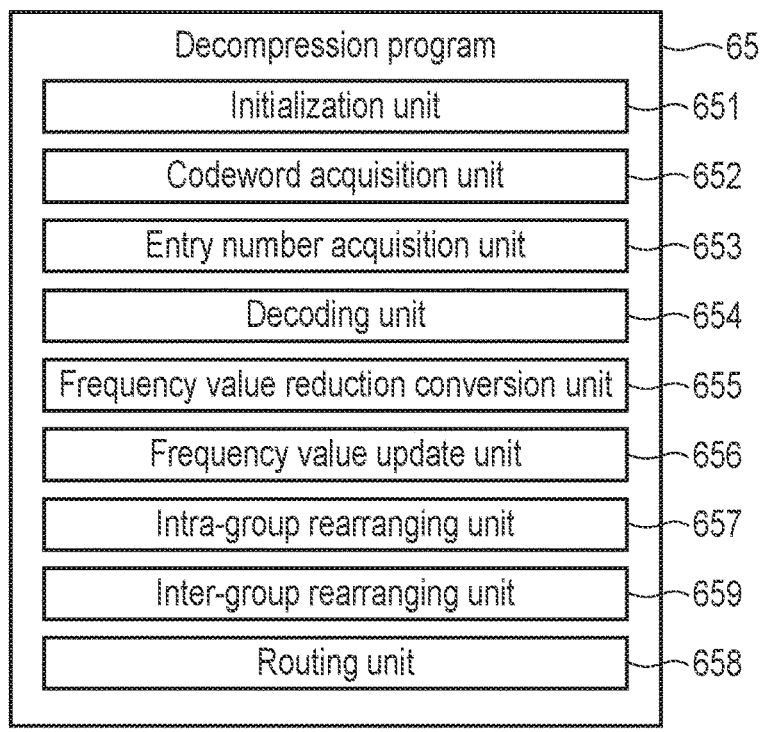
FIG. 39 is a block diagram illustrating a functional configuration example of a decompression program executed in the memory system of the fifth embodiment.

FIG. 39 is a block diagram illustrating a functional configuration example of a decompression program 65. The CPU 12 that executes the decompression program 65 may function as an initialization unit 651, a codeword acquisition unit 652, an entry number acquisition unit 653, a decoding unit 654, a frequency value reduction conversion unit 655, a frequency value update unit 656, an intra-group rearranging unit 657, an inter-group rearranging unit 659, and a routing unit 658. The operation of the initialization unit 651 is as described in the fourth embodiment. The codeword acquisition unit 652, the entry number acquisition unit 653, the decoding unit 654, the frequency value reduction conversion unit 655, the frequency value update unit 656, the intra-group rearranging unit 657, the inter-group rearranging unit 659, and the routing unit 658 have the functions similar to those of the unpack processing unit 161, the entry number acquisition unit 162, the decoding unit 163, the frequency value reduction conversion unit 43, the frequency value update unit 44, the intra-group rearranging units 450 and 451, the inter-group rearranging units 460, 461, and 462, and the routing unit 47, respectively, in the decompressor 16 of the second embodiment.

(Compression Process)

Figure 40:
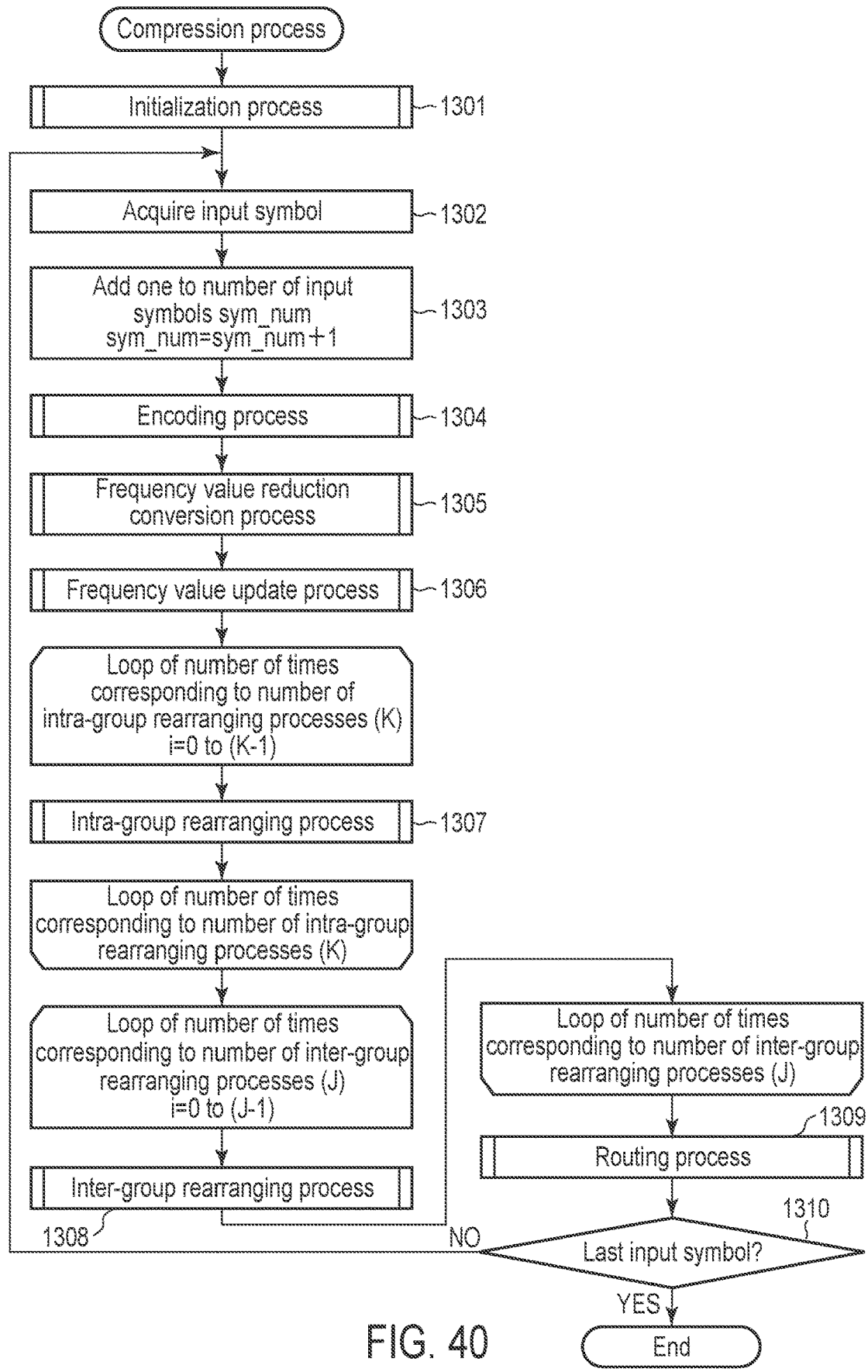
FIG. 40 is a flowchart illustrating an example of the procedure of a compression process executed in the memory system of the fifth embodiment.

FIG. 40 is a flowchart illustrating an example of the procedure of a compression process executed in the memory system 3B. This compression process is realized by the CPU 12 that executes the compression program 61, for example.

The procedure from step S1301 to step S1306 is similar to the procedure from step S301 to step S306 of the compression process described above with reference to the flowchart in FIG. 27.

After updating a frequency value corresponding to an input symbol in a frequency table 71, the CPU 12 performs an intra-group rearranging process for rearranging frequency entries in each group other than frequency entries in code length boundary areas 48 in a specific order, in the frequency table 71 (step S1307). Each of the frequency entries in the frequency table 71 belongs to one of K groups. The CPU 12 performs K intra-group rearranging processes in a single cycle of the compression process for a symbol input. Further, frequency entries within code length boundary areas 48 in a group include, for example, the highest frequency entry and the lowest frequency entry of the frequency entries belonging to the group. That is, the frequency entries obtained by excluding the highest frequency entry and the lowest frequency entry from the frequency entries belonging to the group become the frequency entries targeted for the intra-group rearranging processing.

The CPU 12 rearranges frequency entries, which are obtained by excluding the highest frequency entry and the lowest frequency entry from frequency entries belonging to an i-th group, on the basis of the frequency values in each of K times loop process of increasing a variable i from 0 to K−1 by 1. That is, the CPU 12 performs, for each group, the intra-group rearranging process described above with reference to the flowchart of FIG. 32 on the frequency entries from which the highest frequency entry and the lowest frequency entry are excluded.

Next, the CPU 12 performs an inter-group rearranging process for rearranging frequency entries that are consecutive across groups in a specific order (step S1308). The frequency entries that are consecutive across groups are frequency entries in the code length boundary area 48 that includes a boundary between two adjacent groups. More specifically, the frequency entries that are consecutive across groups include, for example, the lowest frequency entry of frequency entries that belong to a higher group, and the highest frequency entry of frequency entries that belong to a group one lower than the higher group. The CPU 12 performs J (=K−1) inter-group rearranging processes in a single cycle of the compression process.

The CPU 12 rearranges, on the basis of frequency values, the lowest frequency entry of frequency entries belonging to an i-th group and the highest frequency entry of frequency entries belonging to an (i+1)-th group in each of J times loop process of increasing a variable i from 0 to J−1 by 1, for example. The specific procedure of the inter-group rearranging process will be described later with reference to the flowchart in FIG. 41.

The CPU 12 may execute the intra-group rearranging process of step S1307 and the inter-group rearranging process of step S1308 in parallel.

Next, in the frequency table 71, the CPU 12 performs a routing process for exchanging the frequency entry in the code length boundary area 48 for the frequency entry outside the code length boundary area 48 for each group (step S1309). The specific procedure of the routing process will be described later with reference to the flowchart of FIG. 42.

Next, the CPU 12 determines whether or not the current input symbol acquired in step S1302 is the last input symbol (step S1310). When the current input symbol is not the last input symbol (NO in step S1310), the CPU 12 returns to step S1302 and continues the process for the subsequent input symbol.

When the current input symbol is the last input symbol (YES in step S1310), the CPU 12 ends the compression process.

Through the compression process described above, the CPU 12 can update the frequency table 71 in accordance with an input symbol while converting the input symbol into a codeword. Further, by providing the inter-group rearranging process, the CPU 12 is configured so that the CPU 12 may exchange frequency entries between two adjacent groups during two cycles of the compression process. Therefore, as compared with the fourth embodiment that can exchange frequency entries between two adjacent groups during a single cycle of the compression process, the CPU 12 that executes the compression program 61 of the fifth embodiment can further reduce the amount of processing of rearranging frequency entries per cycle, so the throughput can be improved.

Figure 41:
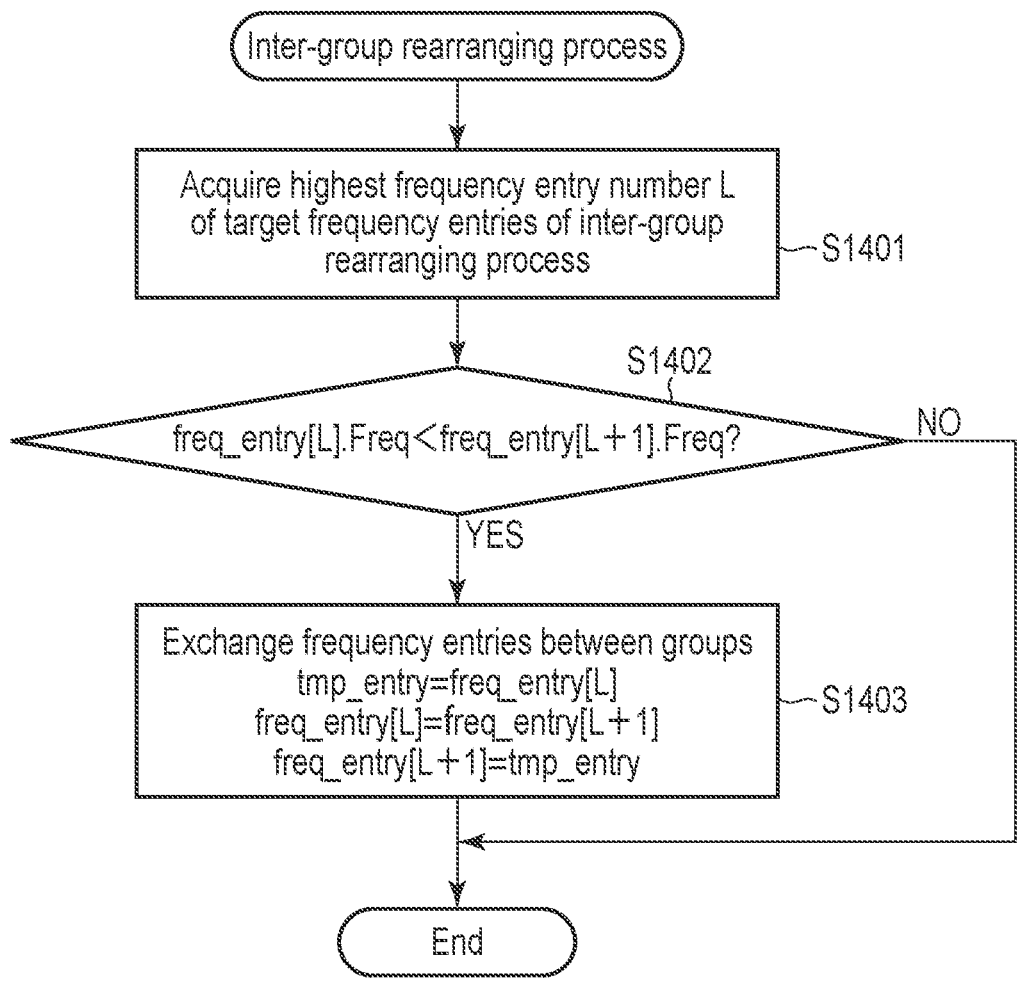
FIG. 41 is a flowchart illustrating an example of the procedure of an inter-group rearranging process executed in the memory system of the fifth embodiment.

FIG. 41 is a flowchart illustrating an example of the procedure of the inter-group rearranging process executed in the memory system 3B. The inter-group rearranging process corresponds to step S1308 of the compression process described above with reference to FIG. 40. In addition, the inter-group rearranging process is realized by, for example, the inter-group rearranging unit 617 in the compression program 61 executed by the CPU 12.

As described above, the CPU 12 performs the inter-group rearranging process on frequency entries that are consecutive across groups. Here, a case is exemplified in which the CPU 12 performs the inter-group rearranging process on the lowest frequency entry of frequency entries belonging to an i-th group (hereinafter, also referred to as the lowest frequency entry of an i-th group) and the highest frequency entry of frequency entries belonging to an (i+1)-th group (hereinafter, also referred to as the highest frequency entry of an (i+1)-th group). The lowest frequency entry of the i-th group and the highest frequency entry of the (i+1)-th group are frequency entries targeted for the inter-group rearranging process.

First, the CPU 12 acquires a frequency entry number L corresponding to the highest frequency entry of the frequency entries targeted for the inter-group rearranging process (step S1401). That is, the CPU 12 acquires the frequency entry number L corresponding to the lowest frequency entry of the i-th group.

Then, the CPU 12 determines whether or not the frequency value (freq_entry[L].Freq) in the lowest frequency entry of the i-th group is smaller than the frequency value (freq_entry[L+1].Freq) in the highest frequency entry of the (i+1)-th group (step S1402). When the frequency value of the lowest frequency entry of the i-th group is smaller than the frequency value of the highest frequency entry of the (i+1)-th group (YES in step S1402), the CPU 12 exchanges these frequency entries between the groups (step S1403). More specifically, the CPU 12 copies the contents of the lowest frequency entry freq_entry[L] in the i-th group to a tmp_entry, which is used for temporarily storing contents of a frequency entry. Next, the CPU 12 overwrites the lowest frequency entry freq_entry[L] of the i-th group with the contents of the highest frequency entry freq_entry[L+1] of the (i+1)-th group. Then, the CPU 12 overwrites the highest frequency entry freq_entry[L+1] of the (i+1)-th with the contents of the tmp_entry.

On the other hand, when the frequency value of the lowest frequency entry of the i-th group is larger than or equal to the frequency value of the highest frequency entry of the (i+1)-th group (NO in step S1402), the CPU 12 skips step S1403 in order not to exchange the frequency entries between the groups.

Through the inter-group rearranging process described above, the CPU 12 can rearrange the entries targeted for the inter-group rearranging process on the basis of the frequency values. Note that when the entries targeted for the inter-group rearranging process include three or more entries, the CPU 12 may rearrange the frequency entries so that the frequency entry including the maximum frequency value is located at the highest position and the frequency entry including the minimum frequency value is located at the lowest position. Alternatively, the CPU 12 may rearrange the frequency entries in descending order of the frequency values.

Figure 42:
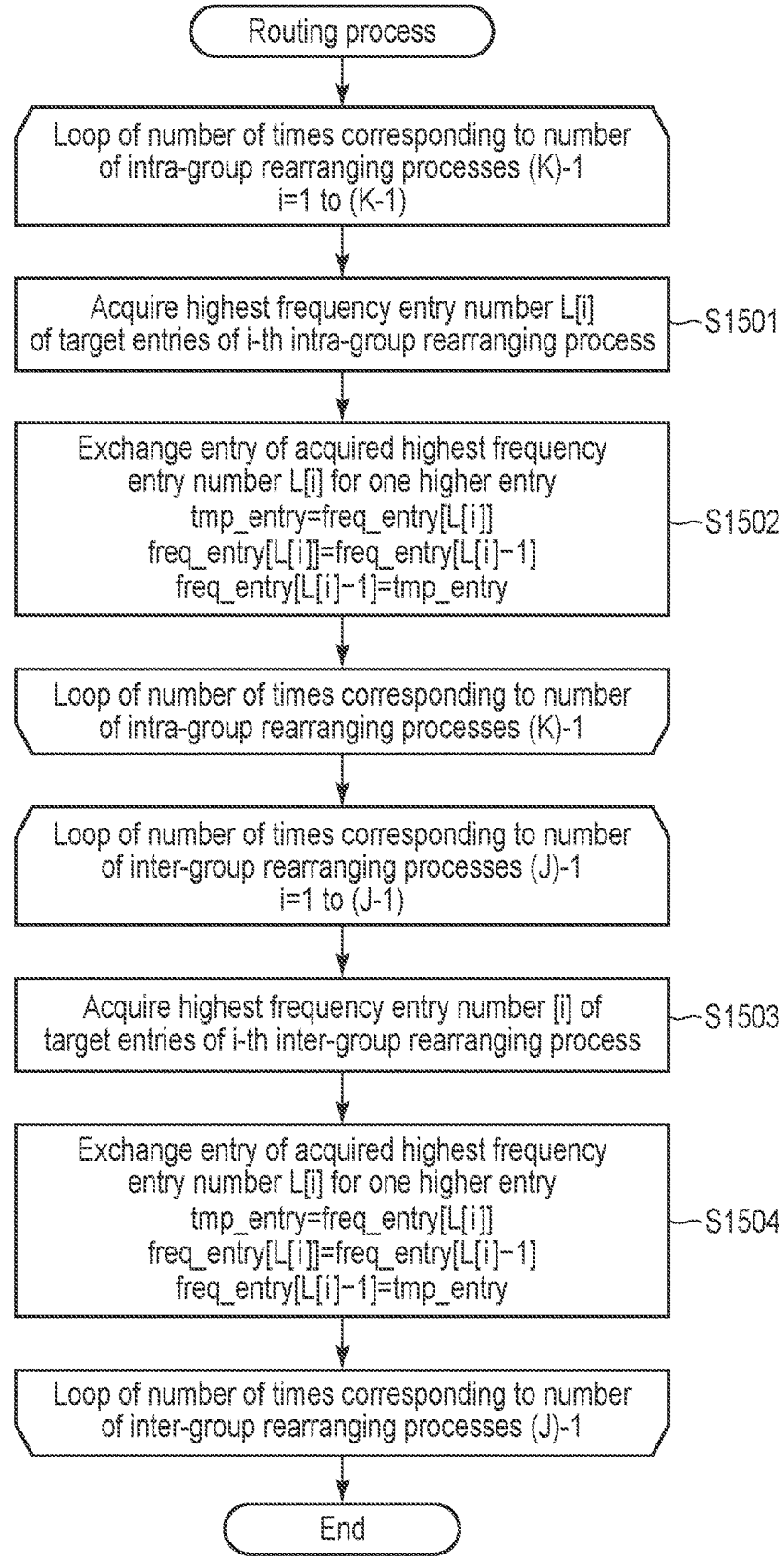
FIG. 42 is a flowchart illustrating an example of the procedure of a routing process executed in the memory system of the fifth embodiment.

FIG. 42 is a flowchart illustrating an example of the procedure of the routing process executed in the memory system 3B. The routing process corresponds to step S1309 of the compression process described above with reference to FIG. 40. In addition, the routing process is realized by, for example, the routing unit 616 in the compression program 61 executed by the CPU 12.

As described above, each of the frequency entries in the frequency table 71 belongs to one of the K groups. The CPU 12 performs K intra-group rearranging processes and J (=K−1) inter-group rearranging processes in a single cycle of the compression process before the routing process.

The CPU 12 executes the procedure of step S1501 and step S1502 in each of (K−1) times loop process of increasing a variable i from 1 to K−1 by 1.

In each of the (K−1) times loop process, first, the CPU 12 acquires the frequency entry number L[i] corresponding to the highest frequency entry of the frequency entries that are the targets of the i-th intra-group rearranging process (hereinafter, also referred to as the highest frequency entry of the i-th intra-group rearranging process) (step S1501). The highest frequency entry of the i-th intra-group rearranging process is, for example, the second highest frequency entry from the top of the i-th group.

Then, the CPU 12 exchanges the highest frequency entry of the i-th intra-group rearranging process, which is specified by the acquired frequency entry number L[i], for the one higher frequency entry (step S1502). This one higher frequency entry is the highest frequency entry in the i-th group.

Specifically, the CPU 12 copies the contents of the highest frequency entry freq_entry[L[i]] of the i-th intra-group rearranging process to a tmp_entry, which is used for temporarily storing contents of a frequency entry. Next, the CPU 12 overwrites the highest frequency entry freq_entry[L[i]] of the i-th intra-group rearranging process with the contents of the one higher frequency entry freq_entry[L[i]−1]. Then, the CPU 12 overwrites the one higher frequency entry freq_entry[L[i]−1] with the contents of the tmp_entry.

By the procedure of step S1501 and step S1502, the CPU 12 can exchange the highest frequency entry of the i-th group for the one higher frequency entry in the frequency table 71, for example.

Next, the CPU 12 executes the procedure of step S1503 and step S1504 in each of (J−1) times loop process of increasing a variable i from 1 to J−1 by 1.

In each of the (J−1) times loop process, first, the CPU 12 acquires the frequency entry number L[i] corresponding to the highest frequency entry of the frequency entries that are the targets of the i-th inter-group rearranging process (hereinafter, also referred to as the highest frequency entry of the i-th inter-group rearranging process) (step S1503). The highest frequency entry of the i-th inter-group rearranging process is, for example, the lowest frequency entry of the (i−1)-th group.

Then, the CPU 12 exchanges the highest frequency entry of the i-th inter-group rearranging process, which is specified by the acquired frequency entry number L[i], for the one higher frequency entry (step S1502). This one higher frequency entry is, for example, the second lowest frequency entry from the bottom of the (i−1)-th group.

Specifically, the CPU 12 copies the contents of the highest frequency entry freq_entry[L[i]] of the i-th inter-group rearranging process to a tmp_entry, which is used for temporarily storing contents of a frequency entry. Next, the CPU 12 overwrites the highest frequency entry freq_entry[L[i]] of the i-th inter-group rearranging process with the contents of the one higher frequency entry freq_entry[L[i]−1]. Then, the CPU 12 overwrites the one higher frequency entry freq_entry[L[i]−1] with the contents of the tmp_entry.

By the procedure of steps S1503 and S1504, the CPU 12 can exchange the lowest frequency entry of the (i−1)-th group for the one higher frequency entry in the frequency table 71, for example.

An example of the frequency entries exchanged by this routing process will be described with reference to FIGS. 43 and 44. Intra-group 0 rearrangement target frequency entries 731 indicate frequency entries that are to be targets of the intra-group rearranging process in the next cycle of the compression process among the frequency entries belonging to the group 0. Inter-group 0/1 rearrangement target frequency entries 732 indicate frequency entries that are to be targets of the inter-group rearranging process in the next cycle of the compression process among the frequency entries belonging to the group 0 and the group 1. Intra-group 1 rearrangement target frequency entries 733 indicate frequency entries that are to be targets of the intra-group rearranging process in the next cycle of the compression process among the frequency entries belonging to the group 1. In addition, the inter-group 0/1 rearrangement target frequency entries 732 is included in the code length boundary area 734, and the other frequency entries 731 and 733 are outside the code length boundary area 734.

Figure 43:
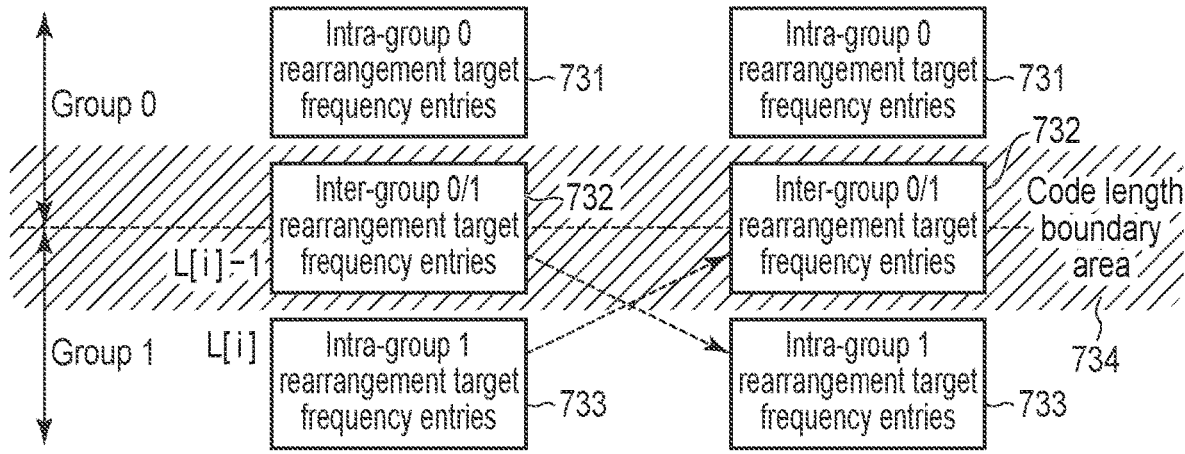
FIG. 43 is a diagram illustrating an example of exchanging frequency entries by the routing process of FIG. 42.

FIG. 43 illustrates an example of exchanging frequency entries according to the procedure of step S1501 and step S1502.

For example, the CPU 12 exchanges the highest frequency entry freq_entry[L[i]] of the intra-group 1 rearrangement target frequency entries 733 for the one higher frequency entry freq_entry[L[i]−1]. In other words, the CPU 12 exchanges the highest frequency entry freq_entry[L[i]−1] of the group 1 for the second highest frequency entry freq_entry[L[i]] from the top. As a result, the CPU 12 can arrange the frequency entry freq_entry[L[i]−1] having a small frequency value at a position that is outside the code length boundary area 734 and is included in the group 1, among the swap target frequency entries that were selected in the previous cycle of the compression process.

Figure 44:
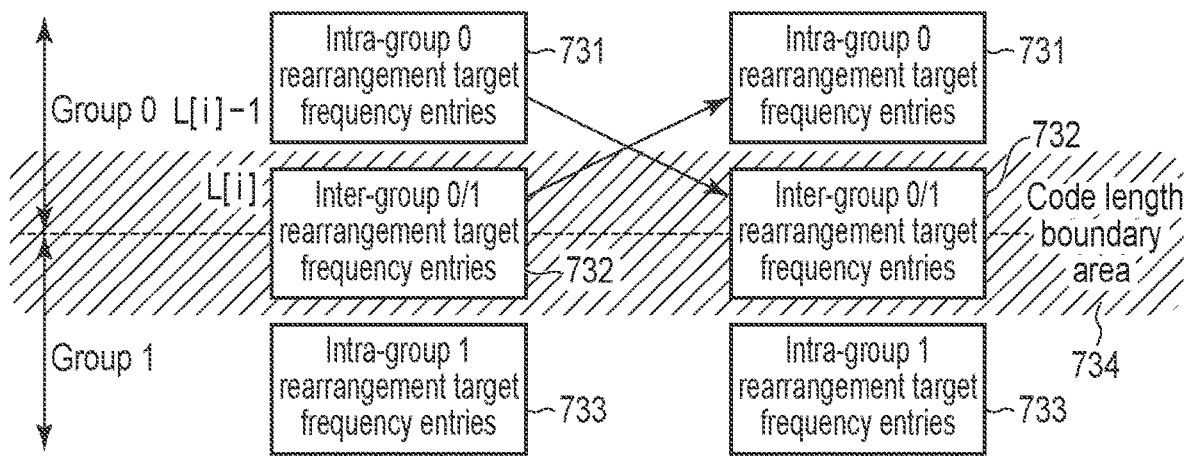
FIG. 44 is a diagram illustrating another example of exchanging the frequency entries by the routing process of FIG. 42.

FIG. 44 illustrates an example of exchanging frequency entries according to the procedure of step S1503 and step S1504.

For example, the CPU 12 exchanges the highest frequency entry freq_entry[L[i]] of the inter-group 0/1 rearrangement target frequency entries 732 for the one higher frequency entry freq_entry[L[i]−1]. In other words, the CPU 12 exchanges the lowest frequency entry freq_entry[L[i]] of the group 0 and the second lowest frequency entry freq_entry[L[i]−1] from the bottom. As a result, the CPU 12 may arrange the frequency entry freq_entry[L[i]−1] having a large frequency value at a position that is outside the code length boundary area 734 and is included in the group 0, among the swap target frequency entries that were selected in the previous cycle of the compression process.

Through the routing process described above with reference to FIGS. 42 to 44, the CPU 12 can exchange a frequency entry in the code length boundary area 734 for a frequency entry outside the code length boundary area 734 for each group in the frequency table 71. More specifically, when a frequency entry of the (i−1)-th group and a frequency entry of the i-th group are selected as swap target frequency entries in a certain cycle of the compression process, the CPU 12 can rearrange the frequency entries so that in the next cycle, the frequency entry having a higher frequency value is located at a position that is outside the code length boundary area 734 and is included in the (i−1)-th group among these swap target frequency entries and the frequency entry having a lower frequency value is located at a position that is outside the code length boundary area 734 and is included in the i-th group.

(Decompression Process)

Figure 45:
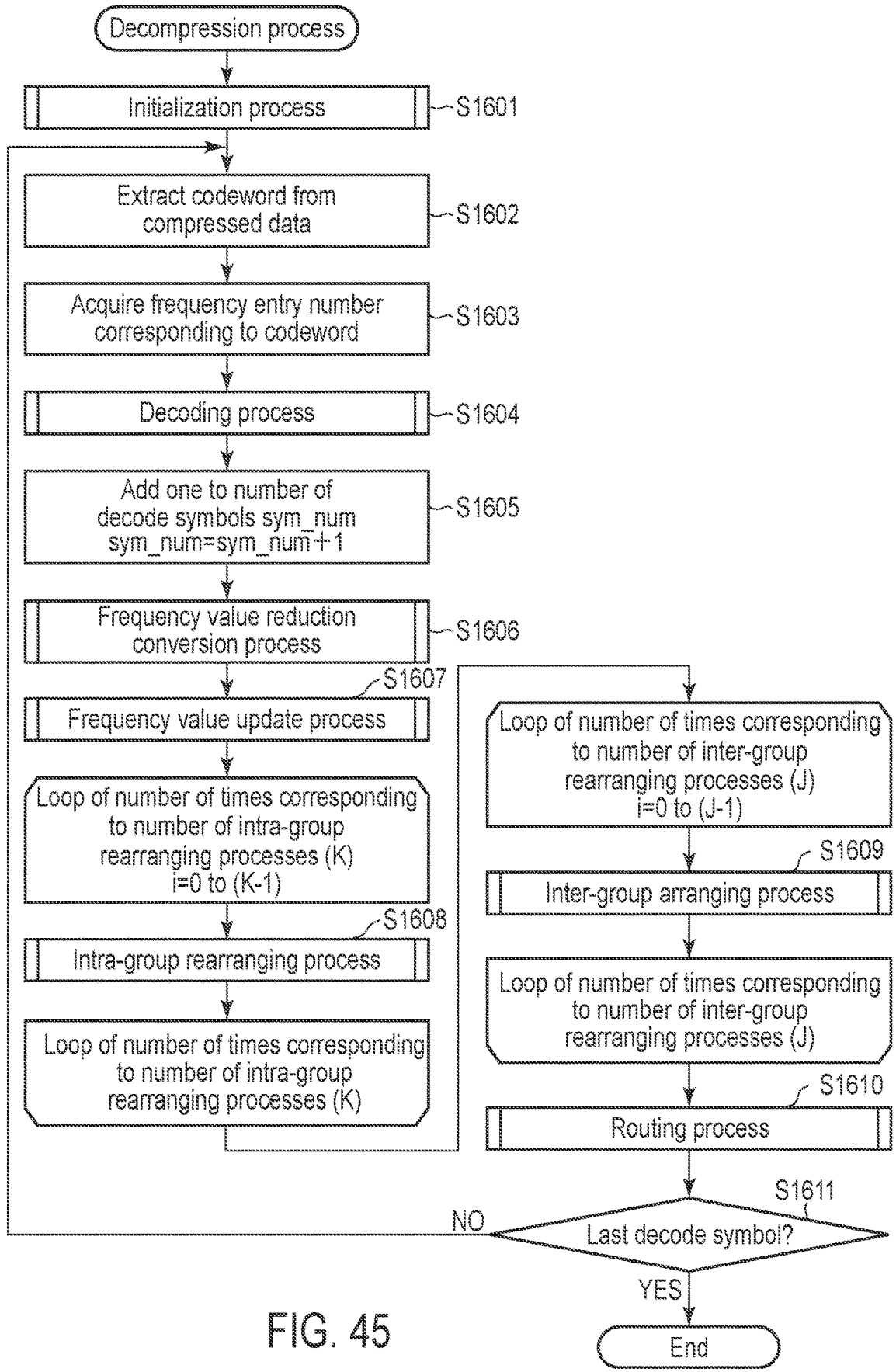
FIG. 45 is a flowchart illustrating an example of the procedure of a decompression process executed in the memory system of the fifth embodiment.

FIG. 45 is a flowchart illustrating an example of the procedure of a decompression process executed in the memory system 3B. This decompression process is realized by the CPU 12 that executes the decompression program 65, for example.

The procedure from step S1601 to step S1607 is similar to the procedure from step S1001 to step S1007 of the decompression process described above with reference to the flowchart in FIG. 35.

In the frequency table 71, the procedure from step S1608 to step S1610 after updating a frequency value corresponding to a frequency entry number is similar to the procedure from step S1307 to step S1309 of the compression process described above with reference to the flowchart of FIG. 40.

Next, the CPU 12 determines whether or not the symbol obtained by the decoding in step S1604 is the last decode symbol in the compressed data (step S1611). In other words, the CPU 12 determines whether or not the codeword extracted in step S1602 is the last codeword in the compressed data to be decoded. When the symbol obtained by the decoding in step S1604 is not the last decode symbol (NO in step S1611), the CPU 12 returns to step S1602 and continues the processing for the subsequent codeword.

When the symbol obtained by the decoding in step S1604 is the last decode symbol (YES in step S1611), the CPU 12 ends the decompression process.

Through the decompression process described above, the CPU 12 can update the frequency table 71 according to a symbol while converting a codeword into the symbol. Further, by providing the inter-group rearranging process, the CPU 12 is configured so that the CPU 12 may exchange the frequency entries between two adjacent groups during two cycles of the decompression process. As compared with the fourth embodiment that may exchange frequency entries between two adjacent groups during a single cycle of the decompression process, the CPU 12 that executes the decompression program 65 of the fifth embodiment can further reduce the amount of processing of rearranging frequency entries that occurs during the decompression process per cycle, so the throughput can be improved.

Note that the compression of data may be performed by the compressor 15 of the memory system 3A according to the second embodiment, and the decompression of the compressed data may be performed by causing the CPU 12 of the memory system 3B according to the fifth embodiment to execute the decompression program 65. Alternatively, the compression of data may be performed by causing the CPU 12 of the memory system 3B according to the fifth embodiment to execute the compression program 61, and the decompression of the compressed data may be performed by the decompressor 16 of the memory system 3A according to the second embodiment.

Sixth Embodiment

The third embodiment illustrates an example in which data compression and decompression are realized by hardware as the compressor 15 and the decompressor 16. On the other hand, the sixth embodiment illustrates an example in which the functions of the compressor 15 and the decompressor 16 according to the third embodiment are realized by software executed by at least one processor.

In addition, the configuration of a memory system 3B according to the sixth embodiment is similar to the configuration of the memory systems 3B of the fourth and fifth embodiments in which data compression and decompression are realized by software, and the sixth embodiment is different from the fourth and fifth embodiments only in the procedure of the intra-group rearranging processes executed by the intra-group rearranging units 615 and 657, the procedure of the inter-group rearranging processes executed by the inter-group rearranging units 617 and 659, the procedure of a process of rearranging frequency entries that are swap candidates of a group set, and the procedure of the routing processes executed by the routing units 616 and 658. Hereinafter, the differences from the fourth and fifth embodiments will be mainly described.

Figure 46:
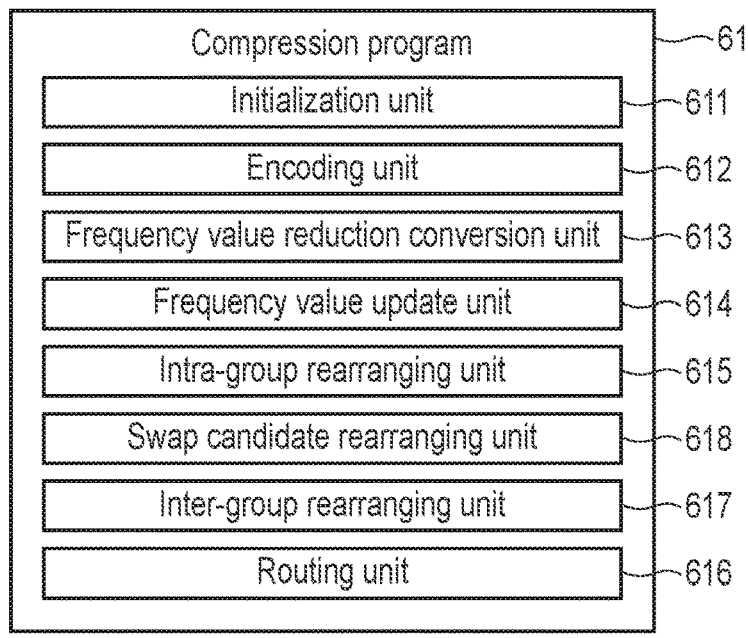
FIG. 46 is a block diagram illustrating a functional configuration example of a compression program executed in a memory system according to a sixth embodiment.

FIG. 46 is a block diagram illustrating a functional configuration example of a compression program 61. The CPU 12 that executes the compression program 61 may function as an initialization unit 611, an encoding unit 612, a frequency value reduction conversion unit 613, a frequency value update unit 614, an intra-group rearranging unit 615, a swap candidate rearranging unit 618, an inter-group rearranging unit 617, and a routing unit 616. The operation of the initialization unit 611 is as described in the fourth embodiment. Further, the encoding unit 612, the frequency value reduction conversion unit 613, the frequency value update unit 614, the intra-group rearranging unit 615, the swap candidate rearranging unit 618, the inter-group rearranging unit 617, and the routing unit 616 have the functions similar to those of the encoding unit 151, the frequency value reduction conversion unit 53, the frequency value update unit 54, the intra-group rearranging units 550, 551, 554, and 555, the swap candidate rearranging units 562 and 563, the inter-group rearranging unit 57, and the routing unit 58, respectively, in the compressor 15 of the third embodiment.

Figure 47:
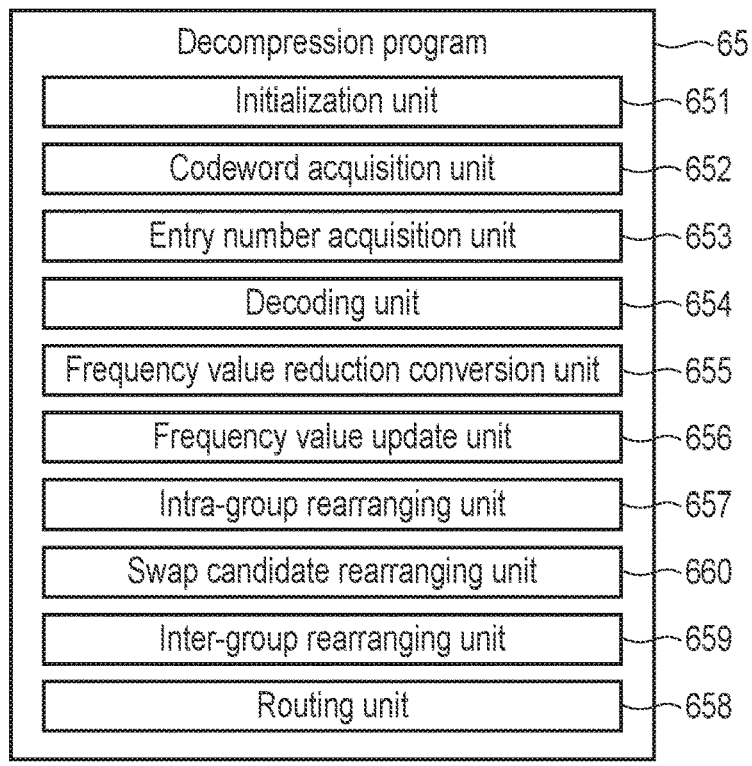
FIG. 47 is a block diagram illustrating a functional configuration example of a decompression program executed in the memory system of the sixth embodiment.

FIG. 47 is a block diagram illustrating a functional configuration example of a decompression program 65. The CPU 12 that executes the decompression program 65 may function as an initialization unit 651, a codeword acquisition unit 652, an entry number acquisition unit 653, a decoding unit 654, a frequency value reduction conversion unit 655, a frequency value update unit 656, an intra-group rearranging unit 657, a swap candidate rearranging unit 660, an inter-group rearranging unit 659, and a routing unit 658. The operation of the initialization unit 651 is as described in the fourth embodiment. In addition, the codeword acquisition unit 652, the entry number acquisition unit 653, the decoding unit 654, the frequency value reduction conversion unit 655, the frequency value update unit 656, the intra-group rearranging unit 657, the swap candidate rearranging unit 660, the inter-group rearranging unit 659, and the routing unit 658 have the functions similar to those of the unpack processing unit 161, the entry number acquisition unit 162, the decoding unit 163, the frequency value reduction conversion unit 53, the frequency value update unit 54, the intra-group rearranging units 550, 551, 554, and 555, the swap candidate rearranging units 562 and 563, the inter-group rearranging unit 57, and the routing unit 58, respectively, in the decompressor 16 of the third embodiment.

(Compression Process)

Figure 48:
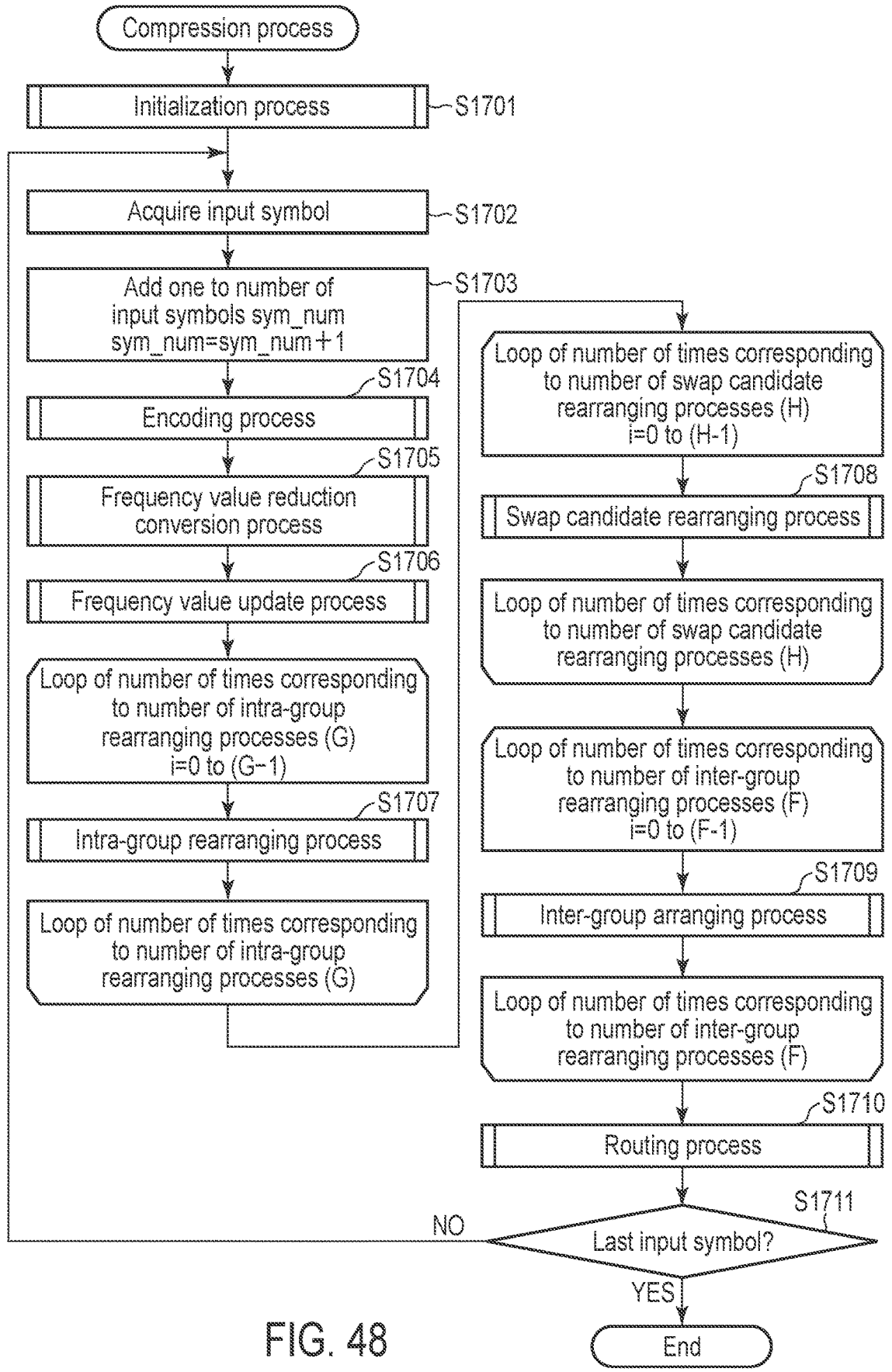
FIG. 48 is a flowchart illustrating an example of the procedure of a compression process executed in the memory system of the sixth embodiment.

FIG. 48 is a flowchart illustrating an example of the procedure of a compression process executed in the memory system 3B. This compression process is realized by the CPU 12 that executes the compression program 61, for example.

Similar to the example of the third embodiment described above with reference to FIGS. 21 to 23, each of frequency entries in the frequency table 71 belongs to any one of groups. Each of the groups includes several consecutive frequency entries in the frequency table 71. Here, the case where the total number of groups into which the frequency entries in the frequency table 71 are divided is K is exemplified. The K groups constitute group sets for each several consecutive groups. Each of the group sets is, for example, a subset of the groups that corresponds to the same code length. Swap target frequency entries may be exchanged between adjacent two group sets. It is assumed that the swap target frequency entries are the lowest frequency entry of the higher group set and the highest frequency entry of the lower group set among the two adjacent group sets. Swap candidate frequency entries further belongs to each group to which the swap target frequency entry belongs. That is, the lowest group of the higher group set includes swap candidate frequency entries and a swap target frequency entry in order from the top. In addition, the highest group of the lower group set includes a swap target frequency entry and swap candidate frequency entries in order from the top.

The procedure from step S1701 to step S1706 is the similar to the procedure from step S301 to step S306 of the compression process described above with reference to the flowchart in FIG. 27.

After updating a frequency value corresponding to an input symbol in a frequency table 71, the CPU 12 performs an intra-group rearranging process for rearranging frequency entries in specific order in each of groups that are obtained by excluding groups each including swap target and the swap candidate frequency entries from all the groups in the frequency table 71 (step S1707).

Here, it is assumed that the CPU 12 performs the intra-group rearranging process on G groups obtained by excluding H groups each including swap target and swap candidate frequency entries from K groups. That is, the CPU 12 performs G intra-group rearranging processes in a single cycle of the compression process.

Specifically, the CPU 12 rearranges frequency entries belonging to a group that is the target of the i-th intra-group rearranging process on the basis of the frequency values, for example, in each of G times loop process of increasing a variable i by 1 from 0 to G−1. That is, the CPU 12 performs the intra-group rearranging process described above with reference to the flowchart of FIG. 32 for each of the groups that is the target of the intra-group rearranging process.

Next, the CPU 12 performs a swap candidate rearranging process for rearranging swap candidate frequency entries in a specific order in each of the H groups to which swap target and swap candidate frequency entries belong (step S1708). The CPU 12 performs H swap candidate rearranging processes in a single cycle of the compression process.

Specifically, the CPU 12 rearranges swap candidate frequency entries belonging to a group that is the target of the i-th swap candidate rearranging process on the basis of the frequency values, for example, in each of H times loop process of increasing a variable i by one from zero to H−1. The specific procedure of the swap candidate rearranging process will be described later with reference to the flowchart of FIG. 49.

In addition, the CPU 12 performs an inter-group rearranging process for rearranging swap target frequency entries, which are consecutive across two adjacent group sets, in a specific order (step S1709). As described above, the swap target frequency entries that are consecutive across two adjacent group sets are, for example, the lowest frequency entry of the frequency entries belonging to the higher group set and the highest frequency entry of the frequency entries belonging to the group set one lower than the higher group set. The CPU 12 performs F (=H/2) inter-group rearranging processes in a single cycle of the compression process.

Specifically, the CPU 12 rearranges, on the basis of the frequency values, the lowest frequency entry of frequency entries belonging to an i-th group set and the highest frequency entries of frequency entries belonging to an (i+1)-th group set in the frequency table 71, for example, in each of F times loop process of increasing a variable i by 1 from 0 to F−1. The specific procedure of the inter-group rearranging process is as described above with reference to the flowchart in FIG. 41.

Note that the CPU 12 may execute the intra-group rearranging process of step S1707, the swap candidate rearranging process of step S1708, and the inter-group rearranging process of step S1709 in parallel.

Further, the CPU 12 performs a routing process for routing frequency entries for each group set in the frequency table 71 (step S1710). The specific procedure of the routing process will be described later with reference to the flowchart of FIG. 50.

Next, the CPU 12 determines whether or not the current input symbol acquired in step S1702 is the last input symbol (step S1711). When the current input symbol is not the last input symbol (NO in step S1711), the CPU 12 returns to step S1702 and continues the process for the subsequent input symbol.

When the current input symbol is the last input symbol (YES in step S1711), the CPU 12 ends the compression process.

Through the compression process described above, the CPU 12 can update the frequency table 71 in accordance with an input symbol while converting the input symbol into a codeword. Further, by providing the inter-group rearranging process and the swap candidate rearranging process, the CPU 12 is configured so that the CPU 12 may exchange frequency entries between two adjacent group sets during three cycles of the compression process. Therefore, as compared with the compression program 61 of the fourth embodiment that may exchange frequency entries between two adjacent groups during a single cycle of the compression process and the compression program 61 of the fifth embodiment that may exchange frequency entries between two adjacent groups during two cycles of the compression process, the CPU 12 that executes the compression program 61 of the sixth embodiment can further reduce the amount of processing of rearrangement of frequency entries per cycle, so the throughput can be improved.

Figure 49:
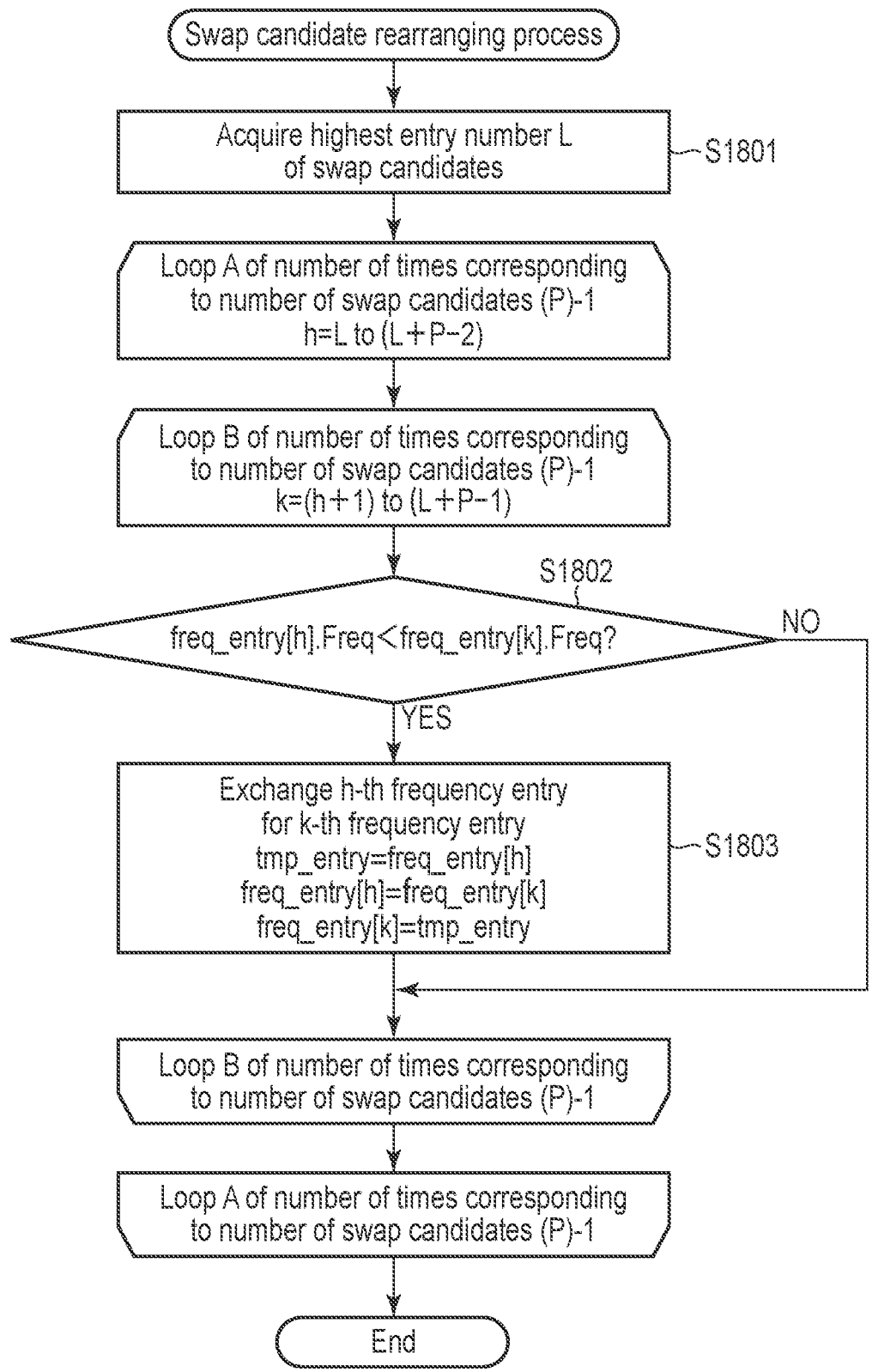
FIG. 49 is a flowchart illustrating an example of the procedure of a swap candidate rearranging process executed in the memory system of the sixth embodiment.

FIG. 49 is a flowchart illustrating an example of the procedure of the swap candidate rearranging process executed in the memory system 3B. The swap candidate rearranging process corresponds to step S1708 of the compression process described above with reference to FIG. 48. In addition, the swap candidate rearranging process is realized by, for example, the swap candidate rearranging unit 618 in the compression program 61 executed by the CPU 12.

As described above, the CPU 12 rearranges, for each group to which swap target and swap candidate frequency entries belong, the swap candidate frequency entries in a specific order in the frequency table 71. Here, the case where the CPU 12 rearranges swap candidate frequency entries, which are included in a group corresponding to an i-th swap candidate rearranging process, in descending order of the frequency values is illustrated. Note that the number of swap candidate frequency entries included in a group is P.

First, the CPU 12 acquires the frequency entry number L corresponding to the highest frequency entry of the swap candidate frequency entries included in the group (step S1801).

Next, the CPU 12 performs, for example, (L+P−h−1) times loop process B of increasing a variable k by 1 from h+1 to L+P−1 in each of (P−1) times loop process A of increasing a variable h by 1 from L to L+P−2. The CPU 12 executes the procedure of step S1802 and step S1803 in each of the (L+P−h−1) times loop process B.

In each of the (L+P−h−1) times loop process B, first, the CPU 12 determines whether or not the frequency value (freq_entry[h].Freq) in the h-th frequency entry in the frequency table 71 is smaller than the frequency value (freq_entry[k].Freq) in the k-th frequency entry (step S1802). When the frequency value in the h-th frequency entry is smaller than the frequency value in the k-th frequency entry (step S1802), the CPU 12 exchanges these frequency entries (step S1803). More specifically, the CPU 12 copies the contents of the h-th frequency entry freq_entry[h] to a tmp_entry, which is used for temporarily storing contents of a frequency entry. Next, the CPU 12 overwrites the h-th frequency entry freq_entry[h] with the contents of the k-th frequency entry freq_entry[k]. Then, the CPU 12 overwrites the k-th frequency entry freq_entry[k] with the contents of the tmp_entry.

On the other hand, when the frequency value in the h-th frequency entry is larger than or equal to the frequency value in the k-th frequency entry (NO in step S1802), the CPU 12 skips the procedure of step S1803 in order not to exchange these frequency entries.

Through the swap candidate rearranging process described above, the CPU 12 can rearrange swap candidate frequency entries in a group in descending order of the frequency values. Note that the CPU 12 may rearrange the swap candidate frequency entries so that the frequency entry including the maximum frequency value is located at the highest position and the frequency entry including the minimum frequency value is located at the lowest position.

Figure 50:
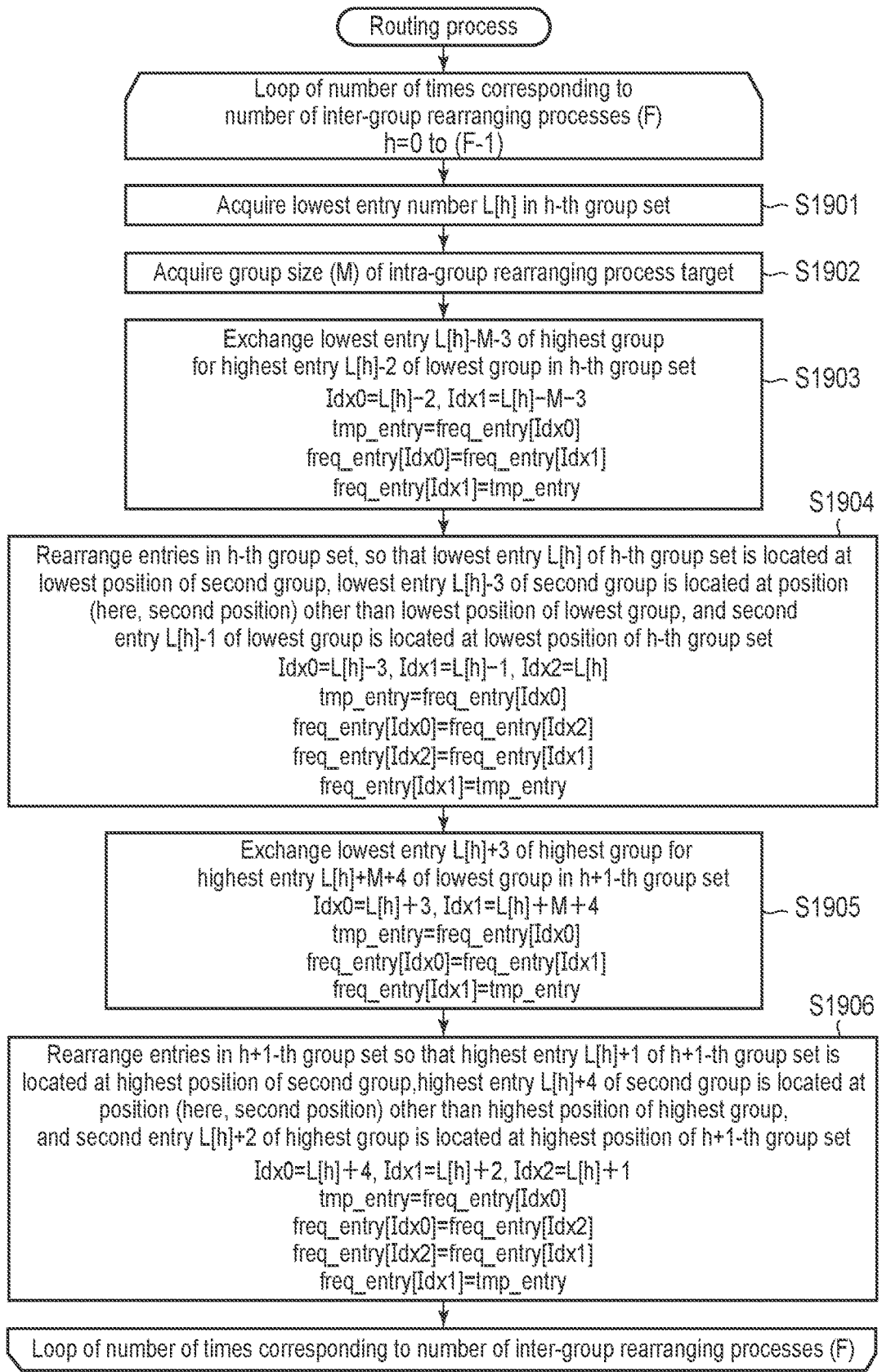
FIG. 50 is a flowchart illustrating an example of the procedure of a routing process executed in the memory system of the sixth embodiment.

FIG. 50 is a flowchart illustrating an example of the procedure of the routing process executed in the memory system 3B. The routing process corresponds to step S1710 of the compression process described above with reference to FIG. 48. In addition, the routing process is realized by, for example, the routing unit 616 in the compression program 61 executed by the CPU 12.

As described above, each of the frequency entries in the frequency table 71 belongs to one of the K groups. The CPU 12 performs G intra-group rearranging processes, H swap candidate rearranging processes, and F inter-group rearranging processes in a single cycle of the compression process before the routing process.

In the following, a case where each group set includes three groups is exemplified in order to make the explanation easy to understand. Each group set is composed of two groups that are targets of the intra-group rearranging process and a group that is a target of the swap candidate rearranging process. The group size of the group that is the target of the swap candidate rearranging process (that is, the group that includes swap target and swap candidate frequency entries) is three. In addition, the group size of each of the groups that are the targets of the intra-group rearranging process is M. Note that it may be M=3.

The CPU 12 executes the procedure of step S1901 to step S1906 in each of F times loop process of increasing a variable h by 1 from 0 to F−1.

In each of the F times loop process, first, the CPU 12 acquires the frequency entry number L[h] corresponding to the lowest frequency entry of the frequency entries included in the h-th group set (hereinafter, also referred to as the lowest frequency entry of the h-th group set) (step S1901). The lowest frequency entry of the h-th group set is a swap target frequency entry.

Next, the CPU 12 acquires the size M of a target group of the intra-group rearranging process (step S1902).

Then, the CPU 12 exchanges, in the h-th group set, the lowest frequency entry of the frequency entries belonging to the highest group (hereinafter, referred to as the lowest frequency entry of the highest group of the higher group set) for the highest frequency entry of the frequency entries belonging to the lowest group (hereinafter, referred to as the highest frequency entry of the lowest group of the higher group set) (step S1903). By this exchange, the highest frequency entry of the lowest group of the higher group set is no longer the swap candidate frequency entry. Also, the lowest frequency entry of the highest group of the higher group set becomes the next swap candidate frequency entry.

Specifically, the CPU 12 sets, to the variable Idx0, the frequency entry number L[h]−2 corresponding to the highest frequency entry of the lowest group of the higher group set. The CPU 12 sets, to a variable Idx1, the frequency entry number L[h]−M−3 corresponding to the lowest frequency entry of the highest group of the higher group set.

The CPU 12 copies the contents of the highest frequency entry freq_entry[Idx0] of the lowest group of the higher group set to a tmp_entry, which is used for temporarily storing contents of a frequency entry. The CPU 12 overwrites the highest frequency entry freq_entry[Idx0] of the lowest group of the higher group set with the contents of the lowest frequency entry freq_entry[Idx1] of the highest group in the higher group set. Then, the CPU 12 overwrites the lowest frequency entry freq_entry[Idx1] of the highest group of the higher group set with the contents of the tmp_entry.

Next, the CPU 12 rearranges the frequency entries of the h-th group set so as to have the following arrangements (1) to (3) (step S1904).

(1) The lowest frequency entry of the h-th group set is located at the lowest position of the second group of the h-th group set.

(2) The lowest frequency entry of the frequency entries belonging to the second group of the h-th group set (hereinafter, referred to as the lowest frequency entry of the second group of the higher group set) is located at any one of positions other than the lowest position of the lowest group of the h-th group set (for example, second position from the bottom in the lowest group).

(3) The second highest frequency entry from the top of the frequency entries belonging to the lowest group of the h-th group set (hereinafter, referred to as the second frequency entry of the lowest group of the higher group set) is located at the lowest position of the h-th group set.

By the rearrangement of (1), the lowest frequency entry of the higher group set is no longer the swap target frequency entry, but becomes a frequency entry that is a target of intra-group rearrangement. By the rearrangement of (2), the lowest frequency entry of the second group of the higher group set becomes the next swap candidate frequency entry. Further, by the rearrangement of (3), the second frequency entry of the lowest group of the higher group set becomes the next swap target frequency entry.

More specifically, the CPU 12 sets, to the variable Idx0, the frequency entry number L[h]−3 corresponding to the lowest frequency entry of the second group of the higher group set. The CPU 12 sets, to the variable Idx1, the frequency entry number L[h]−1 corresponding to the second frequency entry of the lowest group of the higher group set. The CPU 12 sets, to a variable Idx2, the frequency entry number L[h] corresponding to the lowest frequency entry of the higher group set.

The CPU 12 copies the contents of the lowest frequency entry freq_entry[Idx0] of the second group of the higher group set to the tmp_entry, which is used for temporarily storing contents of a frequency entry. The CPU 12 overwrites the lowest frequency entry freq_entry[Idx0] of the second group of the higher group set with the contents of the lowest frequency entry freq_entry[Idx2] of the higher group set. The CPU 12 overwrites the lowest frequency entry freq_entry[Idx2] of the higher group set with the contents of the second frequency entry freq_entry[Idx1] of the lowest group of the higher group set. Then, the CPU 12 overwrites the second lowest frequency entry freq_entry[Idx1] of the lowest group of the higher group set with the contents of the tmp_entry.

Further, the CPU 12 exchanges, in the (h+1)-th group set, the lowest frequency entry of the frequency entries belonging to the highest group (hereinafter, referred to as the lowest frequency entry of the highest group of the lower group set) for the highest frequency entry of the frequency entries belonging to the lowest group (hereinafter, referred to as the highest frequency entry of the lowest group of the lower group set) (step S1905). By this exchange, the lowest frequency entry of the highest group of the lower group set is no longer the swap candidate frequency entry. Also, the highest frequency entry of the lowest group of the lower group set becomes the next swap candidate frequency entry.

Specifically, the CPU 12 sets, to the variable Idx0, the frequency entry number L[h]+3 corresponding to the lowest frequency entry of the highest group of the lower group set. The CPU 12 sets, to the variable Idx1, the frequency entry number L[h]+M+4 corresponding to the highest frequency entry of the lowest group of the lower group set.

The CPU 12 copies the contents of the lowest frequency entry freq_entry[Idx0] of the highest group of the lower group set to the tmp_entry, which is used for temporarily storing contents of a frequency entry. The CPU 12 overwrites the lowest frequency entry freq_entry[Idx0] of the highest group of the lower group set with the contents of the highest frequency entry freq_entry[Idx1] of the lowest group in the lower group set. Then, the CPU 12 overwrites the highest frequency entry freq_entry[Idx1] of the lowest group of the lower group set with the contents of the tmp_entry.

Next, the CPU 12 rearranges the frequency entries of the (h+1)-th group set so as to have the following arrangements (4) to (6) (step S1906).

(4) The highest frequency entry of the frequency entries included in the (h+1)-th group set (hereinafter, referred to as the highest frequency entry of the lower group set) is located at the highest position of the second group of the (h+1)-th group set.

(5) The highest frequency entry of the frequency entries belonging to the second group of the (h+1)-th group set (hereinafter, referred to as the highest frequency entry of the second group of the lower group set) is located at any one of positions other than the highest position of the highest group of the (h+1)-th group set (for example, second position from the top in the highest group).

(6) The second frequency entry of the frequency entries belonging to the highest group of the (h+1)-th group set (hereinafter, referred to as the second frequency entry of the highest group of the lower group set) is located at the highest position of the (h+1)-th group set (that is, highest position of the lower group set).

By the rearrangement of (4), the highest frequency entry of the lower group set is no longer the swap target frequency entry but becomes the frequency entry that is a target of intra-group rearrangement. By the rearrangement of (5), the highest frequency entry of the second group of the lower group set becomes the next swap candidate frequency entry. Further, by the rearrangement of (6), the second frequency entry of the highest group of the lower group set becomes the next swap target frequency entry.

Specifically, the CPU 12 sets, to the variable Idx0, the frequency entry number L[h]+4 corresponding to the highest frequency entry of the second group of the lower group set. The CPU 12 sets, to the variable Idx1, the frequency entry number L[h]+2 corresponding to the second frequency entry of the highest group of the lower group set. The CPU 12 sets, to the variable Idx2, the frequency entry number L[h]+1 corresponding to the highest frequency entry of the lower group set.

The CPU 12 copies the contents of the highest frequency entry freq_entry[Idx0] of the second group of the lower group set to the tmp_entry, which is used for temporarily storing contents of a frequency entry. The CPU 12 overwrites the highest frequency entry freq_entry[Idx0] of the second group of the lower group set with the contents of the highest frequency entry freq_entry[Idx2] of the lower group set. The CPU 12 overwrites the highest frequency entry freq_entry[Idx2] of the lower group set with the contents of the second frequency entry freq_entry[Idx1] of the highest group in the lower group set. Then, the CPU 12 overwrites the second frequency entry freq_entry[Idx1] of the highest group of the lower group set with the contents of the tmp_entry.

An example of frequency entries exchanged by this routing process of FIG. 50 will be described with reference to FIGS. 51 to 54. Here, the case where the CPU 12 performs the routing process on two group sets each composed of three groups is exemplified. The two group sets are referred to as a higher group set 741 and a lower group set 742, depending on their positions in the frequency table 71. The higher group set 741 is composed of three groups 0, 1, and 2 including higher frequency entries in the frequency table 71. In addition, the lower group set 742 is composed of three groups 3, 4, and 5 including lower frequency entries in the frequency table 71.

Intra-group 0 rearrangement target frequency entries 751 belong to the group 0, and indicate frequency entries to be targets of the intra-group rearranging process in the next cycle of the compression process. Intra-group 1 rearrangement target frequency entries 752 belong to the group 1, and indicate frequency entries to be targets of the intra-group rearranging process in the next cycle of the compression process.

Group 2 swap candidate frequency entries 753 indicate frequency entries to be targets of the swap candidate rearranging process in the next cycle of the compression process, among the frequency entries belonging to the group 2. Inter-group 2/3 rearrangement target frequency entries 754 indicate frequency entries to be targets of the inter-group rearranging process in the next cycle of the compression process, among the frequency entries belonging to the group 2 and the group 3. Group 3 swap candidate frequency entries 755 indicate frequency entries to be targets of the swap candidate rearranging process in the next cycle of the compression process, among the frequency entries belonging to the group 3.

Intra-group 4 rearrangement target frequency entries 756 belong to the group 4, and indicate frequency entries to be targets of the intra-group rearranging process in the next cycle of the compression process. Intra-group 5 rearrangement target frequency entries 757 belong to the group 5, and indicates frequency entries to be targets of the intra-group rearranging process in the next cycle of the compression process.

The inter-group 2/3 rearrangement target frequency entries 754 are included in a code length boundary area 758, and the other frequency entries 751, 752, 753, 755, 756, and 757 are outside the code length boundary area 758. The area including the group 2 swap candidate frequency entries 753 is adjacent to the upper portion of the code length boundary area 758. In addition, the area including the group 3 swap candidate frequency entries 755 is adjacent to a lower portion of the code length boundary area 758.

Figure 51:
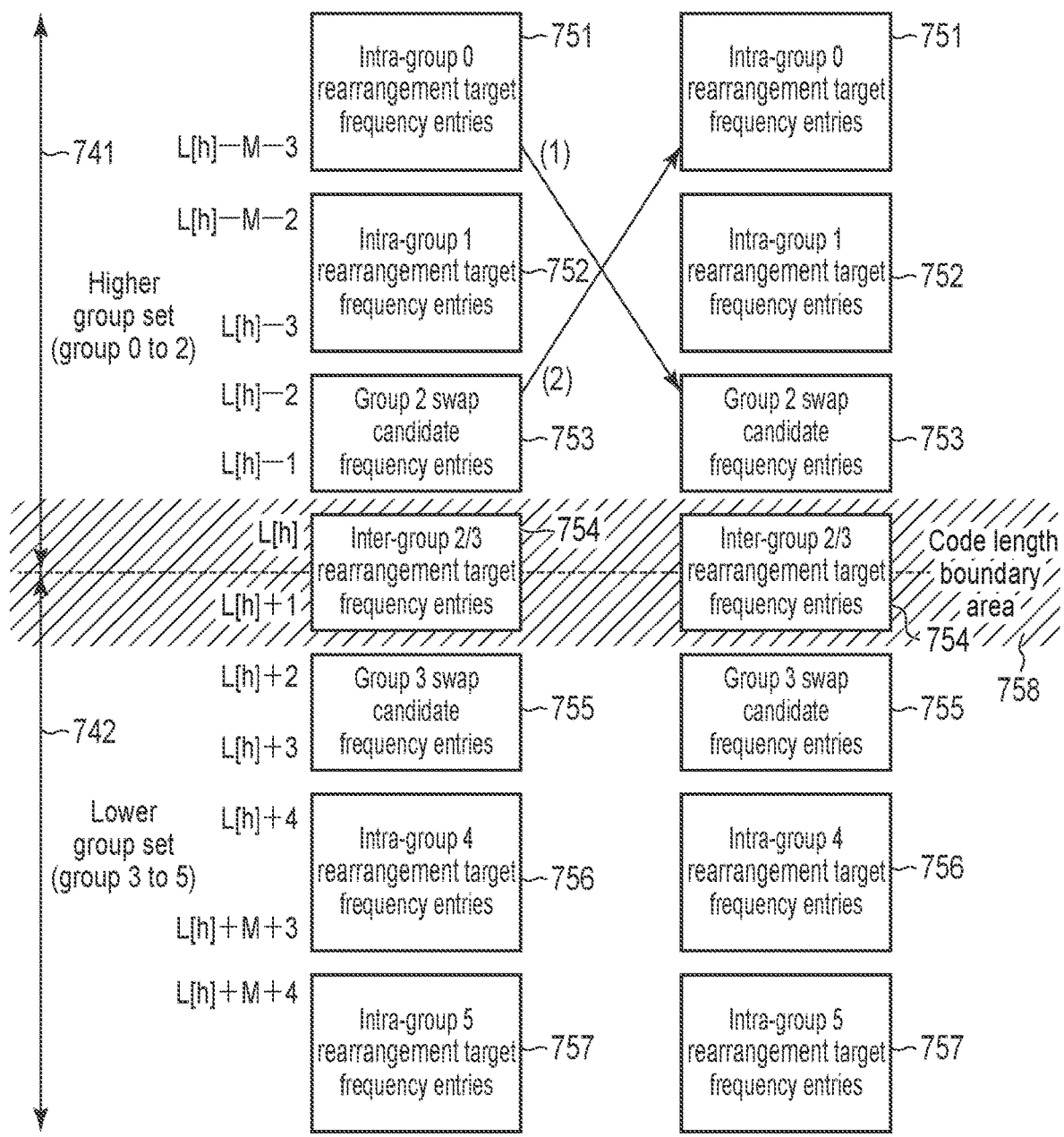
FIG. 51 is a diagram illustrating an example of exchanging frequency entries according to the routing process of FIG. 50.

FIG. 51 illustrates an example of exchange of frequency entries corresponding to step S1903 of the routing process of FIG. 50.

The CPU 12 exchanges the lowest frequency entry freq_entry[L[h]−M−3] of the intra-group 0 rearrangement target frequency entries 751 for the highest frequency entry freq_entry[L[h]−2] of the group 2 swap candidate frequency entries 753 so that (1) the lowest frequency entry freq_entry[L[h]−M−3] is located at the highest position of the group 2 swap candidate frequency entries 753, and (2) the highest frequency entry freq_entry[L[h]−2] is located at the lowest position of the intra-group 0 rearrangement target frequency entries 751. In other words, the CPU 12 exchanges the current swap candidate frequency entry freq_entry[L[h]−2] for the next swap candidate frequency entry freq_entry[L[h]−M−3]. As a result, the frequency entry freq_entry[L[h]−2] having a high frequency value among the current swap candidates is exchanged for the frequency entry freq_entry[L[h]−M−3] having a low frequency value in the group 0, thereby setting the frequency entry freq_entry[L[h]−M−3] having the low frequency value in the group 0 as the next swap candidate.

Figure 52:
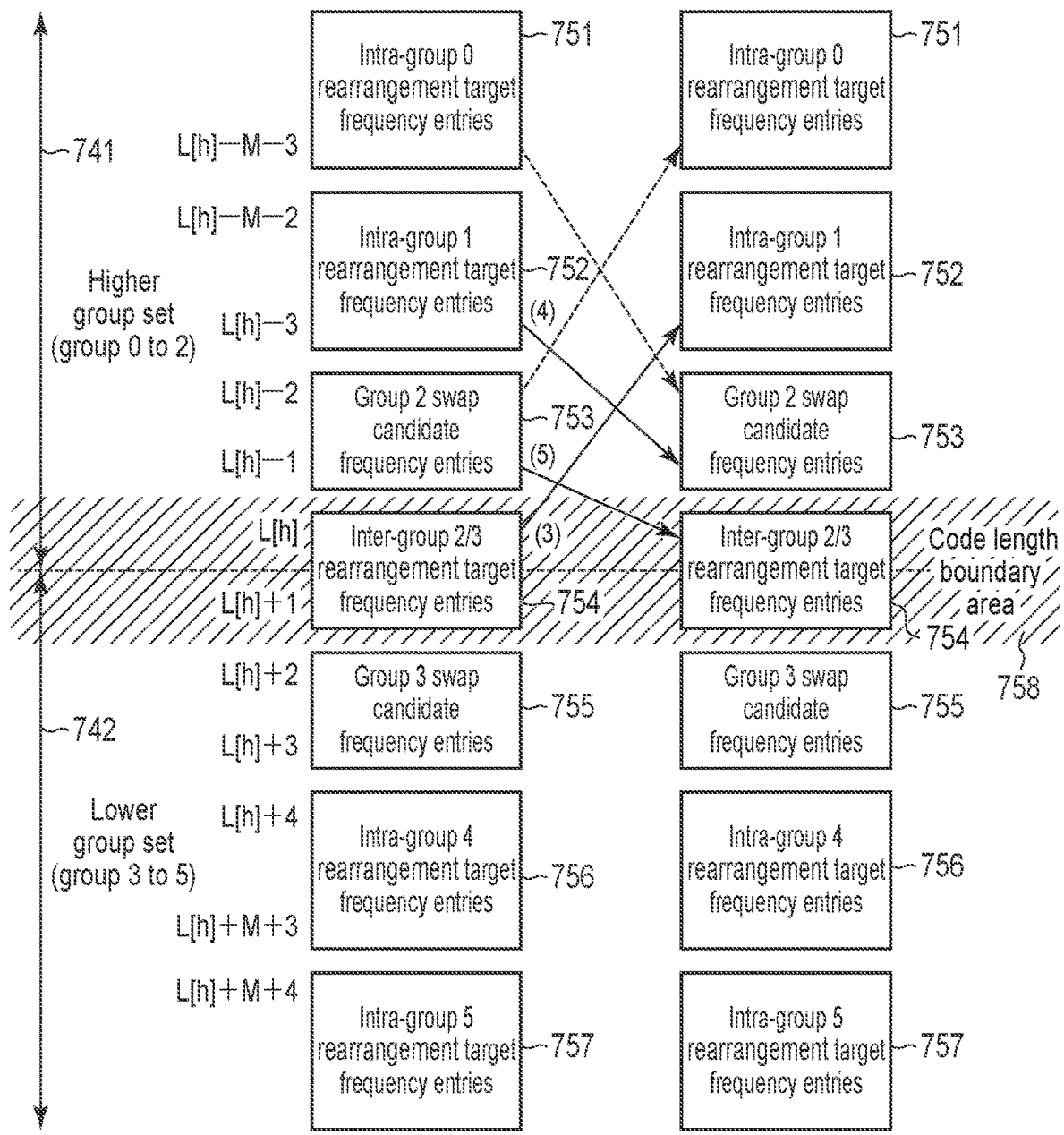
FIG. 52 is a diagram illustrating an example of rearranging the frequency entries according to the routing process of FIG. 50.

FIG. 52 illustrates an example of rearrangement of frequency entries corresponding to step S1904 of the routing process of FIG. 50.

The CPU 12 rearranges the lowest frequency entry freq_entry[L[h]] of the higher group set 741, the lowest frequency entry freq_entry[L[h]−3] of the intra-group 1 rearrangement target frequency group 752, and the lowest frequency entry freq_entry[L[h]−1] of the group 2 swap candidate frequency entries 753 so that (3) the lowest frequency entry freq_entry[L[h]] is located at the lowest position of the intra-group 1 rearrangement target frequency entries 752, (4) the lowest frequency entry freq_entry[L[h]−3] is located at the lowest position of the group 2 swap candidate frequency entries 753, and (5) the lowest frequency entry freq_entry[L[h]−1] is located at the lowest position of the higher group set 741. As a result, the CPU 12 can arrange the frequency entry freq_entry[L[h]] having a high frequency value among the current swap targets at a position that is included in the higher group set 741 and is outside the code length boundary area 758. Further, the CPU 12 can set the frequency entry freq_entry[L[h]−1] having a low frequency value among the current swap candidates as the next swap target frequency entry. Further, the CPU 12 can set the frequency entry freq_entry[L[h]−3] having a low frequency value in the group 1 as the next swap candidate.

Figure 53:
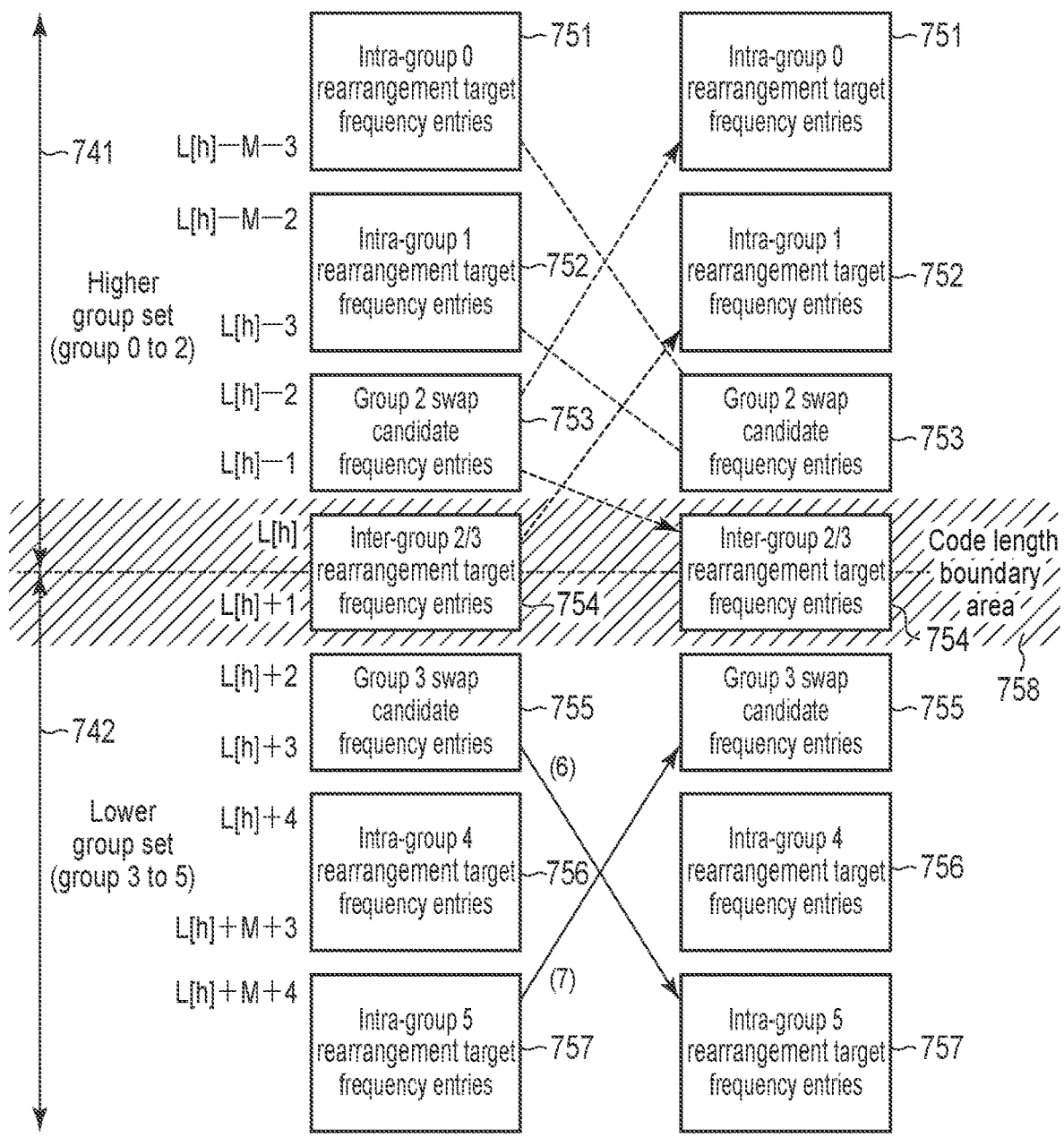
FIG. 53 is a diagram illustrating another example of exchanging the frequency entries according to the routing process of FIG. 50.

FIG. 53 illustrates an example of rearrangement of frequency entries corresponding to step S1905 of the routing process of FIG. 50.

The CPU 12 exchanges the lowest frequency entry freq_entry[L[h]+3] of the group 3 swap candidate frequency entries 755 for the highest frequency entry freq_entry[L[h]+M+4] of the intra-group 5 rearrangement target frequency entries 757 so that (6) the lowest frequency entry freq_entry[L[h]+3] is located at the highest position of the intra-group 5 rearrangement target frequency entries 757 and (7) the highest frequency entry freq_entry[L[h]+M+4] is located at the lowest position of the group 3 swap candidate frequency entries 755. In other words, the CPU 12 exchanges the current swap candidate frequency entry freq_entry[L[h]+3] for the next swap candidate frequency entry freq_entry[L[h]+M+4]. As a result, the frequency entry freq_entry[L[h]+3] having a low frequency value among the current swap candidates is exchanged for the frequency entry freq_entry[L[h]+M+4] having a high frequency value in the group 5, thereby setting the frequency entry freq_entry[L[h]+M+4] having the high frequency value in the group 5 as the next swap candidate.

Figure 54:
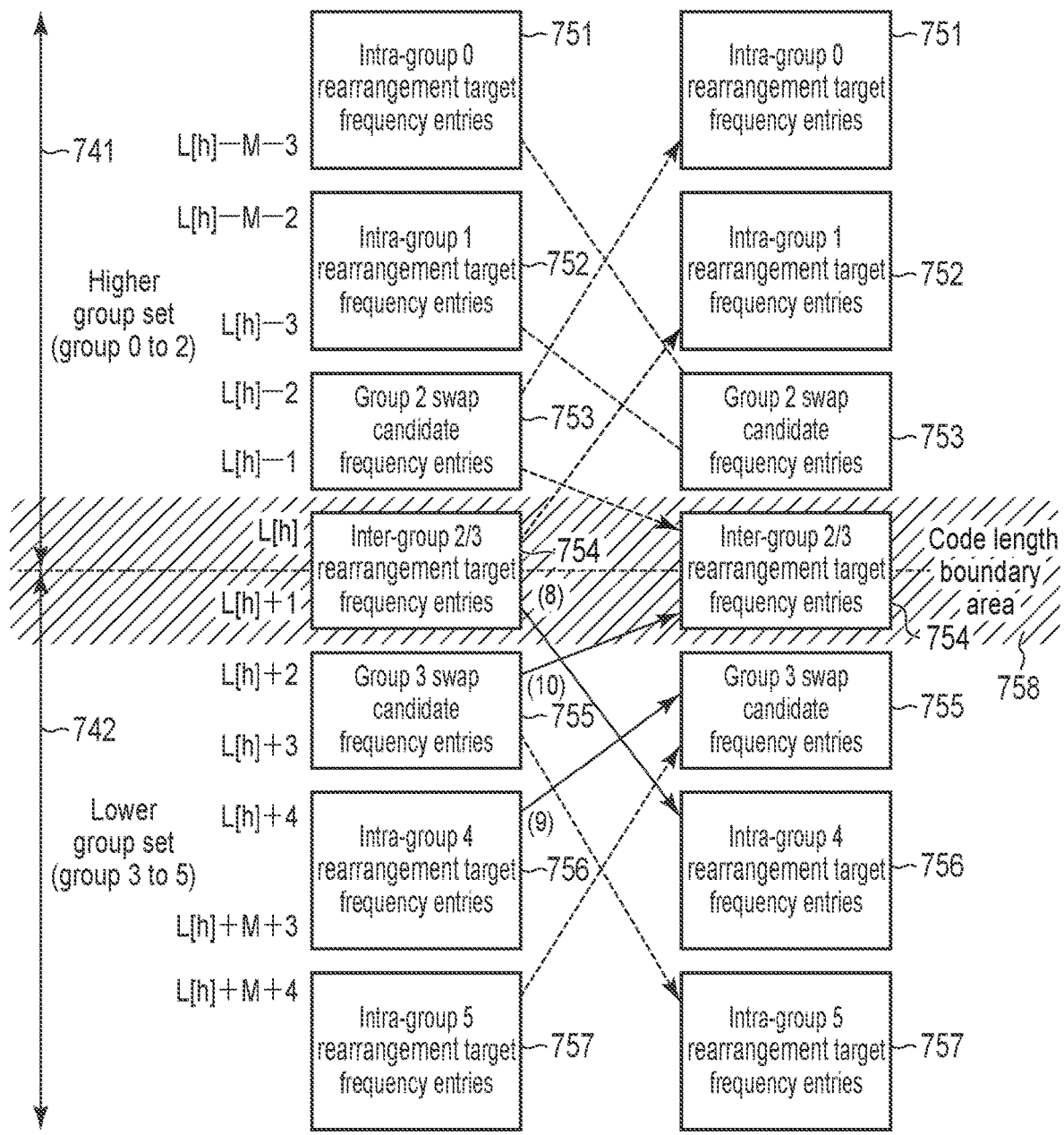
FIG. 54 is a diagram illustrating another example of rearranging the frequency entries according to the routing process of FIG. 50.

FIG. 54 illustrates an example of rearrangement of frequency entries corresponding to step S1906 of the routing process of FIG. 50.

The CPU 12 rearranges the highest frequency entry freq_entry[L[h]+1] of the lower group set 742, the highest frequency entry freq_entry[L[h]+4] of the intra-group 4 rearrangement target frequency entries 756, and the highest frequency entry freq_entry[L[h]+2] of the group 3 swap candidate frequency entries 755 so that (8) the highest frequency entry freq_entry[L[h]+1] is located at the highest position of the intra-group 4 rearrangement target frequency entries 756, (9) the highest frequency entry freq_entry[L[h]+4] is located at the highest position of the group 3 swap candidate frequency entries 755, and (10) the highest frequency entry freq_entry[L[h]+2] is located at the highest position of the lower group set 742. As a result, the CPU 12 can arrange the frequency entry freq_entry[L[h]+1] having a low frequency value among the current swap targets at a position that is included in the lower group set 742 and is outside the code length boundary area 758. In addition, the CPU 12 can set the frequency entry freq_entry[L[h]+2] having a high frequency value among the current swap candidates as the next swap target frequency entry. Further, the CPU 12 can set the frequency entry freq_entry[L[h]+4] having a high frequency value in the group 4 as the next swap candidate.

Through the routing process described above with reference to FIGS. 50 to 54, for each group set in the frequency table 71, the CPU 12 can exchange the swap target frequency entry within the code length boundary area 758 for the swap candidate frequency entry outside the code length boundary area 758 and can collect the next swap candidate frequency entries in the area for swap candidates adjacent to the code length boundary area 758.

Note that in the routing process, an example of a routing method of reducing the number of times of exchanging frequency entries is exemplified, but other various connections are possible. In the routing process implemented as software, the amount of processing can be reduced by reducing the number of times of exchanging frequency entries.

(Decompression Process)

Figure 55:
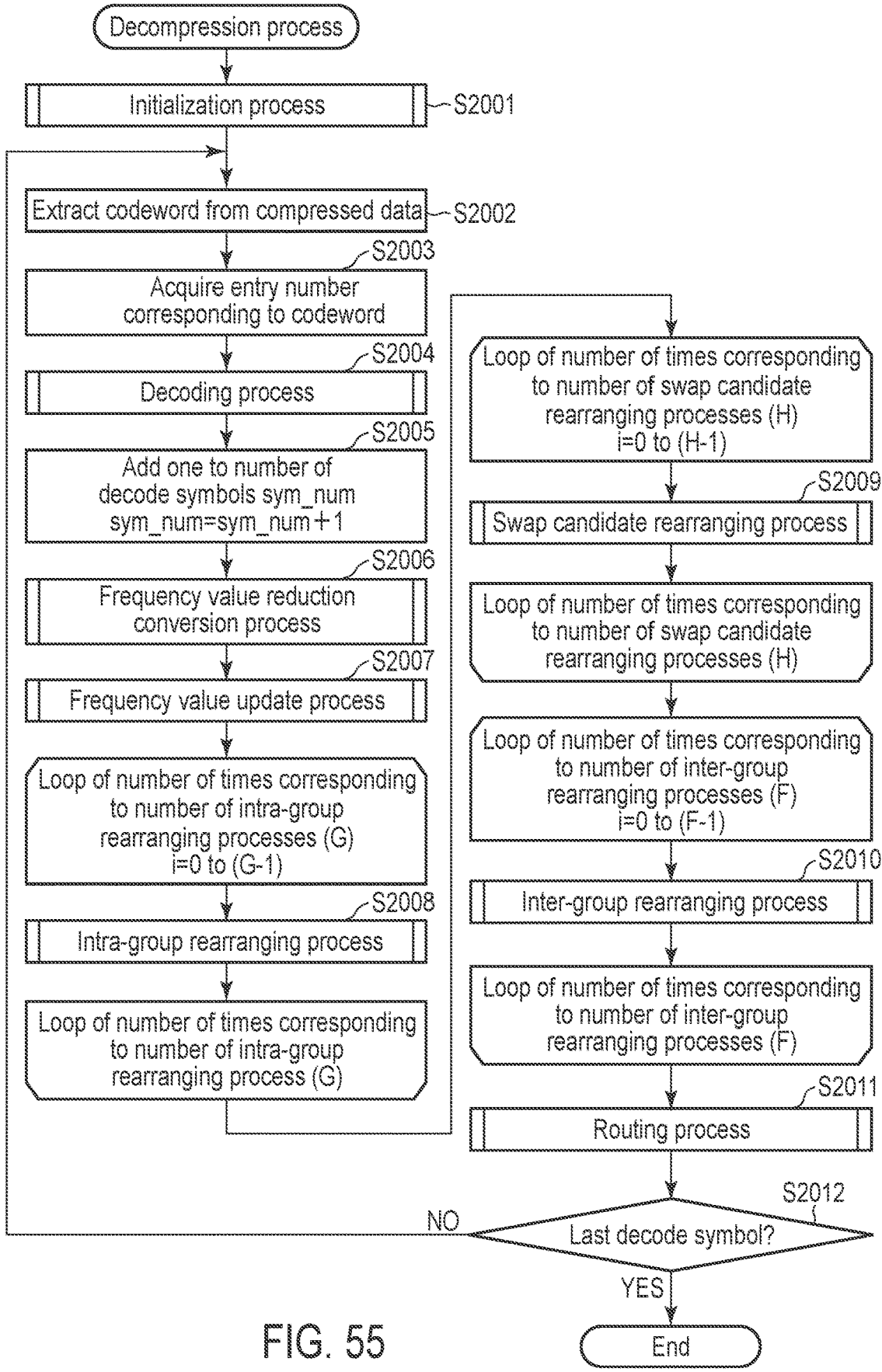
FIG. 55 is a flowchart illustrating an example of the procedure of a decompression process executed in the memory system of the sixth embodiment.

FIG. 55 is a flowchart illustrating an example of the procedure of a decompression process executed in the memory system 3B. This decompression process is realized by the CPU 12 that executes the decompression program 65, for example.

The procedure from step S2001 to step S2007 is similar to the procedure from step S1001 to step S1007 of the decompression process described above with reference to the flowchart in FIG. 35.

The procedure from step S2008 to step S2011 after updating a frequency value corresponding to a frequency entry number in the frequency table 71 is similar to the procedure from step S1707 to step S1710 of the compression process described above with reference to the flowchart of FIG. 48.

Next, the CPU 12 determines whether or not the symbol obtained by the decoding in step S2004 is the last decode symbol in the compressed data (step S2012). In other words, the CPU 12 determines whether or not the codeword extracted in step S2002 is the last codeword in the compressed data to be decoded. When the symbol obtained by the decoding in step S2004 is not the last decode symbol (NO in step S2012), the CPU 12 returns to step S2002 and continues the process for the subsequent codeword.

When the symbol obtained by the decoding in step S2004 is the last decode symbol (YES in step S2012), the CPU 12 ends the decompression process.

Through the decompression process described above, the CPU 12 can update the frequency table 71 according to a symbol while converting a codeword into the symbol. Further, by providing the inter-group rearranging process and the swap candidate rearranging process, the CPU 12 is configured so that the CPU 12 may exchange frequency entries between two adjacent group sets during three cycles of the decompression process. Therefore, as compared with the decompression program 65 of the fourth embodiment that may exchange frequency entries between two adjacent groups during a single cycle of the decompression process and the decompression program 65 of the fifth embodiment that may exchange frequency entries between two adjacent groups during two cycles of the decompression process, the CPU 12 that executes the decompression program 65 of the sixth embodiment can further reduce the amount of processing of rearrangement of frequency entries per cycle, so the throughput can be improved.

Note that compression of data may be performed by the compressor 15 of the memory system 3A according to the third embodiment, and decompression of the compressed data may be performed by causing the CPU 12 of the memory system 3B according to the sixth embodiment to execute the decompression program 65. Alternatively, compression of data may be performed by causing the CPU 12 of the memory system 3B according to the sixth embodiment to execute the compression program 61, and decompression of the compressed data may be performed by the decompressor 16 of the memory system 3A according to the third embodiment.

As described above, according to the first to sixth embodiments, it is possible to improve throughput related to data encoding or decoding.

In the compressor 15, the encoding unit 151 assigns, using a frequency table 71 in which a plurality of frequency entries each including a symbol and a frequency value associated with the symbol are arranged in a first order, codewords to symbols, respectively, according to the first order. The symbols are included in the plurality of frequency entries. The encoding unit 151 converts an input first symbol into a first codeword. The frequency value update unit 34 adds a first value to a first frequency value associated with the first symbol in a frequency entry that includes the first symbol in the frequency table 71. After the first value is added to the first frequency value, the intra-group 0 rearranging unit 350 rearranges first entries belonging to a group 0 using frequency values included in the first entries, in the frequency table 71. After the first value is added to the first frequency value, the intra-group 1 rearranging unit 351 rearranges second entries belonging to a group 1 lower than the group 0 using frequency values included in the second entries, in the frequency table 71. The routing unit 36 rearranges at least one of the rearranged first entries and at least one of the rearranged second entries in the frequency table 71. The encoding unit 151 assigns the symbols to the codewords according to a second order in which the plurality of entries are arranged in the frequency table 71 that is updated by the frequency value update unit 34, the intra-group 0 rearranging unit 350, the intra-group 1 rearranging unit 351, and the routing unit 36. The encoding unit 151 converts a second symbol input next to the first symbol into a second codeword.

As a result, when the input symbol is encoded and the frequency table 71 is updated, the intra-group 0 rearranging unit 350 and the intra-group 1 rearranging unit 351 rearrange the frequency entries belonging to each of the corresponding groups, and then the frequency entries are swapped between the groups, so the amount of processing required for rearranging the frequency entries in the frequency table 71 can be reduced. Therefore, the throughput related to the encoding can be improved. Further, when it is implemented as hardware, the circuit scale of the compressor 15 can be reduced.

In addition, the frequency value reduction conversion unit 33 may reduce each of frequency values included in the plurality of frequency entries in the frequency table 71, for example, when the number of input symbols becomes larger than or equal to a threshold value. After each of the frequency values is reduced, the above-described frequency value update unit 34 adds the first value to the first frequency value associated with the first symbol in the frequency entry including the first symbol in the frequency table 71. Thereby, the overflow of the frequency values can be avoided. In addition, by determining whether or not to reduce the frequency values based on the number of input symbols instead of the frequency value updated by the frequency value update unit 34, it is possible to start reducing the frequency values without waiting for the update of the frequency table 71 according to the input symbol. As a result, the critical path for updating the frequency table can be shortened and the coding throughput can be improved.

In addition, in the decompressor 16, the unpack processing unit 161 acquires a first codeword from compressed data. The entry number acquisition unit 162 acquires a first entry number corresponds to the first codeword. An entry number specifies one of a plurality of entries in a frequency table 71 in accordance with a first order in which the plurality of entries are arranged. Each of the plurality of entries includes a symbol and a frequency value associated with the symbol. The decoding unit 163 converts the first codeword into a first symbol by acquiring the first symbol included in a frequency entry in the frequency table 71. The frequency entry is specified by the first frequency entry number. The frequency value update unit 34 adds a first value to the first frequency value associated with the first symbol in the frequency entry including the first symbol in the frequency table 71. After the first value is added to the first frequency value, the intra-group 0 rearranging unit 350 rearranges first entries belonging to a group 0 using frequency values included in the first entries, in the frequency table 71. After the first value is added to the first frequency value, the intra-group 1 rearranging unit 351 rearranges second entries belonging to a group 1 lower than the group 0 using frequency values included in the second entries, in the frequency table 71. The routing unit 36 rearranges at least one of the rearranged first entries and at least one of the rearranged second entries in the frequency table. The unpack processing unit 161 acquires a second codeword that is subsequent to the first codeword from the compressed data. The entry number acquisition unit 162 acquires a second entry number corresponding to the second codeword. The decoding unit 163 converts the second codeword into a second symbol by acquiring the second symbol included in a second entry in the frequency table 71 that is updated by the frequency value update unit 34, the intra-group 0 rearranging unit 350, the intra-group 1 rearranging unit 351, and the routing unit 36. The second entry is specified by the second entry number.

As a result, when the frequency table 71 is updated according to the decoding of the codeword, the intra-group 0 rearranging unit 350 and the intra-group 1 rearranging unit 351 rearrange the frequency entries belonging to each of the corresponding groups, and then the frequency entries are swapped between the groups, so the amount of processing required for rearranging the frequency entries in the frequency table 71 can be reduced. Therefore, the throughput related to the decoding can be improved. Further, when it is implemented as hardware, the circuit scale of the decompressor 16 can be reduced.

In addition, the frequency value reduction conversion unit 33 may reduce each of the frequency values included in the plurality of frequency entries in the frequency table 71, for example, when the number of symbols (decode symbols) obtained by the conversion by the decoding unit 163 becomes larger than or equal to a threshold value. After the each of the frequency values is reduced, the above-described frequency value update unit 34 adds the first value to the first frequency value associated with the first symbol in the frequency entry including the first symbol in the frequency table 71. Thereby, the overflow of the frequency values can be avoided. In addition, by determining whether or not to reduce the frequency value on the basis of the number of decode symbols instead of the frequency value updated by the frequency value update unit 34, it is possible to start reducing the frequency values without waiting for the update of the frequency table 71 according to the decode symbol. As a result, the critical path for updating the frequency table can be shortened and the decoding throughput can be improved.

Each of various functions described in the first to sixth embodiments may be realized by a circuit (e.g., a processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
an encoding unit, implemented by circuitry, configured to:
assign, using a table in which a plurality of entries each including a symbol and a frequency value associated with the symbol are arranged in a first order, codewords to symbols, respectively, according to the first order, the symbols being included in the plurality of entries, respectively; and
convert one or more input first symbols into one or more first codewords, respectively;
a frequency value update unit, implemented by the circuitry, configured to add a first value to each of one or more first frequency values that are associated with the one or more input first symbols, respectively, in one or more entries in the table that include the one or more input first symbols, respectively;
a first intra-group rearranging unit, implemented by the circuitry, configured to rearrange, after the first value is added to each of the one or more first frequency values, first entries in the table that are obtained by excluding a highest second entry and a lowest third entry from fourth entries in the table that belong to a first group, by using frequency values in the first entries;
a second intra-group rearranging unit, implemented by the circuitry, configured to rearrange, after the first value is added to each of the one or more first frequency values, fifth entries in the table that are obtained by excluding a highest sixth entry and a lowest seventh entry from eighth entries in the table that belong to a second group lower in the table than the first group, by using frequency values in the fifth entries;
an inter-group rearranging unit, implemented by the circuitry, configured to rearrange the third entry and the sixth entry in the table when a frequency value in the third entry is smaller than a frequency value in the sixth entry; and a routing unit, implemented by the circuitry, configured to:
exchange the sixth entry for a lowest entry of the rearranged first entries and exchange the third entry for a highest entry of the rearranged fifth entries, when the third entry and the sixth entry are rearranged; and
exchange the third entry for the lowest entry of the rearranged first entries and exchange the sixth entry for the highest entry in the rearranged fifth entries, when the third entry and the sixth entry are not rearranged,
wherein the encoding unit is configured to:
assign the codewords to the symbols, respectively, according to a second order in which the plurality of entries are arranged in the table that is updated by the frequency value update unit, the first intra-group rearranging unit, the second intra-group rearranging unit, the inter-group rearranging unit, and the routing unit; and
convert one or more second symbols, which are input following the one or more input first symbols, into one or more second codewords, respectively.

2. The memory system of claim 1, further comprising:
a reduction unit, implemented by the circuitry, configured to reduce each of a plurality of frequency values that are included in the plurality of entries, respectively, in the table,
wherein the frequency value update unit is configured to add the first value to each of the one or more first frequency values, in the one or more entries in the table that include the one or more input first symbols, respectively, after the plurality of frequency values are each reduced.

3. The memory system of claim 2, wherein
the reduction unit is configured to reduce each of the plurality of frequency values in the table when a number of input symbols is larger than or equal to a threshold value.

4. The memory system of claim 2, wherein
the reduction unit is configured to reduce each of the plurality of frequency values at a first ratio.

5. The memory system of claim 2, wherein
the reduction unit is configured to subtracts a second value from each of the plurality of frequency values or subtracts a ninth frequency value from each of the plurality of frequency values, in order to reduce each of the plurality of frequency values, the ninth frequency being included in a ninth entry of the plurality of entries.

6. The memory system of claim 1, wherein
the first intra-group rearranging unit is configured to rearrange, in the table, the first entries in an order based on the frequency values in the first entries, after the first value is added to each of the one or more first frequency values, and
the second intra-group rearranging unit is configured to rearrange, in the table, the fifth entries in an order based on the frequency values in the fifth entries, after the first value is added to each of the one or more first frequency values.

7. The memory system of claim 1, wherein
the first intra-group rearranging unit is configured to rearrange, in the table, the first entries so that an entry including a minimum frequency value of the first entries is located at a lowest position, after the first value is added to each of the one or more first frequency values, and
the second intra-group rearranging unit is configured to rearrange, in the table, the fifth entries so that an entry including a maximum frequency value of the fifth entries is located at a highest position, after the first value is added to each of the one or more first frequency values.

8. The memory system of claim 1, wherein
the encoding unit is configured to:
assign a codeword having a first code length to each symbol in the fourth entries; and
assign a codeword having a second code length longer than the first code length to each symbol in the eighth entries.

9. The memory system of claim 1, wherein
the encoding unit is configured to:
use a fixed tree structure comprising leaf nodes that are associated with codewords, respectively,
assign codewords, which are associated with leaf nodes constituting a first subtree of the tree structure, to symbols in the fourth entries, respectively, and
assign codewords, which are associated with leaf nodes constituting a second subtree of the tree structure, to symbols in the eighth entries, respectively.

10. The memory system of claim 1, wherein
the table further includes an entry that belongs to a third group lower than the second group, and is an empty entry that does not include a symbol and a frequency value, and
the frequency value update unit is configured to change, when the table does not include an entry including an input fourth symbol, a symbol in a lowest entry of the second group to the fourth symbol.

11. The memory system of claim 1, wherein
the table further includes:
an entry that belongs to a third group lower than the second group, includes a symbol, and does not include a frequency value; and
an entry that belongs to a fourth group lower than the third group, and is an empty entry that does not include a symbol and a frequency value, and
the frequency value update unit is configured to add, when the table does not include an entry including an input fourth symbol, an entry including the fourth symbol to a highest position in the third group.

12. The memory system of claim 1, wherein
the routing unit is configured to:
rearrange the lowest entry of the rearranged first entries so as to be located at a lowest position in the first group, and the sixth entry so as to be located at a position other than the lowest position in the first group, and rearrange the highest entry of the rearranged fifth entries so as to be located at a highest position in the second group, and the third entry so as to be located at a position other than the highest position in the second group, when the third entry and the sixth entry are rearranged; and
rearrange the lowest entry of the rearranged first entries so as to be located at the lowest position in the first group, and the third entry so as to be located at a position other than the lowest position in the first group, and rearrange the highest entry in the rearranged fifth entries so as to be located at the highest position in the second group, and the sixth entry so as to be located at a position other than the highest position in the second group, when the third entry and the sixth entry are not rearranged.

13. A memory system comprising:

a codeword acquisition unit, implemented by circuitry, configured to acquire one or more first codewords from compressed data;

an entry number acquisition unit, implemented by the circuitry, configured to acquire one or more first entry numbers that correspond to the one or more first codewords, respectively, wherein an entry number specifies one of a plurality of entries in a table according to a first order in which the plurality of entries are arranged, and each of the plurality of entries includes a symbol and a frequency value associated with the symbol;

a decoding unit, implemented by the circuitry, configured to convert the one or more first codewords into one or more first symbols, respectively, by acquiring the one or more first symbols that are included in one or more entries in the table, respectively, the one or more entries being specified by the one or more first entry numbers;

a frequency value update unit, implemented by the circuitry, configured to add a first value to each of one or more first frequency values that are associated with the one or more first symbols, respectively, in the one or more entries in the table that include the one or more first symbols, respectively;

a first intra-group rearranging unit, implemented by the circuitry, configured to rearrange, after the first value is added to each of the one or more first frequency values, first entries in the table that are obtained by excluding a highest second entry and a lowest third entry from fourth entries in the table that belong to a first group, by using frequency values in the first entries;

a second intra-group rearranging unit, implemented by the circuitry, configured to rearrange, after the first value is added to each of the one or more first frequency values, fifth entries in the table that are obtained by excluding a highest sixth entry and a lowest seventh entry from eighth entries in the table that belong to a second group lower in the table than the first group, by using frequency values in the fifth entries;

an inter-group rearranging unit, implemented by the circuitry, configured to rearrange the third entry and the sixth entry in the table when a frequency value in the third entry is smaller than a frequency value in the sixth entry; and a routing unit, implemented by the circuitry, configured to:

exchange the sixth entry for a lowest entry of the rearranged first entries and exchange the third entry for a highest entry of the rearranged fifth entries, when the third entry and the sixth entry are rearranged; and exchange the third entry for the lowest entry in the rearranged first entries and exchange the sixth entry for the highest entry in the rearranged fifth entries, when the third entry and the sixth entry are not rearranged, wherein the codeword acquisition unit is configured to acquire one or more second codewords subsequent to the one or more first codewords from the compressed data, the entry number acquisition unit is configured to acquire one or more second entry numbers that correspond to the one or more second codewords, respectively, and the decoding unit is configured to convert the one or more second codewords into one or more second symbols, respectively, by acquiring the one or more second symbols that are included in one or more second entries, respectively, in the table that is updated by the frequency value update unit, the first intra-group rearranging unit, the second intra-group rearranging unit, the inter-group rearranging unit, and the routing unit, the one or more second entries being specified by the one or more second entry numbers.

14. The memory system of claim 13, further comprising:

a reduction unit, implemented by the circuitry, configured to reduce each of a plurality of frequency values that are included in the plurality of entries, respectively, in the table, wherein the frequency value update unit is configured to add the first value to each of the one or more first frequency values, in the one or more entries in the table that include the one or more first symbols, respectively, after the plurality of frequency values are each reduced.

15. The memory system of claim 14, wherein the reduction unit is configured to reduce each of the plurality of frequency values in the table when a number of symbols obtained in the conversion by the decoding unit is larger than or equal to a threshold value.

16. The memory system of claim 14, wherein the reduction unit is configured to reduce each of the plurality of frequency values at a first ratio.

17. The memory system of claim 14, wherein the reduction unit is configured to subtract a second value from each of the plurality of frequency values, or subtract a ninth frequency value from each of the frequency values, in order to reduce each of the plurality of frequency values, the ninth frequency value being included in a ninth entry of the plurality of entries.

18. The memory system of claim 13, wherein the first intra-group rearranging unit is configured to rearrange, in the table, the first entries in an order based on the frequency values in the first entries, after the first value is added to each of the one or more first frequency values, and the second intra-group rearranging unit is configured to rearrange, in the table, the fifth entries in an order based on the frequency values in the fifth entries, after the first value is added to each of the one or more first frequency values.

19. The memory system of claim 13, wherein the first intra-group rearranging unit is configured to rearrange, in the table, the first entries so that an entry including a minimum frequency value of the first entries is located at a lowest position, after the first value is added to each of the one or more first frequency values, and the second intra-group rearranging unit is configured to rearrange, in the table, the fifth entries so that an entry including a maximum frequency value of the fifth entries is located at a highest position, after the first value is added to each of the one or more first frequency values.

20. The memory system of claim 13, wherein the entry number acquisition unit is configured to:

acquire an entry number corresponding to a codeword having a first code length when specifying one of the fourth entries; and acquire an entry number corresponding to a codeword having a second code length longer than the first code length when specifying one of the eighth entries.

21. The memory system of claim 13, wherein
the entry number acquisition unit is configured to:
- use a fixed tree structure comprising leaf nodes that are associated with codewords, respectively;
- acquire an entry number corresponding to a codeword associated with one of leaf nodes constituting a first subtree of the tree structure when specifying one of the fourth entries; and
- acquire an entry number corresponding to a codeword associated with one of leaf nodes constituting a second subtree of the tree structure when specifying one of the eighth entries.

22. The memory system of claim 13, wherein
the table further includes an entry that belongs to a third group lower than the second group, and is an empty entry that does not include a symbol and a frequency value, and
the frequency value update unit is configured to change, when the table does not include an entry including an input fourth symbol, a symbol included in a lowest entry in the second group to the fourth symbol.

23. The memory system of claim 13, wherein
the table further includes:
- an entry that belongs to a third group lower than the second group, includes a symbol, and does not include a frequency value; and
- an entry that belongs to a fourth group lower than the third group, and is an empty entry that does not include a symbol and a frequency value, and the frequency value update unit is configured to add, when the table does not include an entry including an input fourth symbol, an entry including the fourth symbol to a highest position in the third group.

24. The memory system of claim 13, wherein
the routing unit is configured to:
- rearrange the lowest entry of the rearranged first entries so as to be located at a lowest position in the first group, and the sixth entry so as to be located at a position other than the lowest position in the first group, and rearrange a highest entry of the rearranged fifth entries so as to be located at a highest position in the second group, and the third entry so as to be located at a position other than the highest position in the second group, when the third entry and the sixth entry are rearranged; and
- rearrange the lowest entry of the rearranged first entries so as to be located at the lowest position in the first group, and the third entry so as to be located at a position other than the lowest position in the first group, and rearrange the highest entry of the rearranged fifth entries so as to be located at the highest position in the second group, and the sixth entry so as to be located at a position other than the highest position in the second group, when the third entry and the sixth entry are not rearranged.

25. The memory system of claim 13, wherein
the frequency value update unit is configured to add the first value to each of the one or more first frequency values that are included in the one or more entries, respectively, the one or more entries being specified by the one or more first entry numbers.

* * * * *